(12) United States Patent
Gold et al.

(10) Patent No.: US 11,803,338 B2
(45) Date of Patent: Oct. 31, 2023

(54) EXECUTING A MACHINE LEARNING MODEL IN AN ARTIFICIAL INTELLIGENCE INFRASTRUCTURE

(71) Applicant: PURE STORAGE, INC., Mountain View, CA (US)

(72) Inventors: Brian Gold, Los Altos, CA (US); Emily Potyraj, Houston, TX (US); Ivan Jibaja, San Jose, CA (US); Igor Ostrovsky, Mountain View, CA (US); Roy Kim, Los Altos, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

(21) Appl. No.: 17/538,262

(22) Filed: Nov. 30, 2021

(65) Prior Publication Data
US 2022/0091893 A1     Mar. 24, 2022

Related U.S. Application Data

(63) Continuation of application No. 16/888,135, filed on May 29, 2020, now Pat. No. 11,210,140, which is a
(Continued)

(51) Int. Cl.
*G06F 3/06*           (2006.01)
*G06N 20/00*       (2019.01)
(Continued)

(52) U.S. Cl.
CPC .......... *G06F 3/0679* (2013.01); *G06F 3/0604* (2013.01); *G06F 3/067* (2013.01);
(Continued)

(58) Field of Classification Search
None
See application file for complete search history.

(56) References Cited

U.S. PATENT DOCUMENTS

| 5,706,210 A | 1/1998 | Kumano et al. |
| 5,799,200 A | 8/1998 | Brant et al. |
| (Continued) | | |

FOREIGN PATENT DOCUMENTS

| CN | 111133409 A | 5/2020 |
| EP | 0725324 A2 | 8/1996 |
| (Continued) | | |

OTHER PUBLICATIONS

Udacity, File Allocation Table, Feb. 23, 2015, retrieved on May 9, 2022, retrieved from the Internet (Year: 2015); URL: https://www.youtube.com/watch?v=V2Gxqv3bJCk.
(Continued)

*Primary Examiner* — Natisha D Cox

(57) ABSTRACT

Executing a machine learning model in an artificial intelligence infrastructure that includes one or more storage systems and one or more graphical processing unit ('GPU') servers, including: receiving, by a graphical processing unit ('GPU') server, a dataset transformed by a storage system that is external to the GPU server; and executing, by the GPU server, one or more machine learning algorithms using the transformed dataset as input.

20 Claims, 30 Drawing Sheets

Related U.S. Application Data continuation of application No. 16/040,846, filed on Jul. 20, 2018, now Pat. No. 10,671,434.

(60) Provisional application No. 62/650,736, filed on Mar. 30, 2018, provisional application No. 62/648,368, filed on Mar. 26, 2018, provisional application No. 62/620,286, filed on Jan. 22, 2018, provisional application No. 62/576,523, filed on Oct. 24, 2017, provisional application No. 62/574,534, filed on Oct. 19, 2017.

(51) Int. Cl.
| | |
|---|---|
| G06F 16/245 | (2019.01) |
| G06F 16/178 | (2019.01) |
| G06Q 30/0242 | (2023.01) |
| G06F 9/48 | (2006.01) |
| G06F 9/50 | (2006.01) |
| G06N 3/063 | (2023.01) |
| G06N 3/08 | (2023.01) |
| G06T 1/20 | (2006.01) |
| G06T 1/60 | (2006.01) |
| G06F 16/958 | (2019.01) |
| G06F 16/248 | (2019.01) |

(52) U.S. Cl.
CPC .......... *G06F 3/0608* (2013.01); *G06F 3/0646* (2013.01); *G06F 3/0649* (2013.01); *G06F 9/4881* (2013.01); *G06F 9/5027* (2013.01); *G06F 16/1794* (2019.01); *G06F 16/245* (2019.01); *G06N 3/063* (2013.01); *G06N 3/08* (2013.01); *G06N 20/00* (2019.01); *G06Q 30/0243* (2013.01); *G06T 1/20* (2013.01); *G06T 1/60* (2013.01); *G06F 16/248* (2019.01); *G06F 16/972* (2019.01); *G06T 2200/28* (2013.01)

(56) References Cited

U.S. PATENT DOCUMENTS

| | | | |
|---|---|---|---|
| 5,933,598 | A | 8/1999 | Scales et al. |
| 6,012,032 | A | 1/2000 | Donovan et al. |
| 6,085,333 | A | 7/2000 | Dekoning et al. |
| 6,643,641 | B1 | 11/2003 | Snyder |
| 6,647,514 | B1 | 11/2003 | Umberger et al. |
| 6,789,162 | B1 | 9/2004 | Talagala et al. |
| 7,032,089 | B1 | 4/2006 | Ranade et al. |
| 7,089,272 | B1 | 8/2006 | Garthwaite et al. |
| 7,107,389 | B2 | 9/2006 | Inagaki et al. |
| 7,146,521 | B1 | 12/2006 | Nguyen |
| 7,334,124 | B2 | 2/2008 | Pham et al. |
| 7,437,530 | B1 | 10/2008 | Rajan |
| 7,493,424 | B1 | 2/2009 | Bali et al. |
| 7,606,813 | B1 | 10/2009 | Gritsay et al. |
| 7,669,029 | B1 | 2/2010 | Mishra et al. |
| 7,689,609 | B2 | 3/2010 | Lango et al. |
| 7,743,003 | B1 | 6/2010 | Tong et al. |
| 7,743,191 | B1 | 6/2010 | Liao |
| 7,899,780 | B1 | 3/2011 | Shmuylovich et al. |
| 7,975,115 | B2 | 7/2011 | Wayda et al. |
| 8,042,163 | B1 | 10/2011 | Karr et al. |
| 8,086,585 | B1 | 12/2011 | Brashers et al. |
| 8,200,887 | B2 | 6/2012 | Bennett |
| 8,271,700 | B1 | 9/2012 | Annem et al. |
| 8,387,136 | B2 | 2/2013 | Lee et al. |
| 8,437,189 | B1 | 5/2013 | Montierth et al. |
| 8,465,332 | B2 | 6/2013 | Hogan et al. |
| 8,504,797 | B2 | 8/2013 | Mimatsu |
| 8,527,544 | B1 | 9/2013 | Colgrove et al. |
| 8,566,546 | B1 | 10/2013 | Marshak et al. |
| 8,578,442 | B1 | 11/2013 | Banerjee |
| 8,613,066 | B1 | 12/2013 | Brezinski et al. |
| 8,615,534 | B2 | 12/2013 | Cannon et al. |
| 8,620,970 | B2 | 12/2013 | Inglish et al. |
| 8,751,463 | B1 | 6/2014 | Chamness |
| 8,762,642 | B2 | 6/2014 | Bates et al. |
| 8,769,622 | B2 | 7/2014 | Chang et al. |
| 8,800,009 | B1 | 8/2014 | Beda et al. |
| 8,812,860 | B1 | 8/2014 | Bray |
| 8,822,155 | B2 | 9/2014 | Sukumar et al. |
| 8,850,546 | B1 | 9/2014 | Field et al. |
| 8,898,346 | B1 | 11/2014 | Simmons |
| 8,909,854 | B2 | 12/2014 | Yamagishi et al. |
| 8,931,041 | B1 | 1/2015 | Banerjee |
| 8,949,863 | B1 | 2/2015 | Coatney et al. |
| 8,984,602 | B1 | 3/2015 | Bailey et al. |
| 8,990,905 | B1 | 3/2015 | Bailey et al. |
| 9,081,713 | B1 | 7/2015 | Bennett |
| 9,124,569 | B2 | 9/2015 | Hussain et al. |
| 9,134,922 | B2 | 9/2015 | Rajagopal et al. |
| 9,189,334 | B2 | 11/2015 | Bennett |
| 9,209,973 | B2 | 12/2015 | Aikas et al. |
| 9,250,823 | B1 | 2/2016 | Kamat et al. |
| 9,280,678 | B2 | 3/2016 | Redberg |
| 9,300,660 | B1 | 3/2016 | Borowiec et al. |
| 9,311,182 | B2 | 4/2016 | Bennett |
| 9,395,922 | B2 | 7/2016 | Nishikido et al. |
| 9,444,822 | B1 | 9/2016 | Borowiec et al. |
| 9,507,532 | B1 | 11/2016 | Colgrove et al. |
| 9,632,870 | B2 | 4/2017 | Bennett |
| 10,157,442 | B1 | 12/2018 | Mostak et al. |
| 10,176,217 | B1 | 1/2019 | Dang et al. |
| 10,275,176 | B1 | 4/2019 | Gold et al. |
| 10,275,285 | B1 | 4/2019 | Gold et al. |
| 10,324,639 | B2 | 6/2019 | Seo |
| 10,360,214 | B2 | 7/2019 | Gold et al. |
| 10,567,406 | B2 | 2/2020 | Astigarraga et al. |
| 10,649,988 | B1 | 5/2020 | Gold et al. |
| 10,671,434 | B1 | 6/2020 | Gold et al. |
| 10,671,435 | B1 | 6/2020 | Gold et al. |
| 10,776,322 | B2 | 9/2020 | Danilov et al. |
| 10,846,137 | B2 | 11/2020 | Vallala et al. |
| 10,877,683 | B2 | 12/2020 | Wu et al. |
| 11,076,509 | B2 | 7/2021 | Alissa et al. |
| 11,106,810 | B2 | 8/2021 | Natanzon et al. |
| 11,194,707 | B2 | 12/2021 | Stalzer |
| 11,210,140 | B1 | 12/2021 | Gold et al. |
| 11,403,290 | B1 | 8/2022 | Gold et al. |
| 11,455,168 | B1 | 9/2022 | Potyraj et al. |
| 11,494,692 | B1 | 11/2022 | Watkins et al. |
| 11,556,280 | B2 | 1/2023 | Gold et al. |
| 2002/0013802 | A1 | 1/2002 | Mori et al. |
| 2002/0198921 | A1 | 12/2002 | Jameson |
| 2003/0145172 | A1 | 7/2003 | Galbraith et al. |
| 2003/0191783 | A1 | 10/2003 | Wolczko et al. |
| 2003/0225961 | A1 | 12/2003 | Chow et al. |
| 2004/0080985 | A1 | 4/2004 | Chang et al. |
| 2004/0111573 | A1 | 6/2004 | Garthwaite |
| 2004/0153844 | A1 | 8/2004 | Ghose et al. |
| 2004/0187111 | A1 | 9/2004 | Eakin |
| 2004/0193814 | A1 | 9/2004 | Erickson et al. |
| 2004/0260967 | A1 | 12/2004 | Guha et al. |
| 2005/0010565 | A1 | 1/2005 | Cushing et al. |
| 2005/0160416 | A1 | 7/2005 | Jamison et al. |
| 2005/0188246 | A1 | 8/2005 | Emberty et al. |
| 2005/0216800 | A1 | 9/2005 | Bicknell et al. |
| 2006/0015771 | A1 | 1/2006 | Van Gundy et al. |
| 2006/0129817 | A1 | 6/2006 | Borneman et al. |
| 2006/0161726 | A1 | 7/2006 | Asser |
| 2006/0230245 | A1 | 10/2006 | Gounares et al. |
| 2006/0239075 | A1 | 10/2006 | Williams et al. |
| 2007/0022227 | A1 | 1/2007 | Miki |
| 2007/0028068 | A1 | 2/2007 | Golding et al. |
| 2007/0055702 | A1 | 3/2007 | Fridella et al. |
| 2007/0109856 | A1 | 5/2007 | Pellicone et al. |
| 2007/0150689 | A1 | 6/2007 | Pandit et al. |
| 2007/0168321 | A1 | 7/2007 | Saito et al. |
| 2007/0203937 | A1 | 8/2007 | Prahlad et al. |
| 2007/0220227 | A1 | 9/2007 | Long |
| 2007/0294563 | A1 | 12/2007 | Bose |

(56) References Cited

U.S. PATENT DOCUMENTS

| | | |
|---|---|---|
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0117220 A1 | 5/2008 | Gorchetchnikov et al. |
| 2008/0133568 A1 | 6/2008 | Grosset et al. |
| 2008/0162674 A1 | 7/2008 | Dahiya |
| 2008/0195833 A1 | 8/2008 | Park |
| 2008/0256141 A1 | 10/2008 | Wayda et al. |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0306500 A1 | 12/2010 | Mimatsu |
| 2010/0325345 A1 | 12/2010 | Ohno et al. |
| 2010/0332754 A1 | 12/2010 | Lai et al. |
| 2011/0035540 A1 | 2/2011 | Fitzgerald et al. |
| 2011/0047180 A1 | 2/2011 | Prahlad et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079175 A1* | 3/2012 | Flynn .................. G06F 3/061 711/170 |
| 2012/0079318 A1 | 3/2012 | Colgrove et al. |
| 2012/0131253 A1 | 5/2012 | McKnight et al. |
| 2012/0166699 A1 | 6/2012 | Kumar et al. |
| 2012/0172088 A1 | 7/2012 | Kirch et al. |
| 2012/0284212 A1 | 11/2012 | Lin et al. |
| 2012/0303919 A1 | 11/2012 | Hu et al. |
| 2012/0311000 A1 | 12/2012 | Post et al. |
| 2013/0006976 A1 | 1/2013 | Megler et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0054716 A1 | 2/2013 | Evinson et al. |
| 2013/0071087 A1 | 3/2013 | Motiwala et al. |
| 2013/0145172 A1 | 6/2013 | Shablygin et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0006459 A1 | 1/2014 | Guo et al. |
| 2014/0016913 A1 | 1/2014 | Hamada |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Pinto et al. |
| 2014/0101434 A1 | 4/2014 | Senthurpandi et al. |
| 2014/0156806 A1 | 6/2014 | Karpistsenko et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201485 A1 | 7/2014 | Ahn et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0220561 A1 | 8/2014 | Sukumar et al. |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0277599 A1 | 9/2014 | Pande et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351505 A1 | 11/2014 | Chiu et al. |
| 2014/0351515 A1 | 11/2014 | Chiu et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0100412 A1 | 4/2015 | Sterns et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0154418 A1 | 6/2015 | Redberg |
| 2015/0193169 A1 | 7/2015 | Sundaram et al. |
| 2015/0212889 A1 | 7/2015 | Amarendran et al. |
| 2015/0281389 A1 | 10/2015 | Firsov et al. |
| 2015/0331622 A1 | 11/2015 | Chiu et al. |
| 2015/0378888 A1 | 12/2015 | Zhang et al. |
| 2015/0379425 A1 | 12/2015 | Dirac et al. |
| 2015/0379427 A1* | 12/2015 | Dirac .................. G06N 20/00 706/12 |
| 2016/0019235 A1 | 1/2016 | Bai |
| 2016/0026397 A1 | 1/2016 | Nishikido et al. |
| 2016/0071017 A1 | 3/2016 | Adjaoute |
| 2016/0078361 A1* | 3/2016 | Brueckner .......... H04L 67/10 706/12 |
| 2016/0085774 A1 | 3/2016 | Bhamidipati et al. |
| 2016/0098323 A1 | 4/2016 | Mutha et al. |
| 2016/0162439 A1 | 6/2016 | Cheng et al. |
| 2016/0179795 A1 | 6/2016 | Beard et al. |
| 2016/0182542 A1 | 6/2016 | Staniford |
| 2016/0248631 A1 | 8/2016 | Duchesneau |
| 2016/0342486 A1 | 11/2016 | Kedem et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2017/0031783 A1 | 2/2017 | Kedem et al. |
| 2017/0039396 A1 | 2/2017 | Sharp et al. |
| 2017/0039774 A1 | 2/2017 | Estable |
| 2017/0052916 A1 | 2/2017 | Kollu |
| 2017/0063631 A1 | 3/2017 | Curtis et al. |
| 2017/0091670 A1 | 3/2017 | Gulin et al. |
| 2017/0193389 A1 | 7/2017 | Thomas |
| 2017/0220949 A1 | 8/2017 | Feng et al. |
| 2017/0249729 A1 | 8/2017 | Greene et al. |
| 2017/0262202 A1 | 9/2017 | Seo |
| 2017/0344910 A1 | 11/2017 | Wu |
| 2018/0025024 A1 | 1/2018 | Tiwari et al. |
| 2018/0054454 A1 | 2/2018 | Astigarraga et al. |
| 2018/0081562 A1 | 3/2018 | Vasudevan |
| 2018/0113746 A1 | 4/2018 | López et al. |
| 2018/0181632 A1 | 6/2018 | Zarum et al. |
| 2018/0181877 A1 | 6/2018 | Wu et al. |
| 2018/0189674 A1 | 7/2018 | Hillard et al. |
| 2018/0293490 A1 | 10/2018 | Ma et al. |
| 2018/0314603 A1 | 11/2018 | Gibbons, Jr. et al. |
| 2018/0315158 A1* | 11/2018 | Nurvitadhi .......... G06F 9/30196 |
| 2018/0315499 A1 | 11/2018 | Appelbaum et al. |
| 2018/0357019 A1 | 12/2018 | Karr et al. |
| 2018/0359544 A1 | 12/2018 | Sagie et al. |
| 2019/0004737 A1* | 1/2019 | Khan .................. G06F 3/0679 |
| 2019/0034976 A1 | 1/2019 | Hamedi et al. |
| 2019/0102212 A1 | 4/2019 | Bhandari et al. |
| 2019/0109793 A1 | 4/2019 | Dalal |
| 2019/0121566 A1 | 4/2019 | Gold et al. |
| 2019/0121673 A1 | 4/2019 | Gold et al. |
| 2019/0121889 A1 | 4/2019 | Gold et al. |
| 2019/0220315 A1 | 7/2019 | Vallala et al. |
| 2019/0227845 A1 | 7/2019 | Sridhar et al. |
| 2019/0317802 A1* | 10/2019 | Bachmutsky ......... G06F 9/5038 |

(56) References Cited

U.S. PATENT DOCUMENTS

| | | | |
|---|---|---|---|
| 2020/0034560 | A1 | 1/2020 | Natanzon et al. |
| 2020/0125941 | A1 | 4/2020 | Gold et al. |
| 2020/0293378 | A1 | 9/2020 | Gold et al. |
| 2020/0320371 | A1 | 10/2020 | Baker |
| 2020/0326871 | A1 | 10/2020 | Wu et al. |
| 2021/0360833 | A1 | 11/2021 | Alissa et al. |
| 2022/0253443 | A1 | 8/2022 | Gold et al. |

FOREIGN PATENT DOCUMENTS

| | | |
|---|---|---|
| EP | 3376361 A2 | 9/2018 |
| EP | 3862864 A1 | 8/2021 |
| WO | 2012087648 A2 | 6/2012 |
| WO | 2013071087 A1 | 5/2013 |
| WO | 2014110137 A1 | 7/2014 |
| WO | 2014145149 A1 | 9/2014 |
| WO | 2016004062 A1 | 1/2016 |
| WO | 2016015008 A1 | 1/2016 |
| WO | 2016190938 A1 | 12/2016 |
| WO | 2016195759 A1 | 12/2016 |
| WO | 2016195958 A1 | 12/2016 |
| WO | 2016195961 A1 | 12/2016 |
| WO | 2018218259 A1 | 11/2018 |

OTHER PUBLICATIONS

Huang, "Accelerating AI with GPUs: A New Computing Model", Jan. 12, 2016, retrieved Dec. 30, 2021, retrieved from the Internet, URL: https://blogs.nvidia.com/blog/2016/01/12/accelerating-ai-artificial-intelligence-gpus/, 6 pages.

McCarty, "Architecting Containers Part 1: Why Understanding User Space vs. Kernel Space Matters", Jul. 29, 2015, retrieved on Dec. 23, 2021, retrieved from the Internet, URL: https://www.redhat.com/en/blog/architecting-containers-part-1-why-understanding-user-space-vs-kernel-space-matters, 5 pages.

Survey Sampling Methods, indexed and archived on Apr. 1, 2012 by web.archive.org, retrieved from the Internet, retrieved at: URL: https://stattrek.com/survey-research/sampling-methods.aspx (Year: 2012).

Wikipedia, "Data Parallelism", indexed and archived on May 8, 2017 by web.archive.org, retrieved on Dec. 23, 2021, retrieved from the Internet, URL: https://web.archive.org/web/20170508105619/https://en.wikipedia.org/wiki/Data_parallelism, 4 pages.

Bellamy-Mcintyre et al., "OpenID and the Enterprise: A Model-based Analysis of Single Sign-On Authentication", 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

Datum, "How to Build a GPU Deep Learning Machine", Dec. 31, 2016, retrieved online Apr. 21, 2021, 10 pages, URL: https://medium.com/@SocraticDatum/getting-started-with-gpu-driven-deep-learning-part-1-building-a-machine-d24a3ed1ab1e.

ETSI, "Network Function Virtualisation (NFV); Resiliency Requirements", ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Faith, "dictzip file format", GitHub.com (online), accessed Jul. 28, 2015, 1 page, URL: github.com/fidlej/idzip.

Google Search of "storage array define" performed by the Examiner on Nov. 4, 2015 for U.S. Appl. No. 14/725,278, Results limited to entries dated before 2012, 1 page.

Hota et al., "Capability-based Cryptographic Data Access Control in Cloud Computing", International Journal of Advanced Networking and Applications, col. 1, Issue 1, Aug. 2011, 10 pages, Eswar Publications, India.

Hu et al., "Container Marking: Combining Data Placement, Garbage Collection and Wear Levelling for Flash", 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Apr. 29, 2016, 12 pages.

International Search Report and Written Opinion, PCT/US2016/015008, dated May 4, 2016, 12 pages.

International Search Report and Written Opinion, PCT/US2016/016333, dated Jun. 8, 2016, 12 pages.

International Search Report and Written Opinion, PCT/US2016/020410, dated Jul. 8, 2016, 12 pages.

International Search Report and Written Opinion, PCT/US2016/032052, dated Aug. 30, 2016, 17 pages.

International Search Report and Written Opinion, PCT/US2016/032084, dated Jul. 18, 2016, 12 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

International Search Report and Written Opinion, PCT/US2018/044571, dated Oct. 22, 2018, 10 pages.

Kong, "Using PCI Express As The Primary System Interconnect In Multiroot Compute, Storage, Communications And Embedded Systems", White Paper, IDT.com (online), Aug. 28, 2008, 12 pages, URL: www.idt.com/document/whp/idt-pcie-multi-root-white-paper.

Li et al., "Access Control for the Services Oriented Architecture", Proceedings of the 2007 ACM Workshop on Secure Web Services (SWS '07), Nov. 2007, pp. 9-17, ACM New York, NY.

Microsoft, "Hybrid for SharePoint Server 2013—Security Reference Architecture", Microsoft (online), Oct. 2014, 53 pages, URL: hybrid.office.com/img/Security_Reference_Architecture.pdf.

Microsoft, "Hybrid Identity Management", Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Microsoft, "Hybrid Identity", Microsoft (online), Apr. 2014, 36 pages, URL: www.aka.ms/HybridIdentityWp.

PCMAG, "Storage Array Definition", Published May 10, 2013, URL: http://web.archive.org/web/20130510121646/http://www.pcmag.com/encyclopedia/term/52091/storage-array, 2 pages.

Storer et al., "Secure Data Deduplication", Proceedings of the 4th ACM International Workshop on Storage Security And Survivability (StorageSS'08), Oct. 2008, 10 pages, ACM New York, NY. USA, DOI: 10.1145/1456469.1456471.

Sweere, "Creating Storage Class Persistent Memory with NVDIMM", Published in Aug. 2013, Flash Memory Summit 2013, URL: http://ww.flashmemorysummit.com/English/Collaterals/Proceedings/2013/20130814_T2_Sweere.pdf, 22 pages.

Techopedia, "What is a disk array", techopedia.com (online), Jan. 13, 2012, 1 page, URL: web.archive.org/web/20120113053358/http://www.techopedia.com/definition/1009/disk-array.

Webopedia, "What is a disk array", webopedia.com (online), May 26, 2011, 2 pages, URL: web/archive/org/web/20110526081214/http://www.webopedia.com/TERM/D/disk_array.html.

Wikipedia, "Convergent Encryption", Wikipedia.org (online), accessed Sep. 8, 2015, 2 pages, URL: en.wikipedia.org/wiki/Convergent_encryption.

(56) References Cited

OTHER PUBLICATIONS

Hwang et al., "RAID-x: A New Distributed Disk Aray for I/O-Centric Cluster Computing", Proceedings of the Ninth International Symposium On High-performance Distributed Computing, Aug. 2000, pp. 279-286, The Ninth International Symposium on High-Performance Distributed Computing, IEEE Computer Society, Los Alamitos, CA.

Satyanarayanan et al., "Parallel Communication in a Large Distributed Environment", IEEE Transactions on Computers, vol. 39, No. 3, Mar. 1990, pp. 328-348, IEEE.org (online), URL: https://ieeexplore.ieee.org/stamp/stamp.isp?tp=& arnumber=48864&tag=1.

Stalzer, "FlashBlades: System Architecture and Applications", Proceedings of the 2nd Workshop on Architectures and Systems for Big Data, Jun. 2012, pp. 10-14, Association for Computing Machinery, New York, NY.

Storer et al., "Pergamum: Replacing Tape with Energy Efficient, Reliable, Disk-Based Archival Storage", FAST'08: Proceedings of the 6th USENIX Conference on File and Storage Technologies, Article No. 1, Feb 2008, pp. 1-16, USENIX Association, Berkeley, CA.

\* cited by examiner

EXECUTING A MACHINE LEARNING MODEL IN AN ARTIFICIAL INTELLIGENCE INFRASTRUCTURE

CROSS-REFERENCE TO RELATED APPLICATION

This is a continuation application for patent entitled to a filing date and claiming the benefit of earlier-filed U.S. patent application Ser. No. 16/888,135, filed May 29, 2020, herein incorporated by reference in its entirety.

DESCRIPTION OF EMBODIMENTS

Figure 1A:
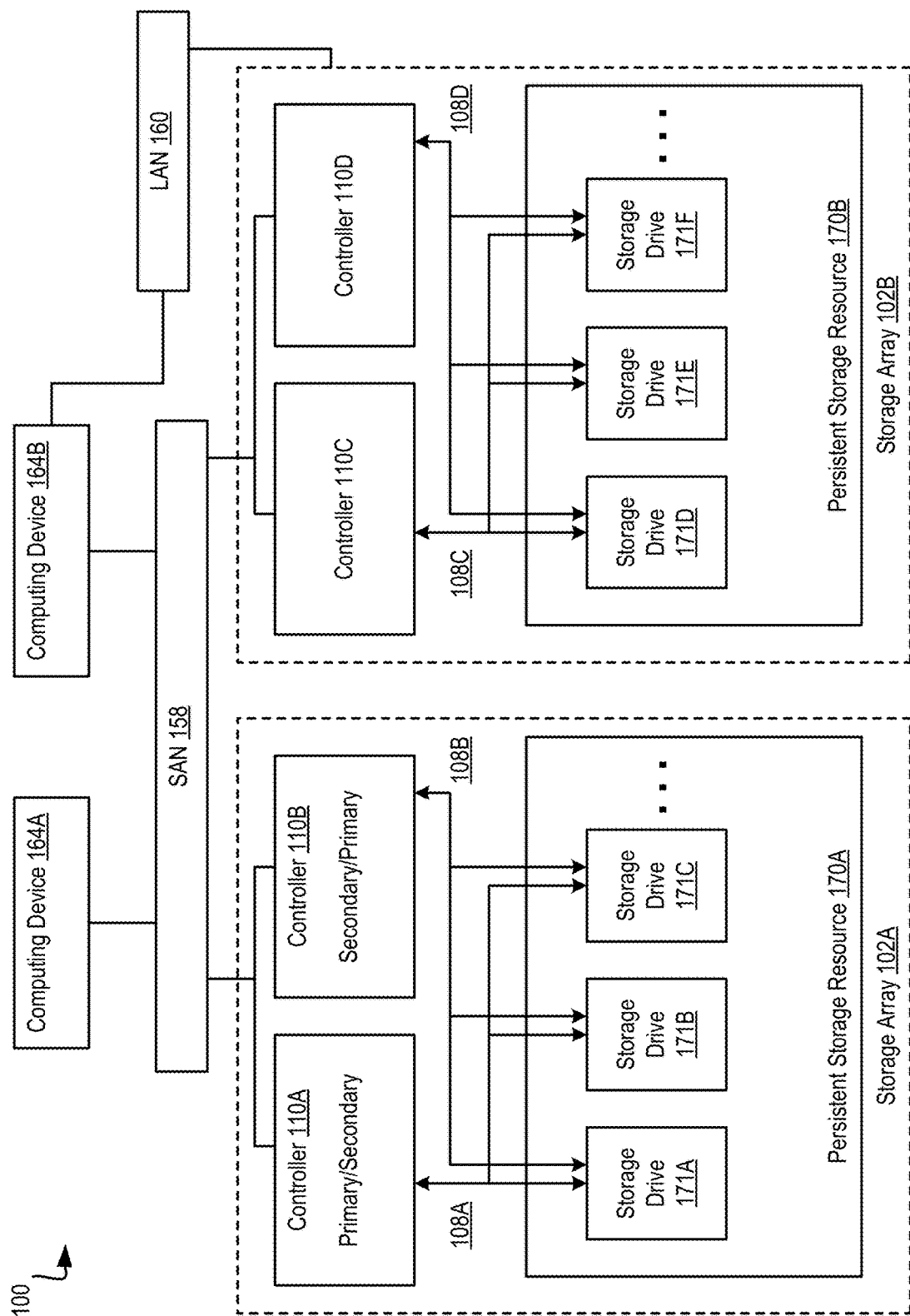
FIG. 1A illustrates a first example system for data storage in accordance with some implementations.

Example methods, apparatus, and products for data transformation offloading in an artificial intelligence infrastructure in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller 110A-D (e.g., storage array controller 110A) of a storage system 100 may be designated with primary status (also referred to as "primary controller" herein), and other storage array controllers 110A-D (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
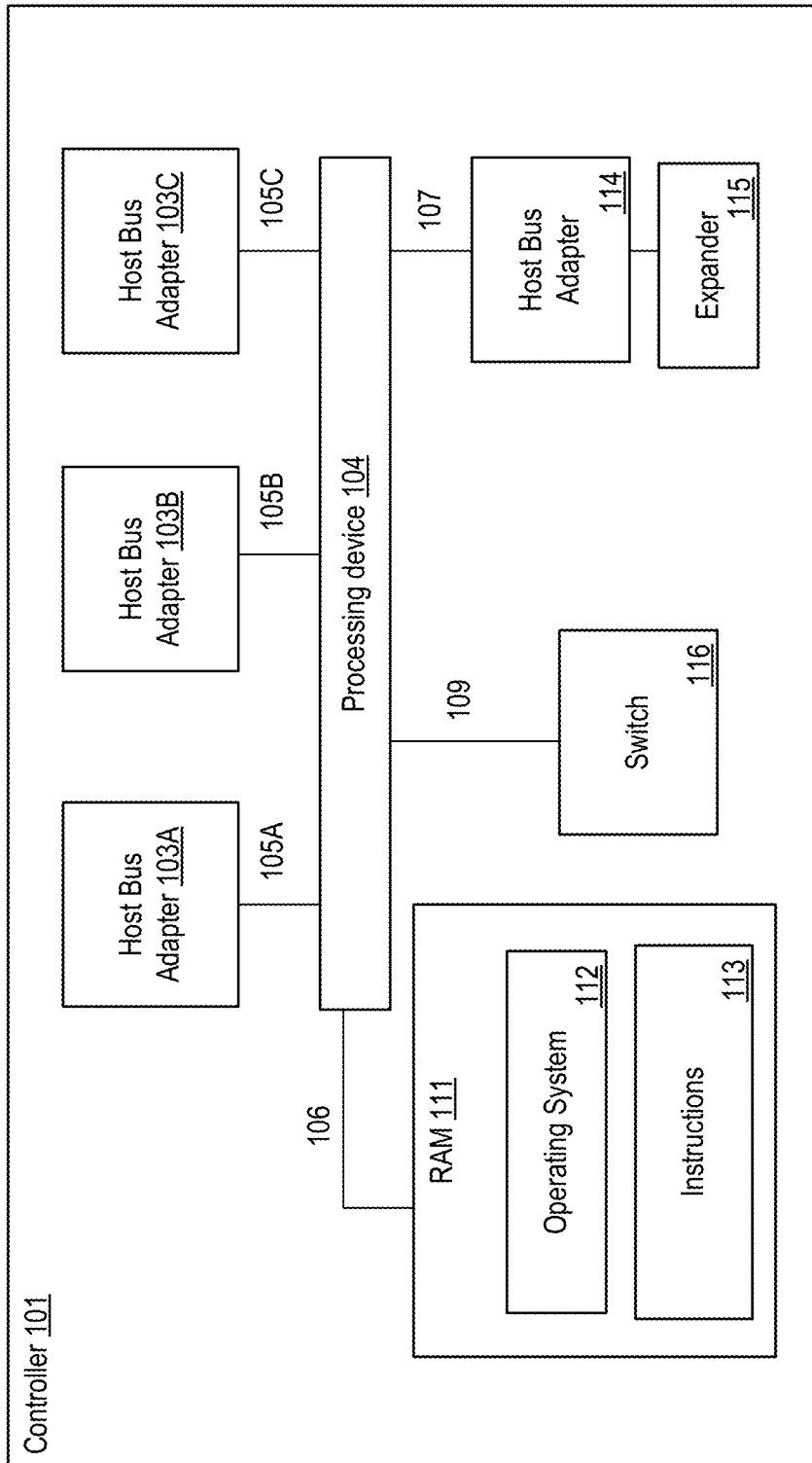
FIG. 1B illustrates a second example system for data storage in accordance with some implementations.

FIG. 1B illustrates an example system for data storage, in accordance with some implementations. Storage array controller 101 illustrated in FIG. 1B may be similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an application specific integrated circuit ('ASIC'), a field programmable gate array ('FPGA'), a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
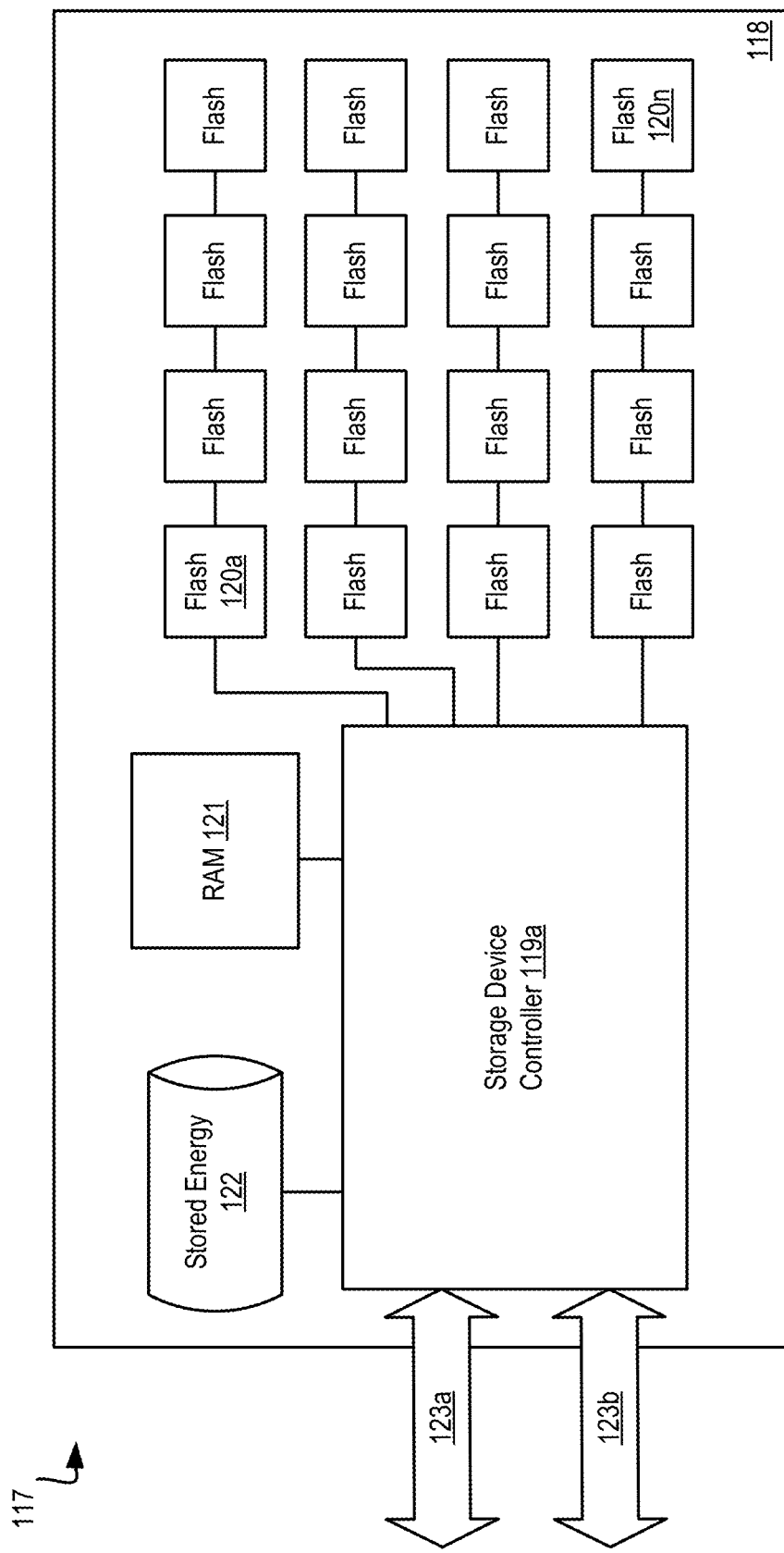
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage controller 119. In one embodiment, storage controller 119A-D may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120A-N including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 119A-D may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 107a-120n stored energy device 122 may power storage device controller 119A-D and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
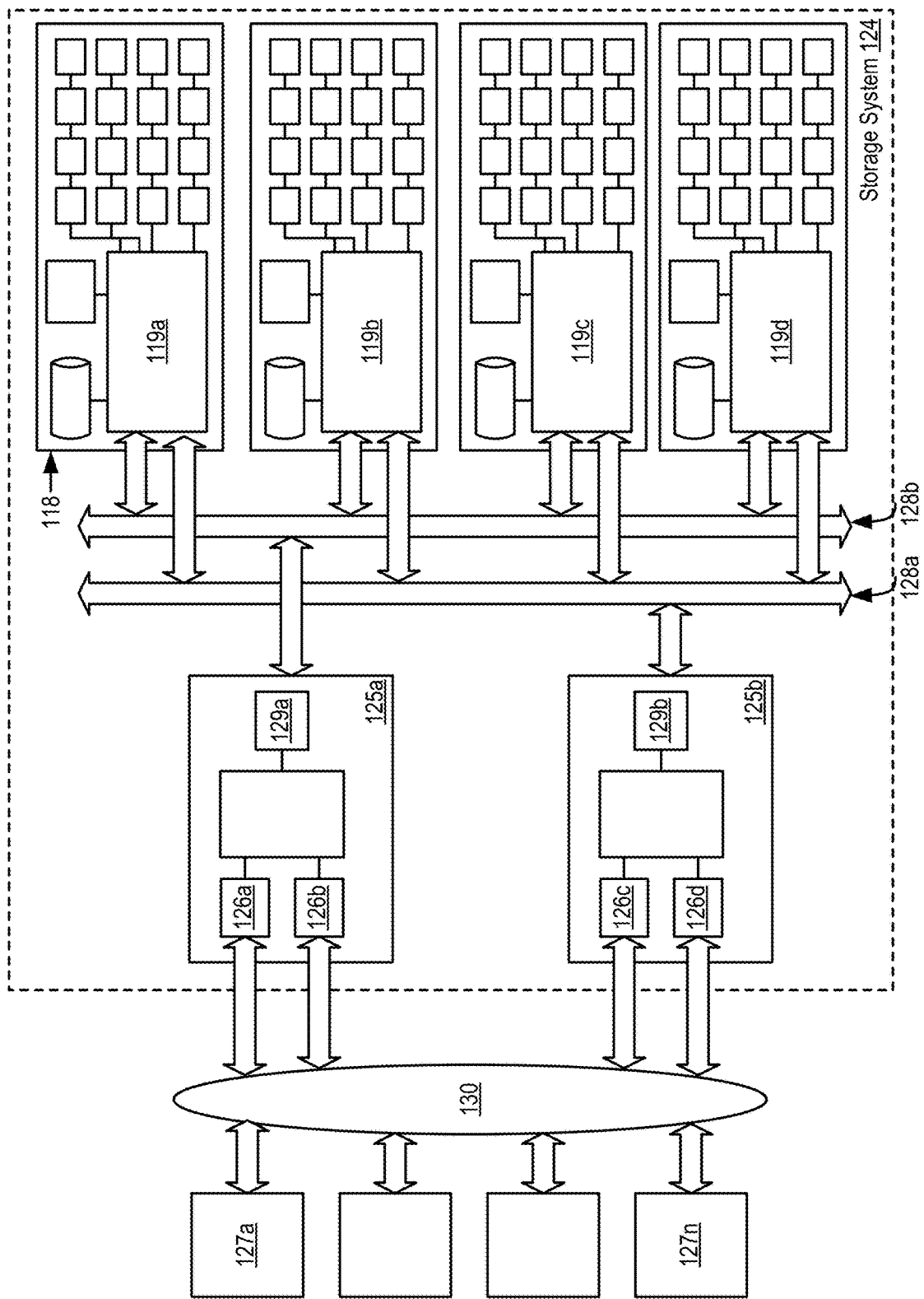
FIG. 1D illustrates a fourth example system for data storage in accordance with some implementations.

FIG. 1D illustrates a third example system 124 for data storage in accordance with some implementations. In one embodiment, system 124 includes storage controllers 125a, 125b. In one embodiment, storage controllers 125a, 125b are operatively coupled to Dual PCI storage devices 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one controller 125a to another controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more or storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
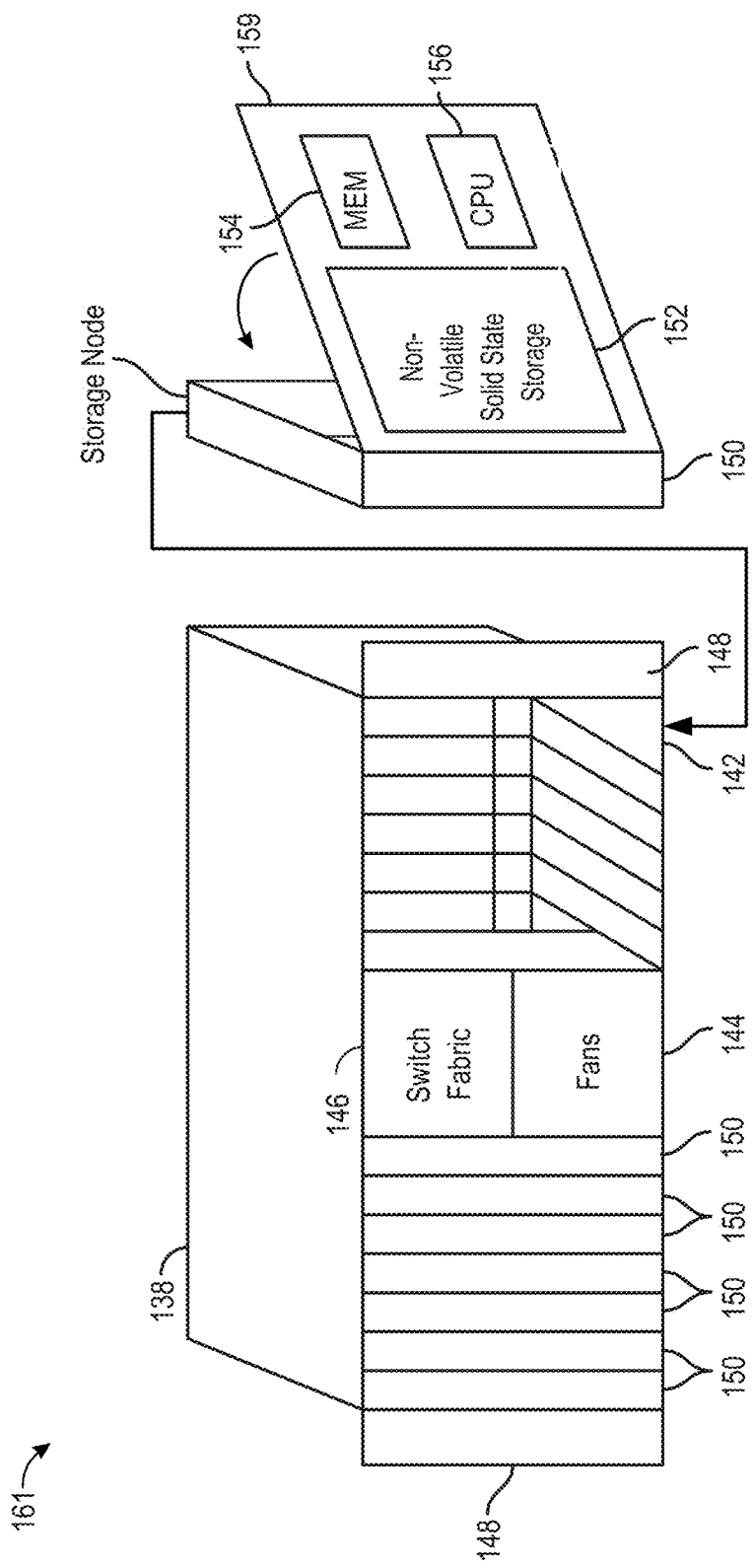
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the nonvolatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
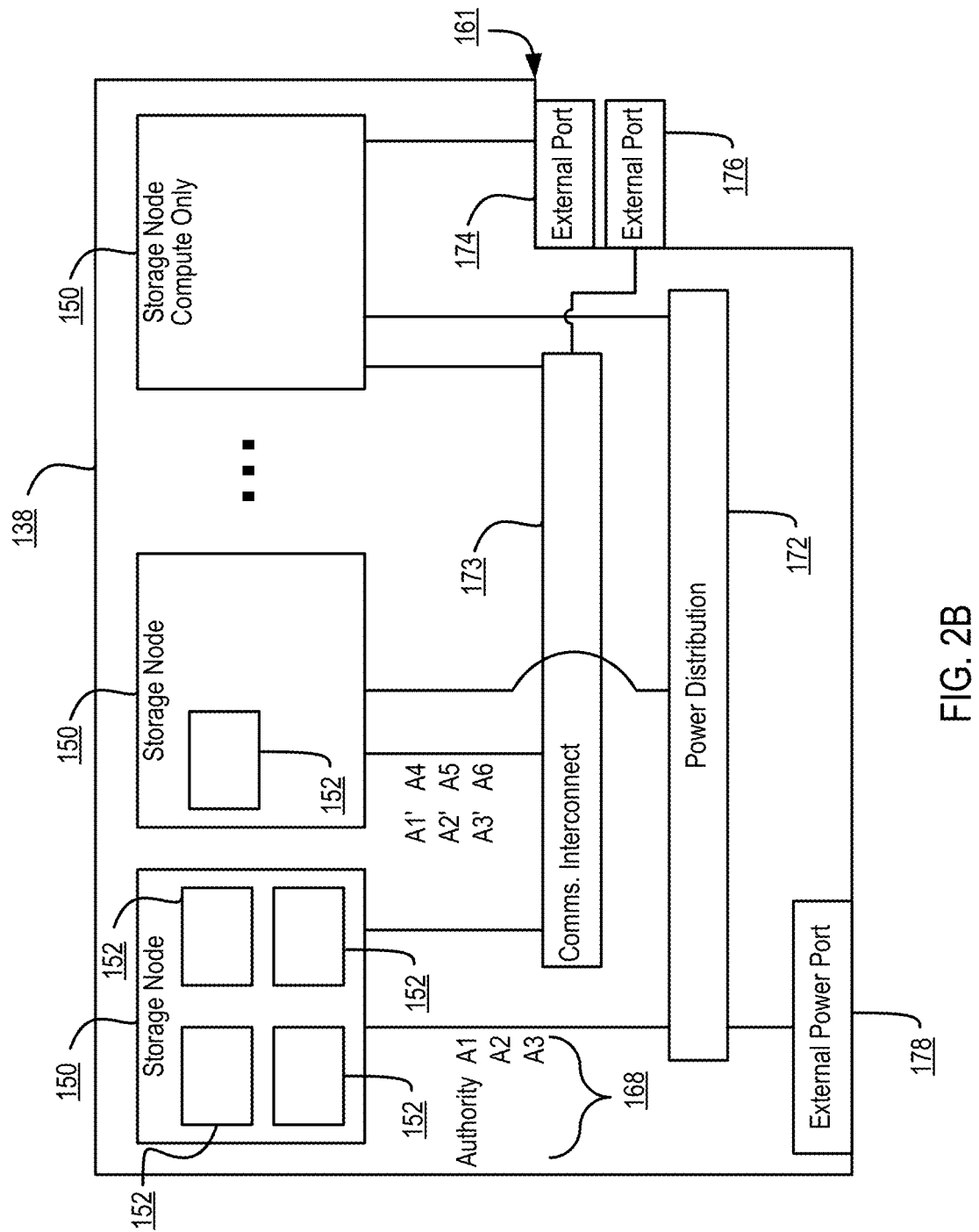
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
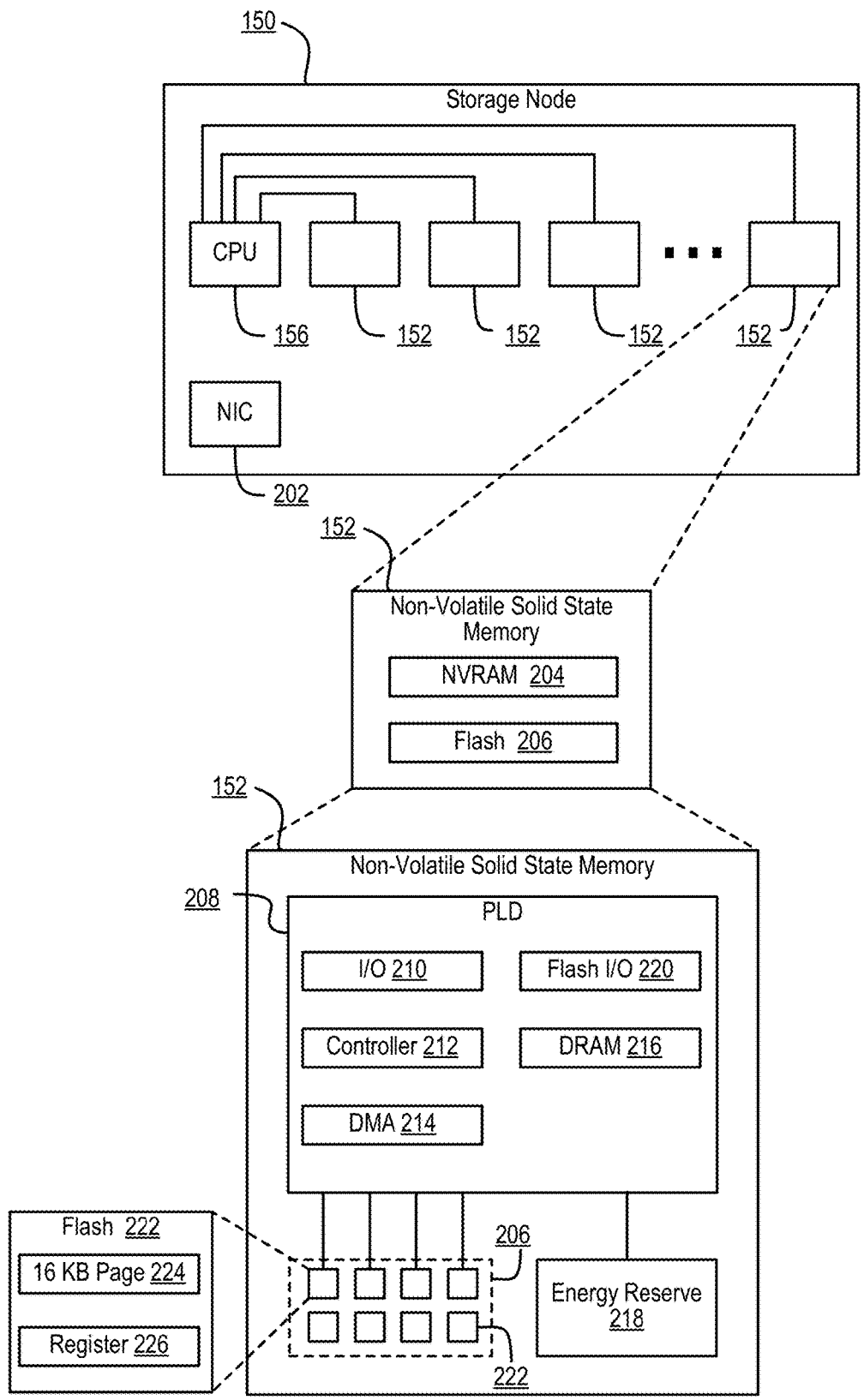
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
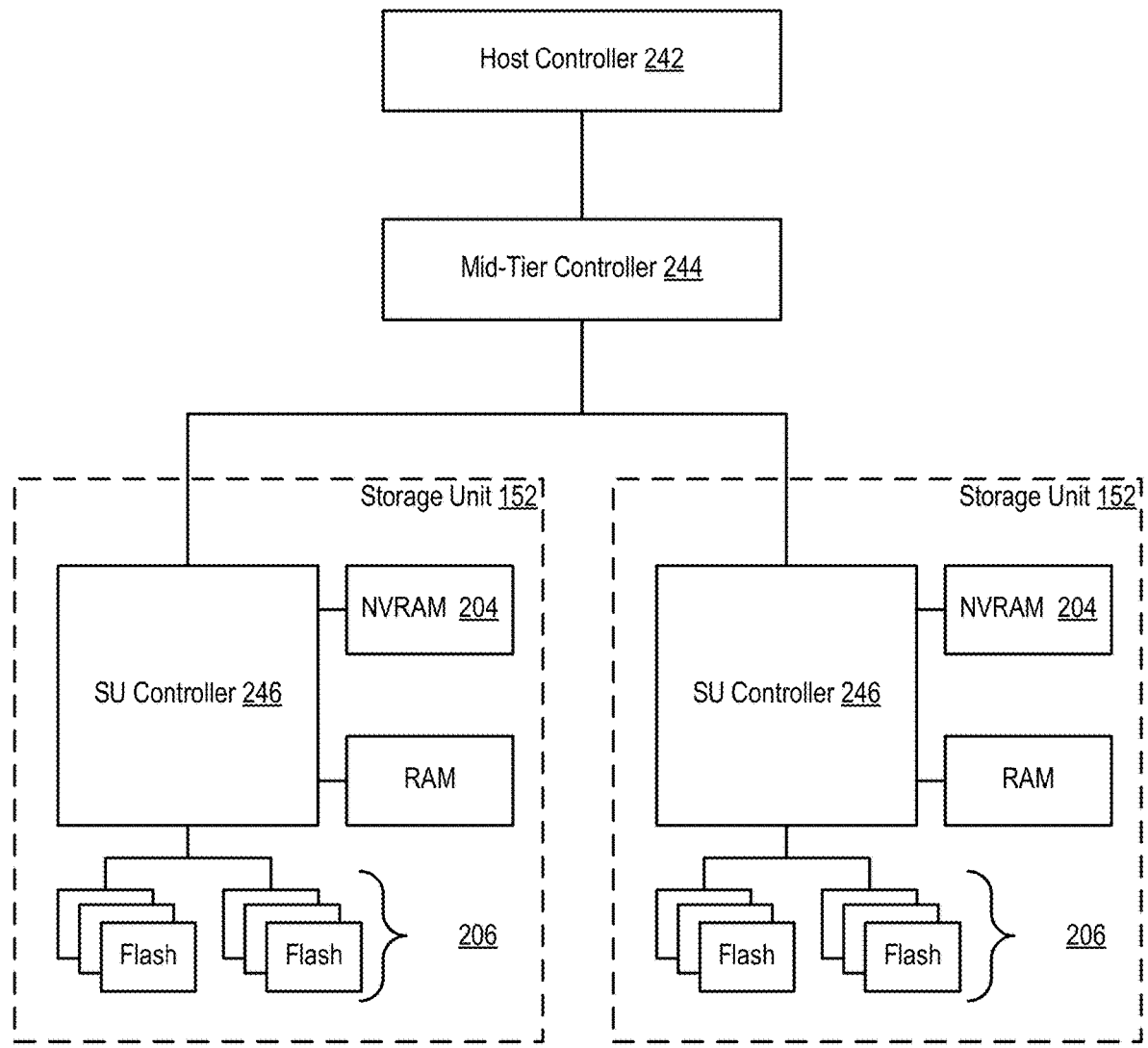
FIG. 2D shows a storage server environment, which uses embodiments of the storage nodes and storage units of some previous figures in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA (field programmable gate array), flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
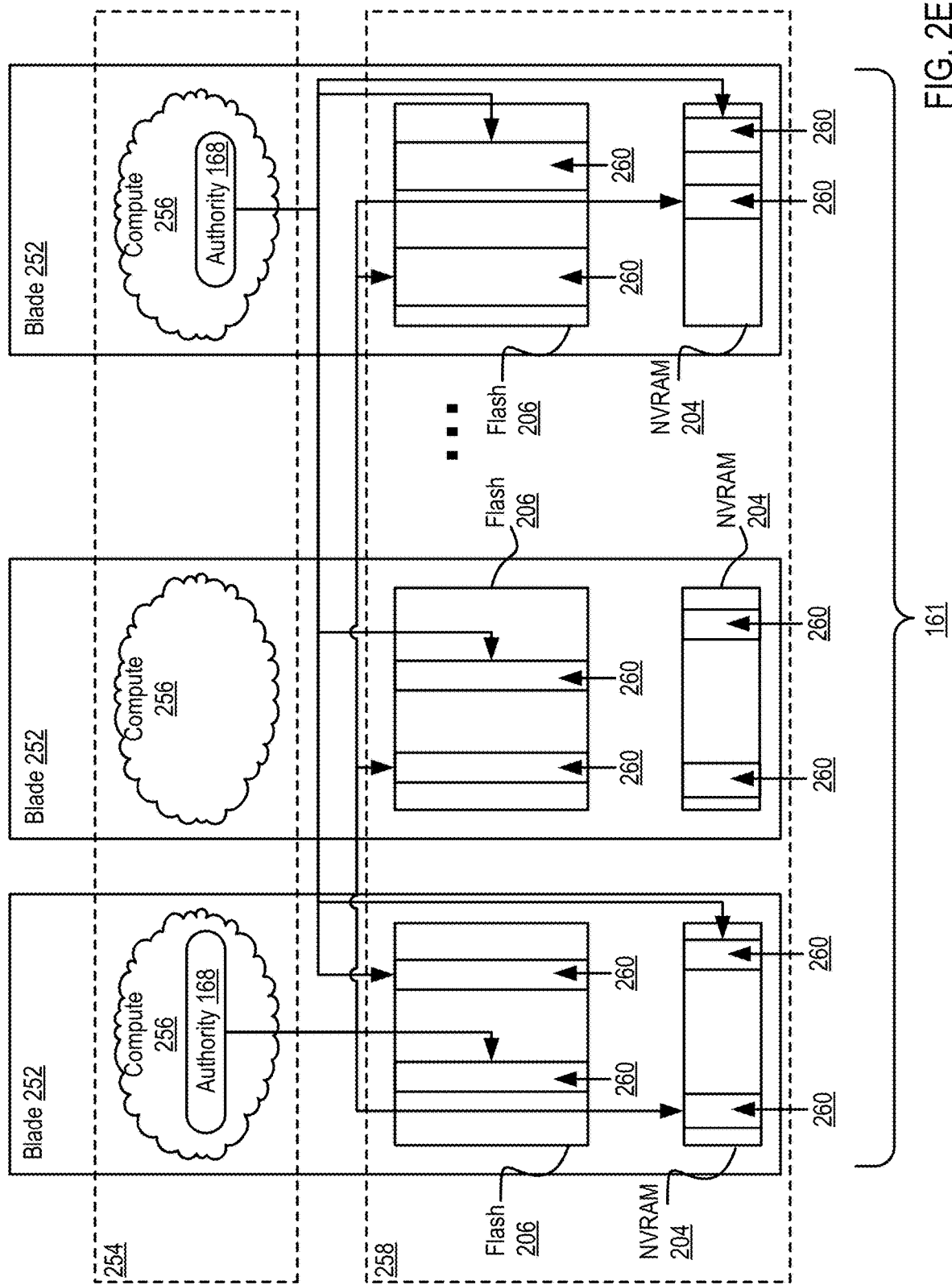
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources.

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g. partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
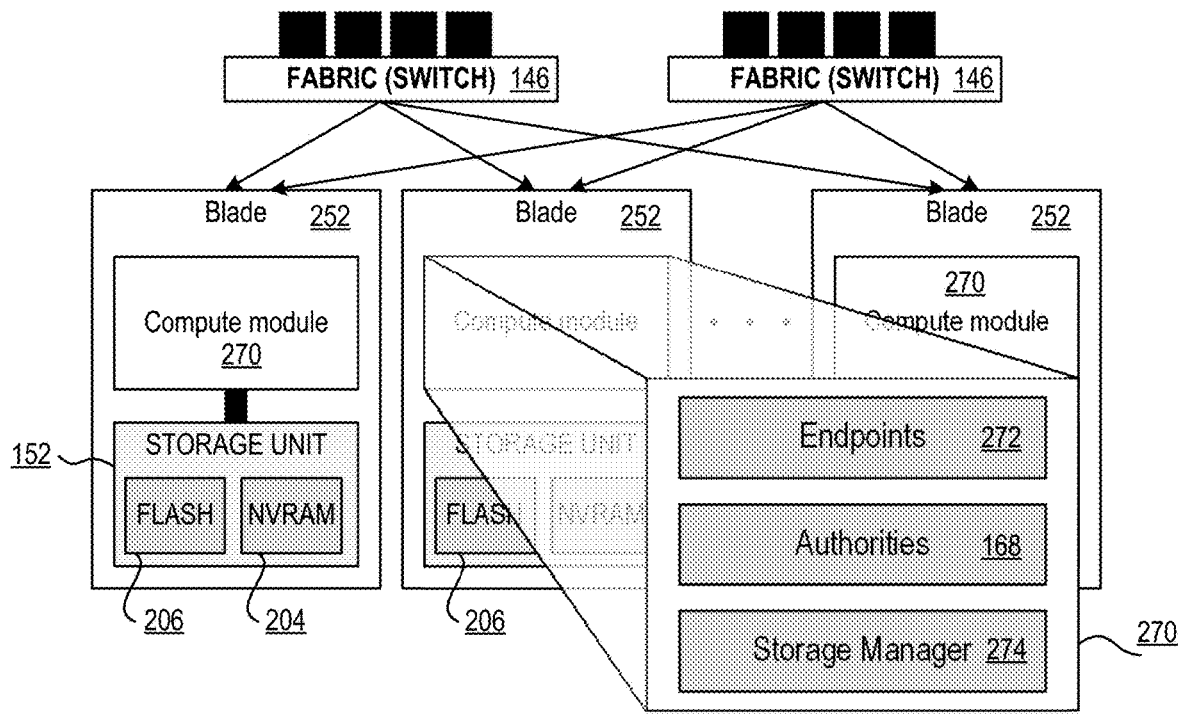
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some embodiments. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
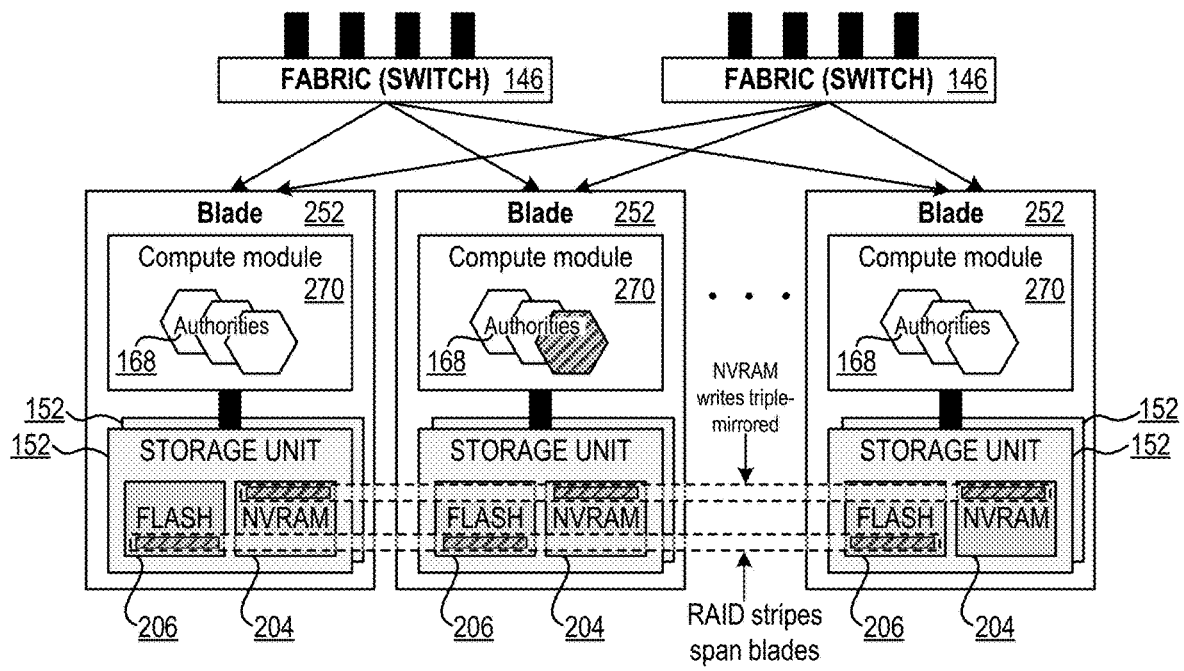
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
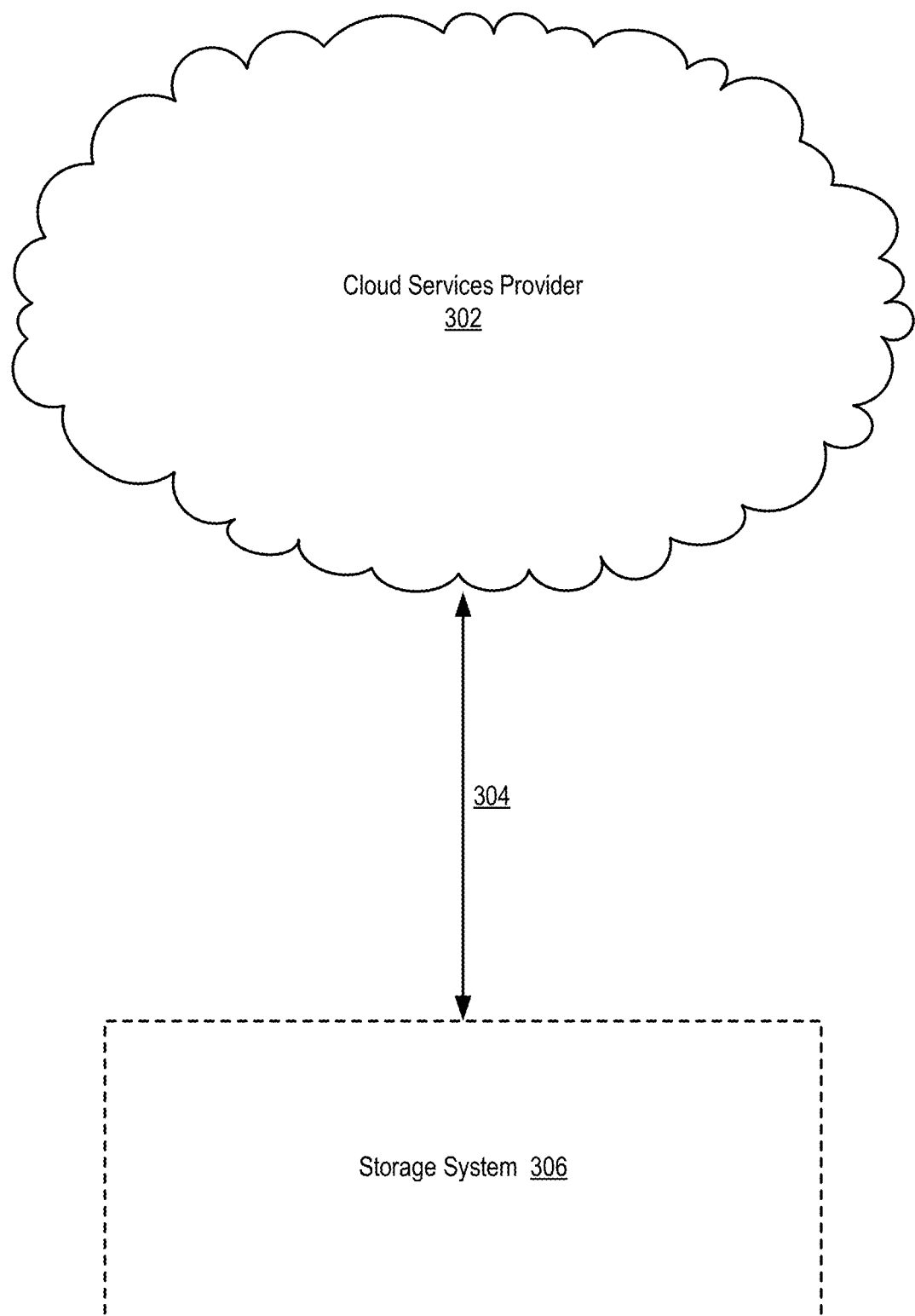
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or local area network ('LAN'), or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services to the storage system 306 and users of the storage system 306 through the implementation of an infrastructure as a service ('IaaS') service model where the cloud services provider 302 offers computing infrastructure such as virtual machines and other resources as a service to subscribers. In addition, the cloud services provider 302 may be configured to provide services to the storage system 306 and users of the storage system 306 through the implementation of a platform as a service ('PaaS') service model where the cloud services provider 302 offers a development environment to application developers. Such a development environment may include, for example, an operating system, programming-language execution environment, database, web server, or other components that may be utilized by application developers to develop and run software solutions on a cloud platform. Furthermore, the cloud services provider 302 may be configured to provide services to the storage system 306 and users of the storage system 306 through the implementation of a software as a service ('SaaS') service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. The cloud services provider 302 may be further configured to provide services to the storage system 306 and users of the storage system 306 through the implementation of an authentication as a service ('AaaS') service model where the cloud services provider 302 offers authentication services that can be used to secure access to applications, data sources, or other resources. The cloud services provider 302 may also be configured to provide services to the storage system 306 and users of the storage system 306 through the implementation of a storage as a service model where the cloud services provider 302 offers access to its storage infrastructure for use by the storage system 306 and users of the storage system 306. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. Public cloud and private cloud deployment models may differ and may come with various advantages and disadvantages. For example, because a public cloud deployment involves the sharing of a computing infrastructure across different organization, such a deployment may not be ideal for organizations with security concerns, mission-critical workloads, uptime requirements demands, and so on. While a private cloud deployment can address some of these issues, a private cloud deployment may require on-premises staff to manage the private cloud. In still alternative embodiments, the cloud services provider 302 may be embodied as a mix of a private and public cloud services with a hybrid cloud deployment.

Although not explicitly depicted in FIG. 3A, readers will appreciate that additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premises with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive telemetry data phoned home by the storage system 306. Such telemetry data may describe various operating characteristics of the storage system 306 and may be analyzed, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 3B:
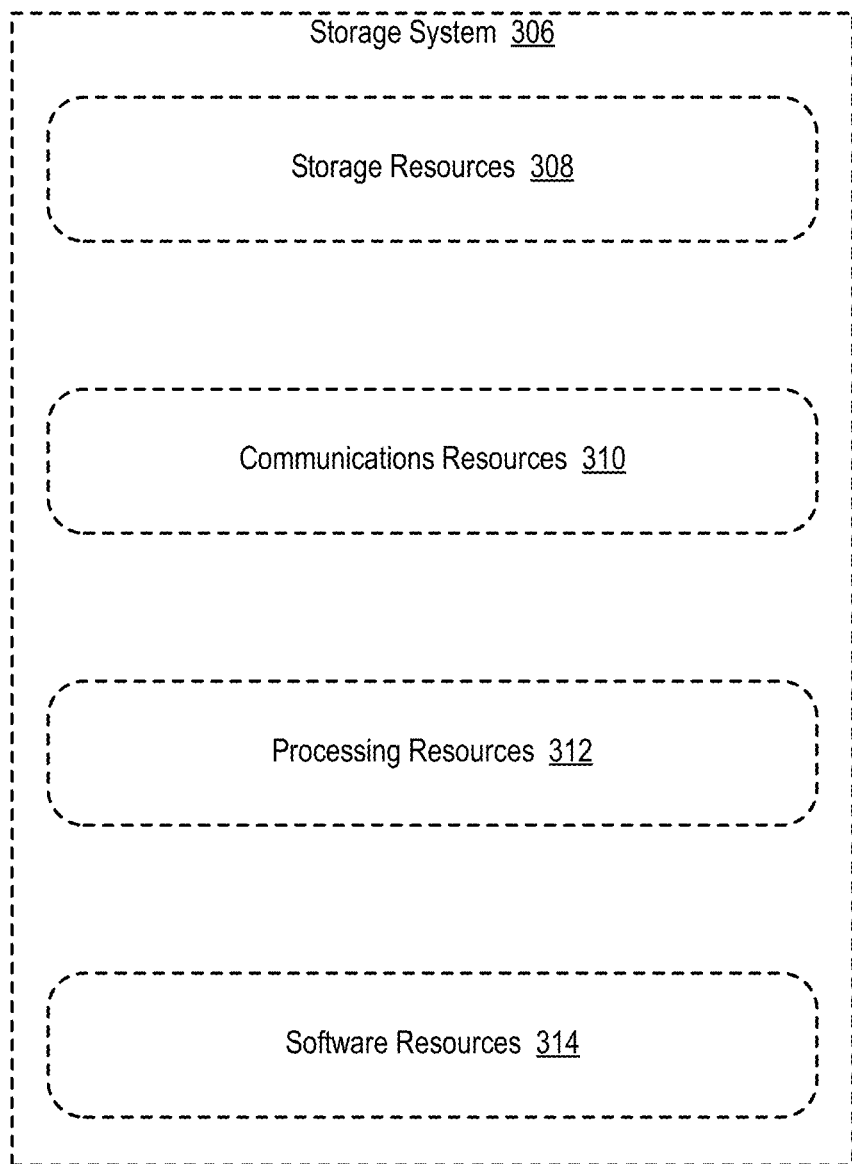
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include storage resources 308, which may be embodied in many forms. For example, in some embodiments the storage resources 308 can include nano-RAM or another form of nonvolatile random access memory that utilizes carbon nanotubes deposited on a substrate. In some embodiments, the storage resources 308 may include 3D crosspoint non-volatile memory in which bit storage is based on a change of bulk resistance, in conjunction with a stackable cross-gridded data access array. In some embodiments, the storage resources 308 may include flash memory, including single-level cell ('SLC') NAND flash, multi-level cell ('MLC') NAND flash, triple-level cell ('TLC') NAND flash, quad-level cell ('QLC') NAND flash, and others. In some embodiments, the storage resources 308 may include non-volatile magnetoresistive random-access memory ('MRAM'), including spin transfer torque ('STT') MRAM, in which data is stored through the use of magnetic storage elements. In some embodiments, the example storage resources 308 may include non-volatile phase-change memory ('PCM') that may have the ability to hold multiple bits in a single cell as cells can achieve a number of distinct intermediary states. In some embodiments, the storage resources 308 may include quantum memory that allows for the storage and retrieval of photonic quantum information. In some embodiments, the example storage resources 308 may include resistive random-access memory ('ReRAM') in which data is stored by changing the resistance across a dielectric solid-state material. In some embodiments, the storage resources 308 may include storage class memory ('SCM') in which solid-state nonvolatile memory may be manufactured at a high density using some combination of sub-lithographic patterning techniques, multiple bits per cell, multiple layers of devices, and so on. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC networks. The communications resources 310 can also include FC over ethernet ('FCoE') technologies through which FC frames are encapsulated and transmitted over Ethernet networks. The communications resources 310 can also include InfiniBand ('IB') technologies in which a switched fabric topology is utilized to facilitate transmissions between channel adapters. The communications resources 310 can also include NVM Express ('NVMe') technologies and NVMe over fabrics ('NVMeoF') technologies through which non-volatile storage media attached via a PCI express ('PCIe') bus may be accessed. The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in executing computer program instructions and performing other computational tasks within the storage system 306. The processing resources 312 may include one or more application-specific integrated circuits ('ASICs') that are customized for some particular purpose as well as one or more central processing units ('CPUs'). The processing resources 312 may also include one or more digital signal processors ('DSPs'), one or more field-programmable gate arrays ('FPGAs'), one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform various tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques. Through the use of such data protection techniques, business continuity and disaster recovery objectives may be met as a failure of the storage system may not result in the loss of data stored in the storage system.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Readers will appreciate that the various components depicted in FIG. 3B may be grouped into one or more optimized computing packages as converged infrastructures. Such converged infrastructures may include pools of computers, storage and networking resources that can be shared by multiple applications and managed in a collective manner using policy-driven processes. Such converged infrastructures may minimize compatibility issues between various components within the storage system 306 while also reducing various costs associated with the establishment and operation of the storage system 306. Such converged infrastructures may be implemented with a converged infrastructure reference architecture, with standalone appliances, with a software driven hyper-converged approach (e.g., hyper-converged infrastructures), or in other ways.

Readers will appreciate that the storage system 306 depicted in FIG. 3B may be useful for supporting various types of software applications. For example, the storage system 306 may be useful in supporting artificial intelligence ('AI') applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, AI applications. Such AI applications may enable devices to perceive their environment and take actions that maximize their chance of success at some goal. Examples of such AI applications can include IBM Watson, Microsoft Oxford, Google DeepMind, Baidu Minwa, and others. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. A GPU is a modern processor with thousands of cores, well-suited to run algorithms that loosely represent the parallel nature of the human brain.

Advances in deep neural networks have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others. Furthermore, AI may impact a wide variety of industries and sectors. For example, AI solutions may be used in healthcare to take clinical notes, patient files, research data, and other inputs to generate potential treatment options for doctors to explore. Likewise, AI solutions may be used by retailers to personalize consumer recommendations based on a person's digital footprint of behaviors, profile data, or other data.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

A data scientist works to improve the usefulness of the trained model through a wide variety of approaches: more data, better data, smarter training, and deeper models. In many cases, there will be teams of data scientists sharing the same datasets and working in parallel to produce new and improved training models. Often, there is a team of data scientists working within these phases concurrently on the same shared datasets. Multiple, concurrent workloads of data processing, experimentation, and full-scale training layer the demands of multiple access patterns on the storage tier. In other words, storage cannot just satisfy large file reads, but must contend with a mix of large and small file reads and writes. Finally, with multiple data scientists exploring datasets and models, it may be critical to store data in its native format to provide flexibility for each user to transform, clean, and use the data in a unique way. The storage systems described above may provide a natural shared storage home for the dataset, with data protection redundancy (e.g., by using RAID6) and the performance necessary to be a common access point for multiple developers and multiple experiments. Using the storage systems described above may avoid the need to carefully copy subsets of the data for local work, saving both engineering and GPU-accelerated servers use time. These copies become a constant and growing tax as the raw data set and desired transformations constantly update and change.

Readers will appreciate that a fundamental reason why deep learning has seen a surge in success is the continued improvement of models with larger data set sizes. In contrast, classical machine learning algorithms, like logistic regression, stop improving in accuracy at smaller data set sizes. As such, the separation of compute resources and storage resources may also allow independent scaling of each tier, avoiding many of the complexities inherent in managing both together. As the data set size grows or new data sets are considered, a scale out storage system must be able to expand easily. Similarly, if more concurrent training is required, additional GPUs or other compute resources can be added without concern for their internal storage. Furthermore, the storage systems described above may make building, operating, and growing an AI system easier due to the random read bandwidth provided by the storage systems, the ability to of the storage systems to randomly read small files (50 KB) high rates (meaning that no extra effort is required to aggregate individual data points to make larger, storage-friendly files), the ability of the storage systems to scale capacity and performance as either the dataset grows or the throughput requirements grow, the ability of the storage systems to support files or objects, the ability of the storage systems to tune performance for large or small files (i.e., no need for the user to provision filesystems), the ability of the storage systems to support non-disruptive upgrades of hardware and software even during production model training, and for many other reasons.

Small file performance of the storage tier may be critical as many types of inputs, including text, audio, or images will be natively stored as small files. If the storage tier does not handle small files well, an extra step will be required to pre-process and group samples into larger files. Storage, built on top of spinning disks, that relies on SSD as a caching tier, may fall short of the performance needed. Because training with random input batches results in more accurate models, the entire data set must be accessible with full performance. SSD caches only provide high performance for a small subset of the data and will be ineffective at hiding the latency of spinning drives.

Although the preceding paragraphs discuss deep learning applications, readers will appreciate that the storage systems described herein may also be part of a distributed deep learning ('DDL') platform to support the execution of DDL algorithms. Distributed deep learning may can be used to significantly accelerate deep learning with distributed computing on GPUs (or other form of accelerator or computer program instruction executor), such that parallelism can be achieved. In addition, the output of training machine learning and deep learning models, such as a fully trained machine learning model, may be used for a variety of purposes and in conjunction with other tools. For example, trained machine learning models may be used in conjunction with tools like Core ML to integrate a broad variety of machine learning model types into an application. In fact, trained models may be run through Core ML converter tools and inserted into a custom application that can be deployed on compatible devices. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage of (among of types of data) blockchains. Such blockchains may be embodied as a continuously growing list of records, called blocks, which are linked and secured using cryptography. Each block in a blockchain may contain a hash pointer as a link to a previous block, a timestamp, transaction data, and so on. Blockchains may be designed to be resistant to modification of the data and can serve as an open, distributed ledger that can record transactions between two parties efficiently and in a verifiable and permanent way. This makes blockchains potentially suitable for the recording of events, medical records, and other records management activities, such as identity management, transaction processing, and others. In addition to supporting the storage and use of blockchain technologies, the storage systems described above may also support the storage and use of derivative items such as, for example, open source blockchains and related tools that are part of the IBM™ Hyperledger project, permissioned blockchains in which a certain number of trusted parties are allowed to access the block chain, blockchain products that enable developers to build their own distributed ledger projects, and others. Readers will appreciate that blockchain technologies may impact a wide variety of industries and sectors. For example, blockchain technologies may be used in real estate transactions as blockchain based contracts whose use can eliminate the need for 3rd parties and enable self-executing actions when conditions are met. Likewise, universal health records can be created by aggregating and placing a person's health history onto a blockchain ledger for any healthcare provider, or permissioned health care providers, to access and update.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the systems described above may be better suited for the applications described above relative to other systems that may include, for example, a distributed direct-attached storage (DDAS) solution deployed in server nodes. Such DDAS solutions may be built for handling large, less sequential accesses but may be less able to handle small, random accesses. Readers will further appreciate that the storage systems described above may be utilized to provide a platform for the applications described above that is preferable to the utilization of cloud-based resources as the storage systems may be included in an on-site or in-house infrastructure that is more secure, more locally and internally managed, more robust in feature sets and performance, or otherwise preferable to the utilization of cloud-based resources as part of a platform to support the applications described above. For example, services built on platforms such as IBM's Watson may require a business enterprise to distribute individual user information, such as financial transaction information or identifiable patient records, to other institutions. As such, cloud-based offerings of AI as a service may be less desirable than internally managed and offered AI as a service that is supported by storage systems such as the storage systems described above, for a wide array of technical reasons as well as for various business reasons.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services. Such platforms may seamlessly collect, organize, secure, and analyze data across an enterprise, as well as simplify hybrid data management, unified data governance and integration, data science and business analytics with a single solution.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. Likewise, machines like locomotives and gas turbines that generate large amounts of information through the use of a wide array of data-generating sensors may benefit from the rapid data processing capabilities of an edge solution. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

Consider a specific example of inventory management in a warehouse, distribution center, or similar location. A large inventory, warehousing, shipping, order-fulfillment, manufacturing or other operation has a large amount of inventory on inventory shelves, and high resolution digital cameras that produce a firehose of large data. All of this data may be taken into an image processing system, which may reduce the amount of data to a firehose of small data. All of the small data may be stored on-premises in storage. The on-premises storage, at the edge of the facility, may be coupled to the cloud, for external reports, real-time control and cloud storage. Inventory management may be performed with the results of the image processing, so that inventory can be tracked on the shelves and restocked, moved, shipped, modified with new products, or discontinued/obsolescent products deleted, etc. The above scenario is a prime candidate for an embodiment of the configurable processing and storage systems described above. A combination of compute-only blades and offload blades suited for the image processing, perhaps with deep learning on offload-FPGA or offload-custom blade(s) could take in the firehose of large data from all of the digital cameras, and produce the firehose of small data. All of the small data could then be stored by storage nodes, operating with storage units in whichever combination of types of storage blades best handles the data flow. This is an example of storage and function acceleration and integration. Depending on external communication needs with the cloud, and external processing in the cloud, and depending on reliability of network connections and cloud resources, the system could be sized for storage and compute management with bursty workloads and variable conductivity reliability. Also, depending on other inventory management aspects, the system could be configured for scheduling and resource management in a hybrid edge/cloud environment.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics. Big data analytics may be generally described as the process of examining large and varied data sets to uncover hidden patterns, unknown correlations, market trends, customer preferences and other useful information that can help organizations make more-informed business decisions. Big data analytics applications enable data scientists, predictive modelers, statisticians and other analytics professionals to analyze growing volumes of structured transaction data, plus other forms of data that are often left untapped by conventional business intelligence (BI) and analytics programs. As part of that process, semi-structured and unstructured data such as, for example, internet clickstream data, web server logs, social media content, text from customer emails and survey responses, mobile-phone call-detail records, IoT sensor data, and other data may be converted to a structured form. Big data analytics is a form of advanced analytics, which involves complex applications with elements such as predictive models, statistical algorithms and what-if analyses powered by high-performance analytics systems.

The storage systems described above may also support (including implementing as a system interface) applications that perform tasks in response to human speech. For example, the storage systems may support the execution intelligent personal assistant applications such as, for example, Amazon's Alexa, Apple Siri, Google Voice, Samsung Bixby, Microsoft Cortana, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others. The storage systems described above may also, either alone or in combination with other computing environments, be used to deliver a wide range of transparently immersive experiences where technology can introduce transparency between people, businesses, and things. Such transparently immersive experiences may be delivered as augmented reality technologies, connected homes, virtual reality technologies, brain—computer interfaces, human augmentation technologies, nanotube electronics, volumetric displays, 4D printing technologies, or others. The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload. Furthermore, application monitoring and visibility tools may be deployed to move application workloads around different clouds, identify performance issues, and perform other tasks. In addition, security and compliance tools may be deployed for to ensure compliance with security requirements, government regulations, and so on. Such a multi-cloud environment may also include tools for application delivery and smart workload management to ensure efficient application delivery and help direct workloads across the distributed and heterogeneous infrastructure, as well as tools that ease the deployment and maintenance of packaged and custom applications in the cloud and enable portability amongst clouds. The multi-cloud environment may similarly include tools for data portability.

The storage systems described above may be used as a part of a platform to enable the use of crypto-anchors that may be used to authenticate a product's origins and contents to ensure that it matches a blockchain record associated with the product. Such crypto-anchors may take many forms including, for example, as edible ink, as a mobile sensor, as a microchip, and others. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to $2^n$ different states simultaneously, whereas a traditional computer can only be in one of these states at any one time. A quantum Turing machine is a theoretical model of such a computer.

Figure 4:
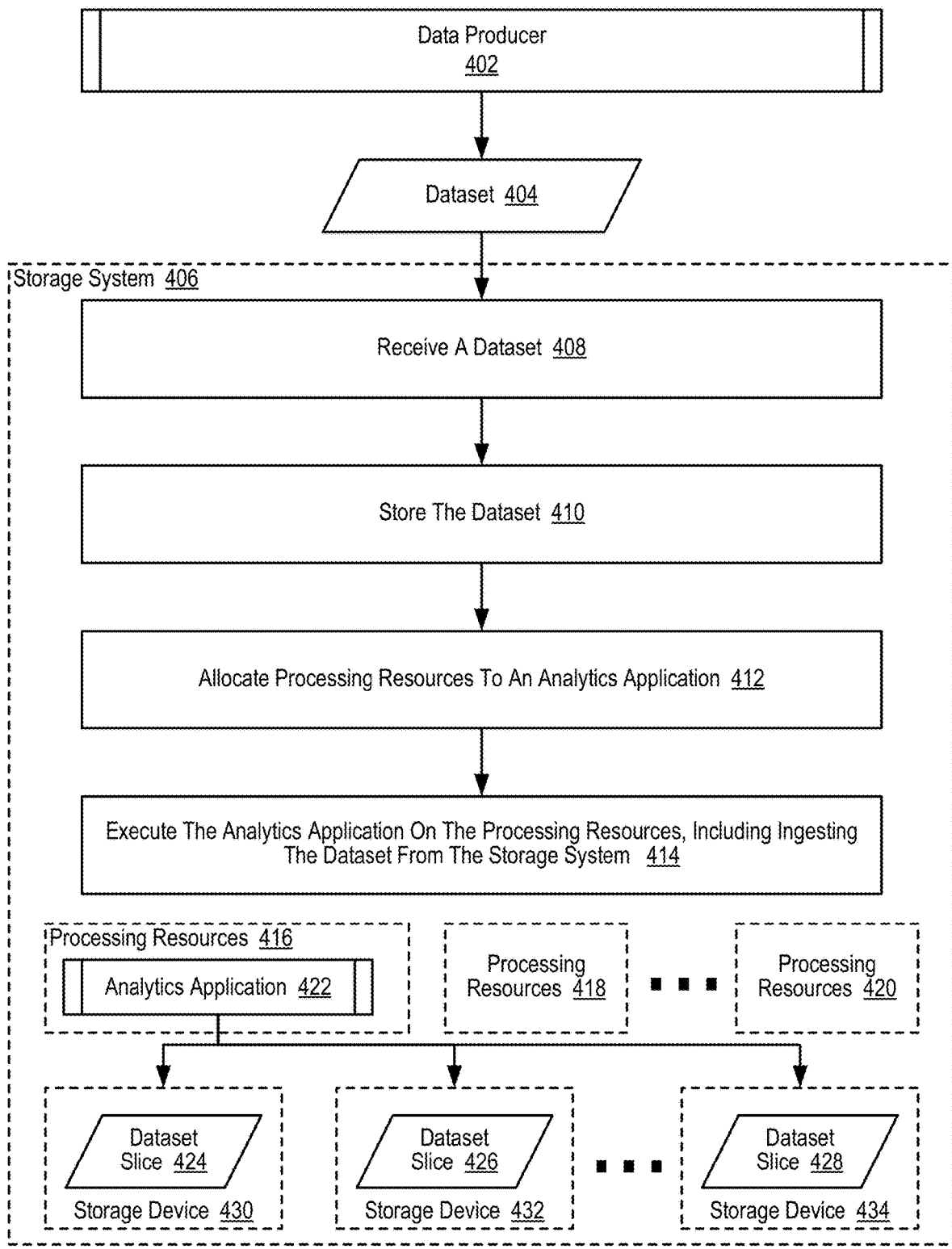
FIG. 4 sets forth a flow chart illustrating an example method for executing a big data analytics pipeline in a storage system that includes compute resources and shared storage resources according to some embodiments of the present disclosure.

For further explanation, FIG. 4 sets forth a flow chart illustrating an example method for executing a big data analytics pipeline in a storage system that includes compute resources and shared storage resources according to some embodiments of the present disclosure. Although depicted in less detail, the storage system (406) depicted in FIG. 4 may be similar to the storage systems described above with reference to FIGS. 1A-1D, FIGS. 2A-2G, FIGS. 3A-3B, or any combination thereof. In fact, the storage system depicted in FIG. 4 may include the same, fewer, additional components as the storage systems described above.

The storage system (406) depicted in FIG. 4 is illustrated as including compute resources in the form of processing resources (416, 418, 420). The processing resources (416, 418, 420) may be embodied, for example, as physical resources such as one or more computer processors or as virtualized resources such as a virtual machine, container, or some other virtualized component that can be used to execute a software application. The storage system (406) depicted in FIG. 4 is also illustrated as including shared storage resources in the form of storage devices (430, 432, 434). The storage devices (430, 432, 434) may be embodied, for example, as one or more SSDs, HDDs, or other storage device.

The example method depicted in FIG. 4 includes receiving (408), from a data producer (402), a dataset (404). The data producer (402) depicted in FIG. 4 may be embodied, for example, as a simulation of a storage system that is executed in order to test hardware and software components within the storage system that is being tested. Consider an example in which software for a storage system is developed and tested utilizing a continuous integration ('CI') model in which all developer working copies of system software are frequently merged to a shared mainline. In such an example, such software may be tested by running a simulation of the storage system and running automated tests against the simulated storage system, thereby generating a very large dataset (404) that consisted of log files, error logs, or some other form of data that describes the operational state of the simulated storage system.

In the example method depicted in FIG. 4, receiving (408) the dataset (404) from the data producer (402) may be carried out, for example, by receiving the dataset as it is generated by the data producer (402), by periodically polling a location that the data producer (402) writes the dataset to, or in other ways. In fact, although the data producer (402) is depicted as residing outside of the storage system (406) in the embodiment depicted in FIG. 4, in other embodiments, the data producer (402) may actually be executing on the storage system (406) itself and may even write the dataset directly to storage resources within the storage system (406).

The example method depicted in FIG. 4 also includes storing (410), within the storage system (406), the dataset (404). In the example method depicted in FIG. 4, the dataset (404) is depicted as being stored within the storage system (406) in multiple slices (424, 426, 428). In such an example, a first slice (424) may represent a first portion of the dataset, a second slice (426) may represent a second portion of the dataset, a third slice (428) may represent a third portion of the dataset, where RAID or RAID-like techniques are used to provide for data redundancy in the event that one or more of the storage devices becomes unavailable. As such, parity data may also be maintained on the storage system (406), such that the dataset slices (424, 426, 428) and any parity data form a RAID stripe. Readers will appreciate that the dataset (404) may be stored in other ways and that the dataset (404) may be stored (410) within the storage system (406) by the data producer (402) itself accessing the storage system (406), by system software and system hardware on the storage system causing the dataset (404) (or the slices thereof) to be written to storage devices (430, 432, 434) in the storage system (406), or in some other way.

The example method depicted in FIG. 4 also includes allocating (412) processing resources (416) to an analytics application (422). The analytics application (422) depicted in FIG. 4 may be embodied, for example, as an application that examines datasets in order to draw conclusions about the information contained in the datasets, including drawing conclusions about the data producer (402). The analytics application (422) may include artificial intelligence or machine learning components, components that transform unstructured data into structured or semi-structured data, big data components, and many others.

In the example method depicted in FIG. 4, allocating (412) processing resources (416) to an analytics application (422) may be carried out, for example, by allocating physical resources within the storage system (406) for use by the analytics application (422). For example, one or more computer processors may be allocated for use by the analytics application (422) such that the analytics application (422) is executing on the one or more computer processors. Alternatively, allocating (412) processing resources (416) to an analytics application (422) may be carried out by allocating virtualized physical resources within the storage system (406) for use by the analytics application (422). For example, one or more virtual machines may be allocated for use by the analytics application (422) such that the analytics application (422) is executing on the one or more virtual machines. Likewise, allocating (412) processing resources (416) to an analytics application (422) may be carried out through the use of one or more containers, such that the analytics application (422) is deployed and executed within the one or more containers.

In the example method depicted in FIG. 4, executing (414) the analytics application (422) on the processing resources (416) includes ingesting the dataset (404) from the storage system (406). In such an example, the analytics application (422) can ingest the dataset (404) from the storage system (406) by reading the dataset (404) from the storage system (406) after it has been stored within the storage system (406). Readers will appreciate that, because the dataset (404) is stored within shared storage, the analytics application (422) does not need to retain a copy of the dataset in storage (e.g., direct-attached storage) that is only accessible by the processing resources that are being used to execute the analytics application (422).

Figure 5:
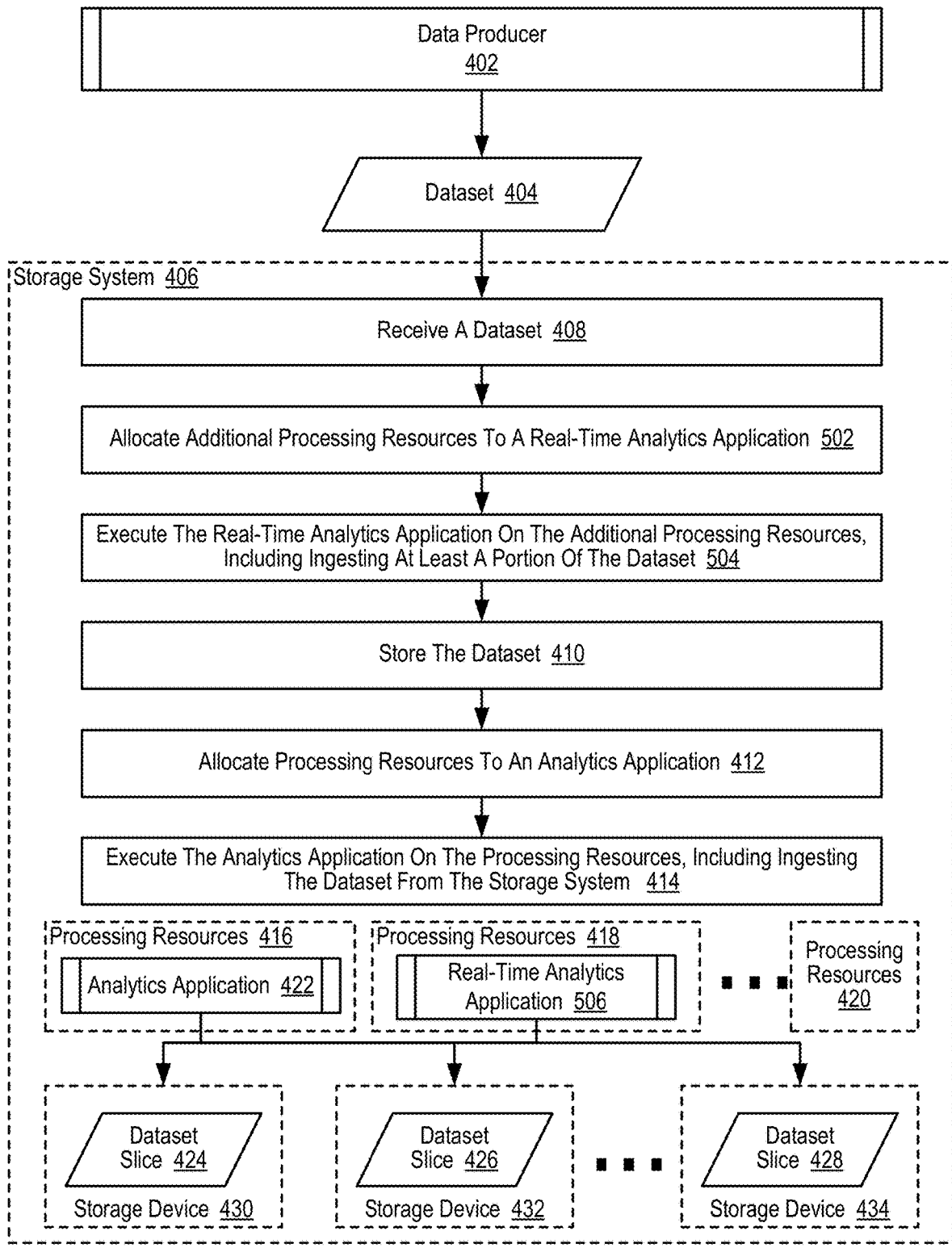
FIG. 5 sets forth a flow chart illustrating an additional example method for executing a big data analytics pipeline in a storage system that includes compute resources and shared storage resources according to some embodiments of the present disclosure.

For further explanation, FIG. 5 sets forth a flow chart illustrating an additional example method for executing a big data analytics pipeline in a storage system that includes compute resources and shared storage resources according to some embodiments of the present disclosure. The example method depicted in FIG. 5 is similar to the example method depicted in FIG. 4, as the example method depicted in FIG. 5 also includes receiving (408) a dataset (404) from a data producer (402), storing (410) the dataset (404) within the storage system (406), allocating (412) processing resources (416) to an analytics application (422), and executing (414) the analytics application (422) on the processing resources (416), including ingesting the dataset (404) from the storage system (406).

The example method depicted in FIG. 5 also includes allocating (502) additional processing resources (418) to a real-time analytics application (506). The real-time analytics application (506) may be embodied, for example, as an application that examines datasets in order to draw conclusions about the information contained in the datasets, including drawing conclusions about the data producer (402). Much like the analytics application (422), the real-time analytics application (506) may also include artificial intelligence or machine learning components, components that transform unstructured data into structured or semi-structured data, big data components, and many others. Unlike the analytics application (422), however, the real-time analytics application (506) examines datasets as they are generated, rather than analyzing datasets that are more historical in nature.

In the example method depicted in FIG. 5, allocating (502) additional processing resources (418) to the real-time analytics application (506) may be carried out, for example, by allocating physical resources within the storage system (406) for use by the real-time analytics application (506). For example, one or more computer processors may be allocated for use by the real-time analytics application (506) such that the real-time analytics application (506) is executing on the one or more computer processors. Alternatively, allocating (502) additional processing resources (418) to the real-time analytics application (506) may be carried out by allocating virtualized physical resources within the storage system (406) for use by the real-time analytics application (506). For example, one or more virtual machines may be allocated for use by the real-time analytics application (506) such that the real-time analytics application (506) is executing on the one or more virtual machines. Likewise, allocating (502) additional processing resources (418) to the real-time analytics application (506) may be carried out through the use of one or more containers, such that the real-time analytics application (506) is deployed and executed within the one or more containers.

In the example method depicted in FIG. 5, executing (504) the real-time analytics application (506) on the additional processing resources can include ingesting the dataset (404) prior to storing (410) the dataset (404) within the storage system (406). In such an example, the real-time analytics application (506) may, in effect, be part of the data path as the dataset (404) is fed to the real-time analytics application (506) upon receipt by the storage system. Readers will appreciate that in other embodiments, the real-time nature of the real-time analytics application (506) may be enforced in other ways. For example, the real-time analytics application (506) may only consume the portions of the dataset (404) that have been produced within some threshold (e.g., the real-time analytics application (506) may only consume portions of the dataset (404) that have been produced within the last 30 minutes) while the analytics application (422) consumes all other portions of the dataset (404). Readers will appreciate that, because the dataset (404) is stored within shared storage, the analytics application (422) and the real-time analytics application (506) do not need to retain copies of the dataset in storage (e.g., direct-attached storage) that is only accessible by the processing resources that are being used to execute the analytics application (422) or the real-time analytics application (506). In fact, the analytics application (422) and the real-time analytics application (506) may be reading their respective portions of the dataset (404) from a single copy of the dataset (404) that is stored within the storage system (406).

Figure 6:
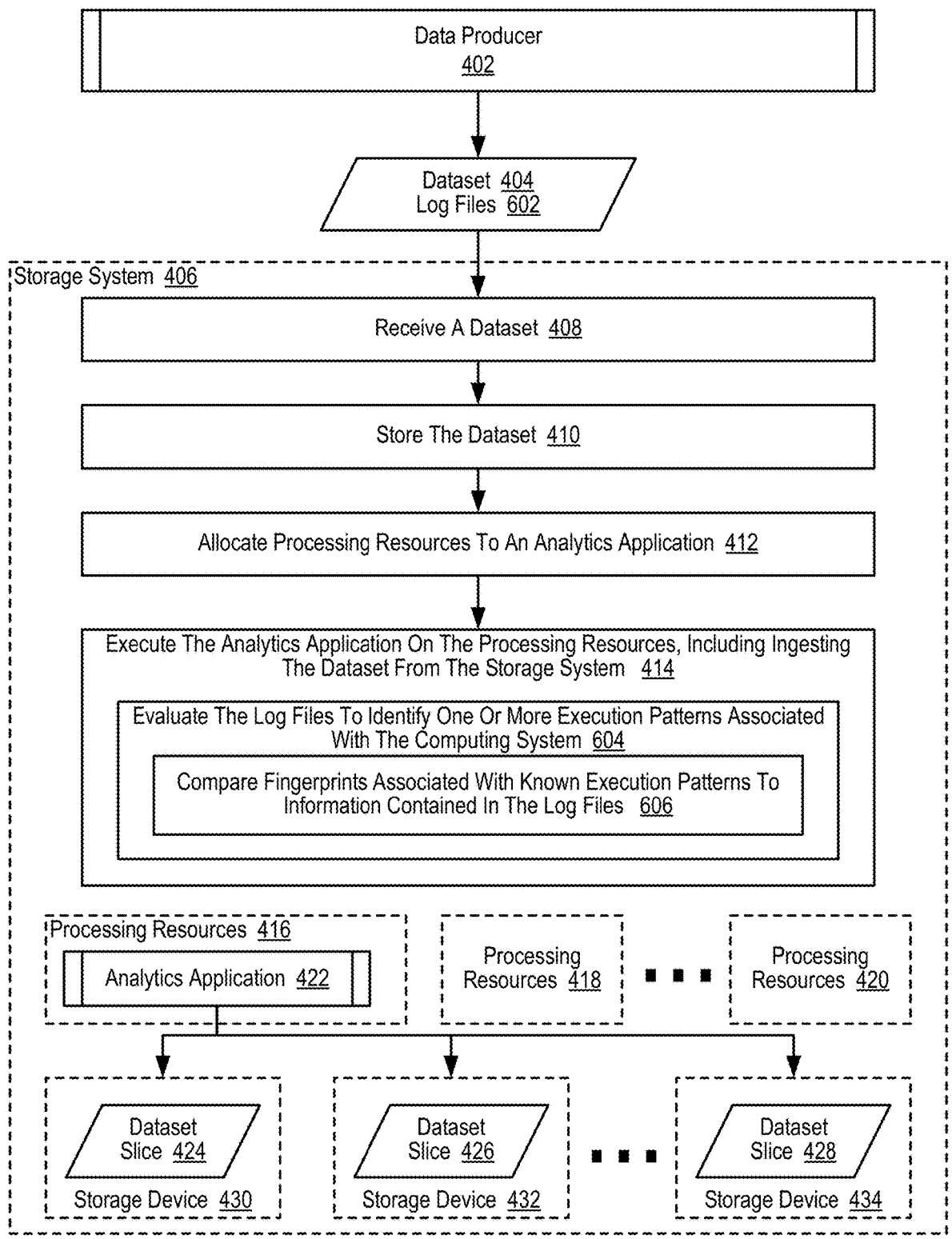
FIG. 6 sets forth a flow chart illustrating an additional example method for executing a big data analytics pipeline in a storage system that includes compute resources and shared storage resources according to some embodiments of the present disclosure.

For further explanation, FIG. 6 sets forth a flow chart illustrating an additional example method for executing a big data analytics pipeline in a storage system that includes compute resources and shared storage resources according to some embodiments of the present disclosure. The example method depicted in FIG. 6 is similar to the example method depicted in FIG. 4, as the example method depicted in FIG. 6 also includes receiving (408) a dataset (404) from a data producer (402), storing (410) the dataset (404) within the storage system (406), allocating (412) processing resources (416) to an analytics application (422), and executing (414) the analytics application (422) on the processing resources (416), including ingesting the dataset (404) from the storage system (406).

In the example method depicted in FIG. 6, the dataset (404) includes log files (602) describing one or more execution states of a computing system. In the example depicted in FIG. 6, the computing system whose execution states are described in the log files (602) may be embodied, for example, as a storage system that is being tested as a part of a software development and testing process. In such an example, the log files (602) may include information describing how the storage system is operating in response to a test suite being executed on the storage system.

In the example method depicted in FIG. 6, executing (414) the analytics application (422) on the processing resources (416) can include evaluating (604) the log files (602) to identify one or more execution patterns associated with the computing system. Continuing with the example described above in which the computing system whose execution states are described in the log files (602) is embodied as a storage system that is being tested as a part of a software development and testing process, the log files (602) may include information such as the amount of time that each read or write took to complete, information that indicates the number of IOPS that were being serviced, and so on. In such an example, evaluating (604) the log files (602) to identify one or more execution patterns associated with the computing system may include examining the log files (602) to determine the average amount of time that each read or write took to complete and whether the average amount of time that each read or write took to complete was acceptable, examining the log files (602) to determine whether the average amount of time that each read or write took to complete was trending up or down, examining the log files (602) to determine whether the average amount of time that each read or write took to complete was acceptable at varying levels of load, and so on. In fact, the one or more execution patterns associated with the computing system can focus on a wide range of metrics and can be used to examine many aspects of system health, system operation, and so on.

In the example method depicted in FIG. 6, evaluating (604) the log files (602) to identify one or more execution patterns associated with the computing system can include comparing (606) fingerprints associated with known execution patterns to information contained in the log files (602). In such an example, the fingerprints that are associated with known execution patterns may include information such as, for example, ranges for one or more metrics that are associated with some particular known execution pattern, a pattern of alerts that are associated with some particular known execution pattern, and so on. For example, a particular sequence of alerts may have been identified as being associated with a computing system that is about to fail, and as such, a fingerprint may exist that includes the particular sequence of alerts, such that the log files (602) may be examined to determine whether the particular sequence of alerts contained in the fingerprint are also found in the log files (602), thereby indicating that the system under test may be about to fail. In the example method depicted in FIG. 6, the fingerprints associated with known execution patterns may include multi-line fingerprints, where multiple lines of a log file are examined to determine whether the log files contain a particular fingerprint. Likewise, fingerprints can include sequences and combinations of events such that a match is identified only if a sequence or combination of events is identified in the log files (602).

Figure 7:
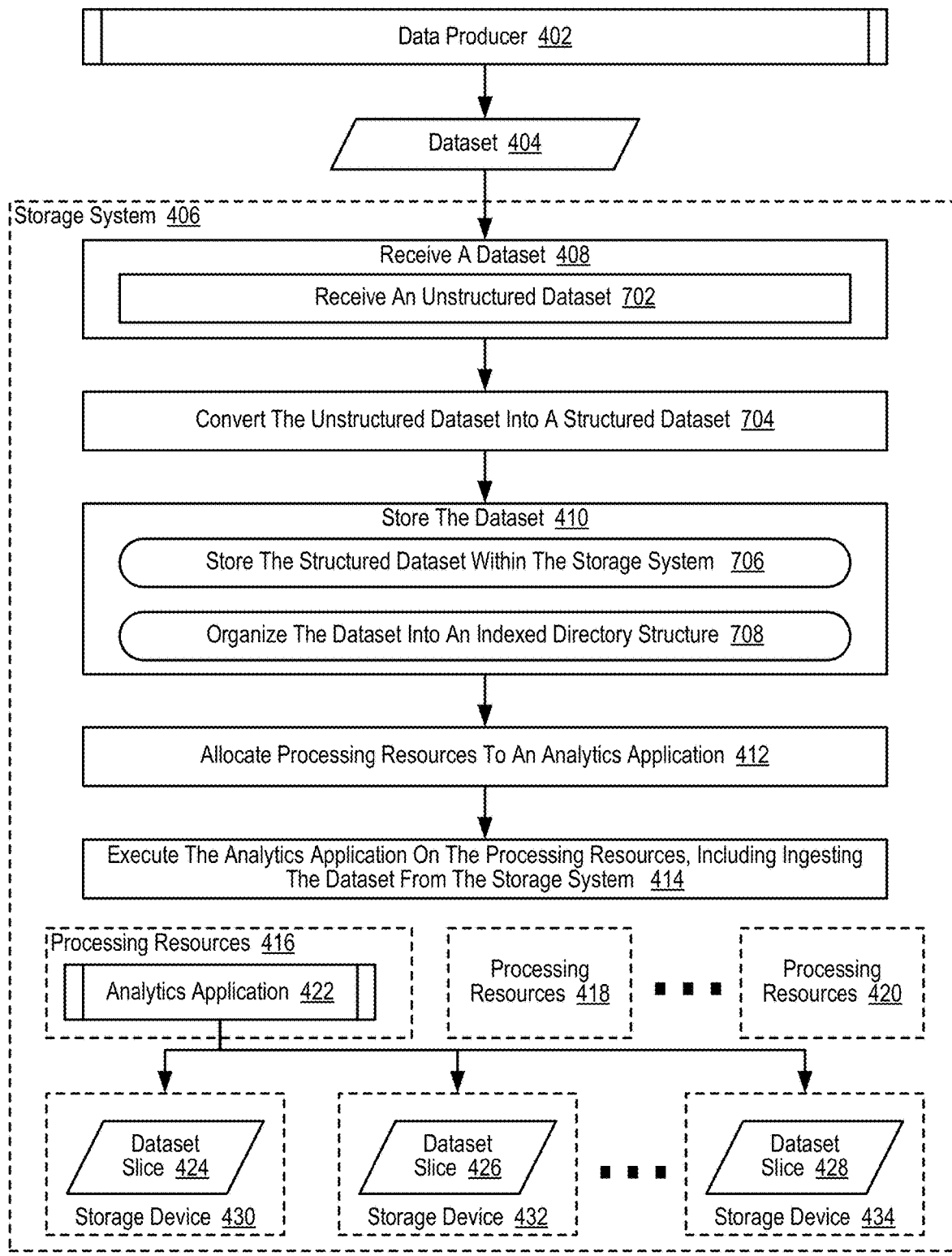
FIG. 7 sets forth a flow chart illustrating an additional example method for executing a big data analytics pipeline in a storage system that includes compute resources and shared storage resources according to some embodiments of the present disclosure.

For further explanation, FIG. 7 sets forth a flow chart illustrating an additional example method for executing a big data analytics pipeline in a storage system that includes compute resources and shared storage resources according to some embodiments of the present disclosure. The example method depicted in FIG. 7 is similar to the example method depicted in FIG. 4, as the example method depicted in FIG. 7 also includes receiving (408) a dataset (404) from a data producer (402), storing (410) the dataset (404) within the storage system (406), allocating (412) processing resources (416) to an analytics application (422), and executing (414) the analytics application (422) on the processing resources (416), including ingesting the dataset (404) from the storage system (406).

In the example method depicted in FIG. 7, storing (410) the dataset (404) within the storage system (406) can include organizing (708) the dataset into an indexed directory structure. In such an example, the indexed directory structure may be created by storing data in such a way so as to facilitate fast and accurate searching of the directory structure. In fact, large datasets such as the log files that are generated during testing may be generated with names that include things like a timestamp, an identification of the cluster that generated the log file, and so on and organized in the directory structure according to some indexing scheme. As such, the indexed file system may essentially be used as a database that can be quickly searched, but without the limitations of a database that causes databases to perform poorly on very, very large datasets.

In the example method depicted in FIG. 7, receiving (408) a dataset (404) from a data producer (402) can include receiving (702) an unstructured dataset. In the example method depicted in FIG. 7, the unstructured dataset may include unstructured data that either does not have a pre-defined data model or is not organized in a pre-defined manner. Such unstructured information, as is often contained in log files, is typically text-heavy for ease of understanding by a human (e.g., a system administrator) that is tasked with reviewing the log files. Unstructured data, however, frequently has irregularities and ambiguities that make it difficult to understand using traditional programs as compared to structured data such as data stored in fielded form in databases or annotated in documents.

The example method depicted in FIG. 7 also includes converting (704) the unstructured dataset into a structured dataset. In the example method depicted in FIG. 7, a structured dataset includes structured (or semi-structured) data where data can reside in a fixed field within a record or file. In such an example, the structured dataset can include information with a high degree of organization, such that inclusion in a relational database (or similar data repository) is seamless and readily searchable by simple, straightforward search engine algorithms or other search operations.

In the example method depicted in FIG. 7, converting (704) the unstructured dataset into a structured dataset may be carried out, for example, through the use of techniques such as data mining, natural language processing (NLP), and text analytics to find patterns in, or otherwise interpret, the unstructured data. Techniques for structuring text can involve tagging unstructured data with metadata. In such embodiments, software that creates machine-processable structure can utilize the linguistic, auditory, and visual structure that exist in various forms of human communication and algorithms can infer this inherent structure from text, for instance, by examining word morphology, sentence syntax, and so on. In such an example, unstructured information can be enriched and tagged to address ambiguities and relevancy-based techniques then used to facilitate search and discovery. In the example method depicted in FIG. 7, storing (410) the dataset (404) within the storage system (406) can include storing (706) the structured dataset within the storage system.

Figure 8A:
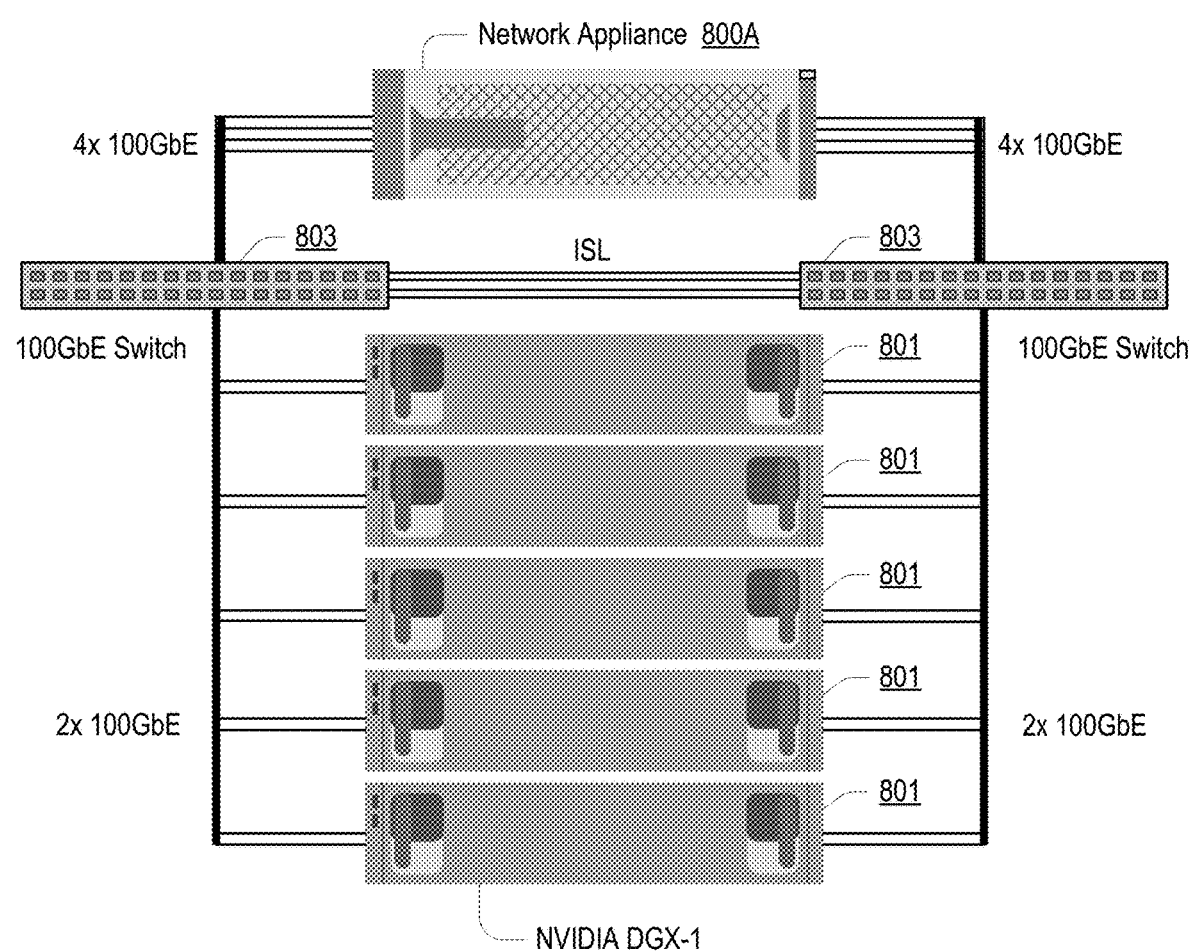
FIG. 8A sets forth a diagram illustrating an example computer architecture for implementing an artificial intelligence and machine learning infrastructure configured to fit within a single chassis according to some embodiments of the present disclosure.

For further explanation, FIG. 8A sets forth a diagram illustrating an example computer architecture for implementing an artificial intelligence and machine learning infrastructure (800) (also referred to herein as an 'artificial infrastructure') that is configured to fit within a single chassis (not depicted) according to some embodiments of the present disclosure. While in this example, the communication fabric includes a set of network switches (803) for interconnecting a network appliance (800A) with the one or more GPU system(s) (801), and for the artificial intelligence and machine learning infrastructure (800) to communicate with one or more computing devices over one or more networks, in other implementations, the communication fabric may be architected to define different communication paths between the network appliance (800A) and the GPU system(s) (801), and one or more computing devices or host computer systems.

In this example artificial intelligence and machine learning infrastructure (800), the network appliance (800A) may be a storage system that includes one or more storage devices, and the GPU systems (801) may be, in this example, five (5) NVIDIA DGX-1 GPU systems. In this example, the network appliance (800A) may be connected to two switches (803) using, respectively, four, 100 GbE connections, where each switch (801) may be connected to each GPU system (801) by two 100 GbE connections—resulting in each of the GPU system (801) having four (4) 100 GbE connections to the network appliance (800A).

Figure 8B:
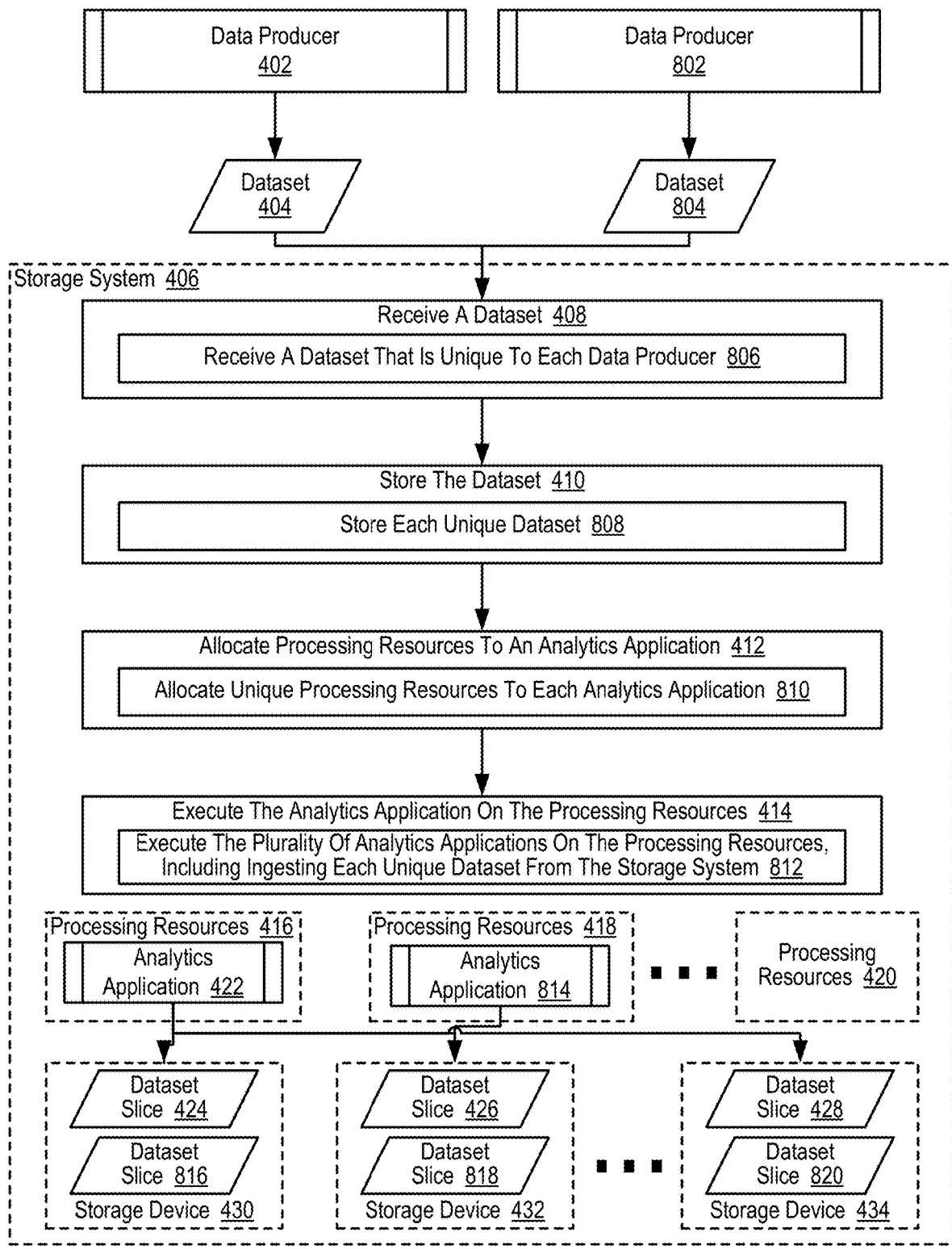
FIG. 8B sets forth a flow chart illustrating an additional example method for executing a big data analytics pipeline in a storage system that includes compute resources and shared storage resources according to some embodiments of the present disclosure.

For further explanation, FIG. 8B sets forth a flow chart illustrating an additional example method for executing a big data analytics pipeline in a storage system that includes compute resources and shared storage resources according to some embodiments of the present disclosure. The example method depicted in FIG. 8B is similar to the example method depicted in FIG. 4, as the example method depicted in FIG. 8B also includes receiving (408) a dataset (404) from a data producer (402), storing (410) the dataset (404) within the storage system (406), allocating (412) processing resources (416) to an analytics application (422), and executing (414) the analytics application (422) on the processing resources (416), including ingesting the dataset (404) from the storage system (406).

In the example method depicted in FIG. 8B, receiving (408) a dataset (404) from a data producer (402) can include receiving (806), from a plurality of data producers (402, 802), a dataset (404, 804) that is unique to each data producer. The data producers (402, 802) depicted in FIG. 8B may be embodied, for example, as simulations of multiple storage system that is executed in order to test hardware and software components within the storage system that is being tested. For example, the first data producer (402) may be a simulated version of a first storage system and the second data producer (802) may be a simulation of a second storage system. In the example method depicted in FIG. 8B, receiving (806) a dataset (404, 804) that is unique to each data producer may be carried out, for example, by receiving each dataset as it is generated by the respective data producer (402, 802), by periodically polling a location that each data producer (402, 802) writes the dataset to, or in other ways. In fact, although the data producers (402, 802) are depicted as residing outside of the storage system (406) in the embodiment depicted in FIG. 8B, in other embodiments, one or more of the data producers (402, 802) may actually be executing on the storage system (406) itself and may even write the dataset directly to storage resources within the storage system (406).

In the example method depicted in FIG. 8B, storing (410) the dataset (404) within the storage system (406) can include storing (808), within the storage system (406), each unique dataset (404, 804). In the example method depicted in FIG. 8B, each unique dataset (404, 804) is depicted as being stored within the storage system (406) in multiple slices (424, 426, 428, 816, 818, 820). For example, a first dataset (404) is stored as a first set of slices (424, 426, 428) and a second dataset (804) is stored as a second set of slices (816, 818, 820). In such an example, each slice may represent a distinct portion of the dataset, where RAID or RAID-like techniques are used to provide for data redundancy that one or more of the storage devices becomes unavailable. As such, parity data may also be maintained on the storage system (406), such that the dataset slices (424, 426, 428, 816, 818, 820) and any parity data form a RAID stripe. Readers will appreciate that each dataset (404, 804) may be stored in other ways and that each dataset (404, 804) may be stored (808) within the storage system (406) by the data producer (402, 802) itself accessing the storage system (406), by system software and system hardware on the storage system causing each dataset (404, 804) (or the slices thereof) to be written to storage devices (430, 432, 434) in the storage system (406), or in some other way.

In the example method depicted in FIG. 8B, allocating (412) processing resources (416) to an analytics application (422) can include allocating (810) unique processing resources (416, 418) to each of a plurality of analytics applications (422, 814). In the example method depicted in FIG. 8B, allocating (810) unique processing resources (416, 418) to each of a plurality of analytics applications (422, 814) may be carried out, for example, by allocating physical resources within the storage system (406) for use by the analytics applications (422, 814). For example, a first computer processor may be allocated for use by a first analytics application (422) such that the analytics application (422) is executing on the first computer processor and a second computer processor may be allocated for use by a second analytics application (814) such that the analytics application (814) is executing on the second computer processor. Alternatively, allocating (810) unique processing resources (416, 418) to each of a plurality of analytics applications (422, 814) may be carried out by allocating virtualized physical resources within the storage system (406) for use by each of the analytics applications (422, 814). For example, a first set of virtual machines may be allocated for use by a first analytics application (422) such that the analytics application (422) is executing on the first set of virtual machines and a second set of virtual machines may be allocated for use by a second analytics application (814) such that the analytics application (814) is executing on the second set of virtual machines. Likewise, allocating (810) unique processing resources (416, 418) to each of a plurality of analytics applications (422, 814) may be carried out through the use of containers, such that a first analytics application (422) is deployed and executed within a first container and a second analytics application (814) is deployed and executed within a second container.

In the example method depicted in FIG. 8B, executing (414) the analytics application (422) on the processing resources (416) can include executing (812) the plurality of analytics applications (422, 814) on the processing resources (416, 418), including ingesting each unique dataset (404, 804) from the storage system (406). In such an example, a first analytics application (422) can ingest a first dataset (404) from the storage system (406) by reading the dataset (404) from the storage system (406) after it has been stored within the storage system (406) and a second analytics application (814) can ingest a second dataset (804) from the storage system (406) by reading the dataset (804) from the storage system (406) after it has been stored within the storage system (406). Readers will appreciate that, because the dataset (404) is stored within shared storage, neither analytics application (422, 814) will need to retain a copy of the dataset in storage (e.g., direct-attached storage) that is only accessible by the processing resources that are being used to execute the analytics application (422, 814).

Figure 9:
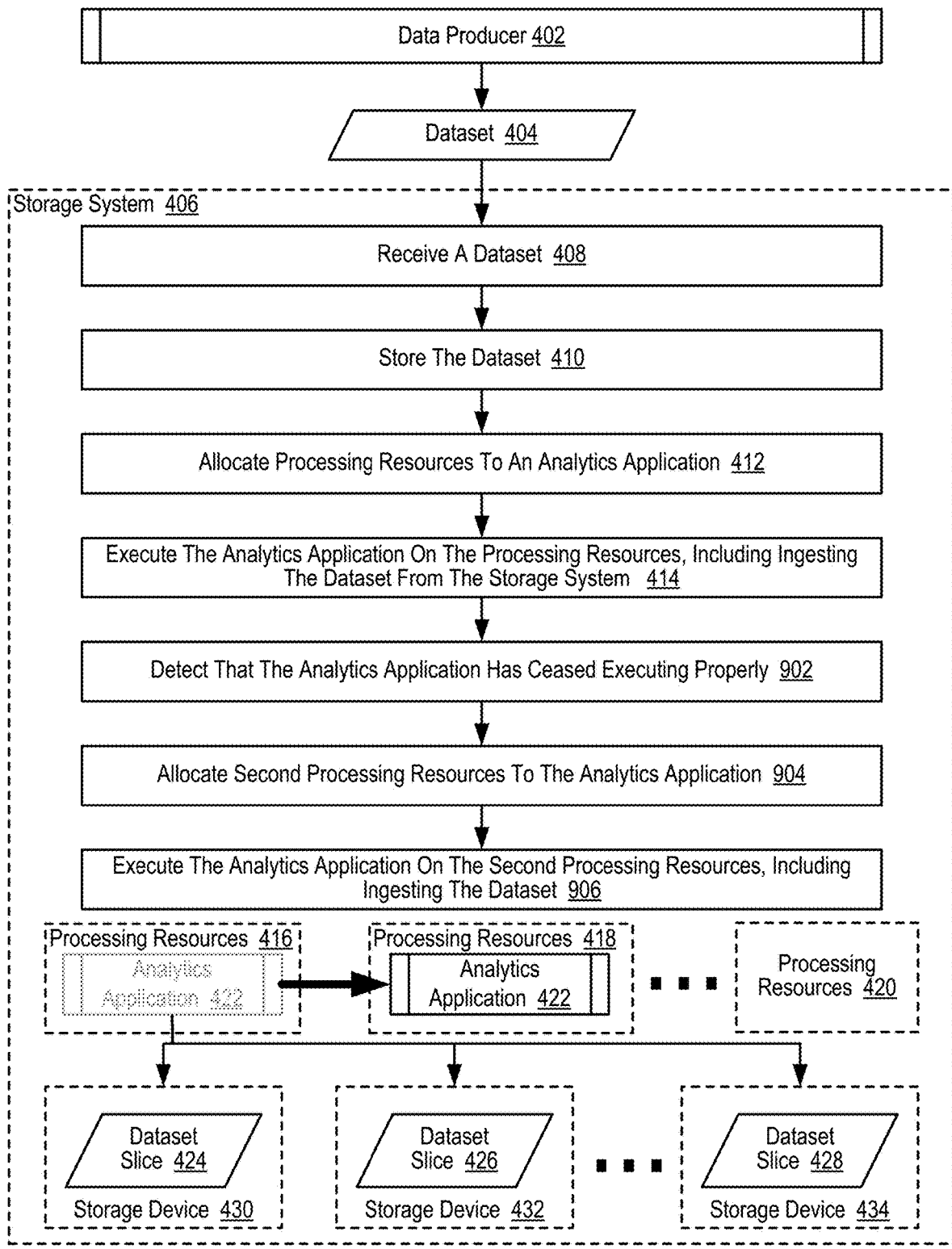
FIG. 9 sets forth a flow chart illustrating an additional example method for executing a big data analytics pipeline in a storage system that includes compute resources and shared storage resources according to some embodiments of the present disclosure.

For further explanation, FIG. 9 sets forth a flow chart illustrating an additional example method for executing a big data analytics pipeline in a storage system that includes compute resources and shared storage resources according to some embodiments of the present disclosure. The example method depicted in FIG. 9 is similar to the example method depicted in FIG. 4, as the example method depicted in FIG. 9 also includes receiving (408) a dataset (404) from a data producer (402), storing (410) the dataset (404) within the storage system (406), allocating (412) processing resources (416) to an analytics application (422), and executing (414) the analytics application (422) on the processing resources (416), including ingesting the dataset (404) from the storage system (406).

The example method depicted in FIG. 9 also includes detecting (902) that the analytics application (422) has ceased executing properly. Detecting (902) that the analytics application (422) has ceased executing properly may be carried out, for example, by detecting that the analytics application (422) has crashed, by detecting that the analytics application (422) has become unresponsive, by detecting that the processing resources that the analytics application (422) is executing on have become unavailable, or in other ways. In such an example, the storage system (406) can detect (902) that the analytics application (422) has ceased executing properly through the use of a heartbeat mechanism, by detecting an absence of messaging or reporting from the analytics application (422), or through the use of a similar mechanism.

The example method depicted in FIG. 9 also includes allocating (904) second processing resources (418) to the analytics application (422). In the example method depicted in FIG. 9, allocating (904) second processing resources (418) to the analytics application (422) may be carried out, for example, by allocating physical resources within the storage system (406) for use by the analytics application (422). For example, one or more computer processors may be allocated for use by the analytics application (422) such that the analytics application (422) is executing on the one or more computer processors. Alternatively, allocating (904) second processing resources (418) to the analytics application (422) may be carried out by allocating virtualized physical resources within the storage system (406) for use by the analytics application (422). For example, one or more virtual machines may be allocated for use by the analytics application (422) such that the analytics application (422) is executing on the one or more virtual machines. Likewise, allocating (904) second processing resources (418) to the analytics application (422) may be carried out through the use of one or more containers, such that the analytics application (422) is deployed and executed within the one or more containers.

The example method depicted in FIG. 9 also includes executing (906) the analytics application (422) on the second processing resources (418), including ingesting the dataset (404). In such an example, the analytics application (422) can ingest the dataset (404) from the storage system (406) by reading the dataset (404) from the storage system (406) after it has been stored within the storage system (406). Readers will appreciate that, because the dataset (404) is stored within shared storage, the analytics application (422) does not need to retain a copy of the dataset in storage (e.g., direct-attached storage) that is only accessible by the processing resources that are being used to execute the analytics application (422).

Figure 10:
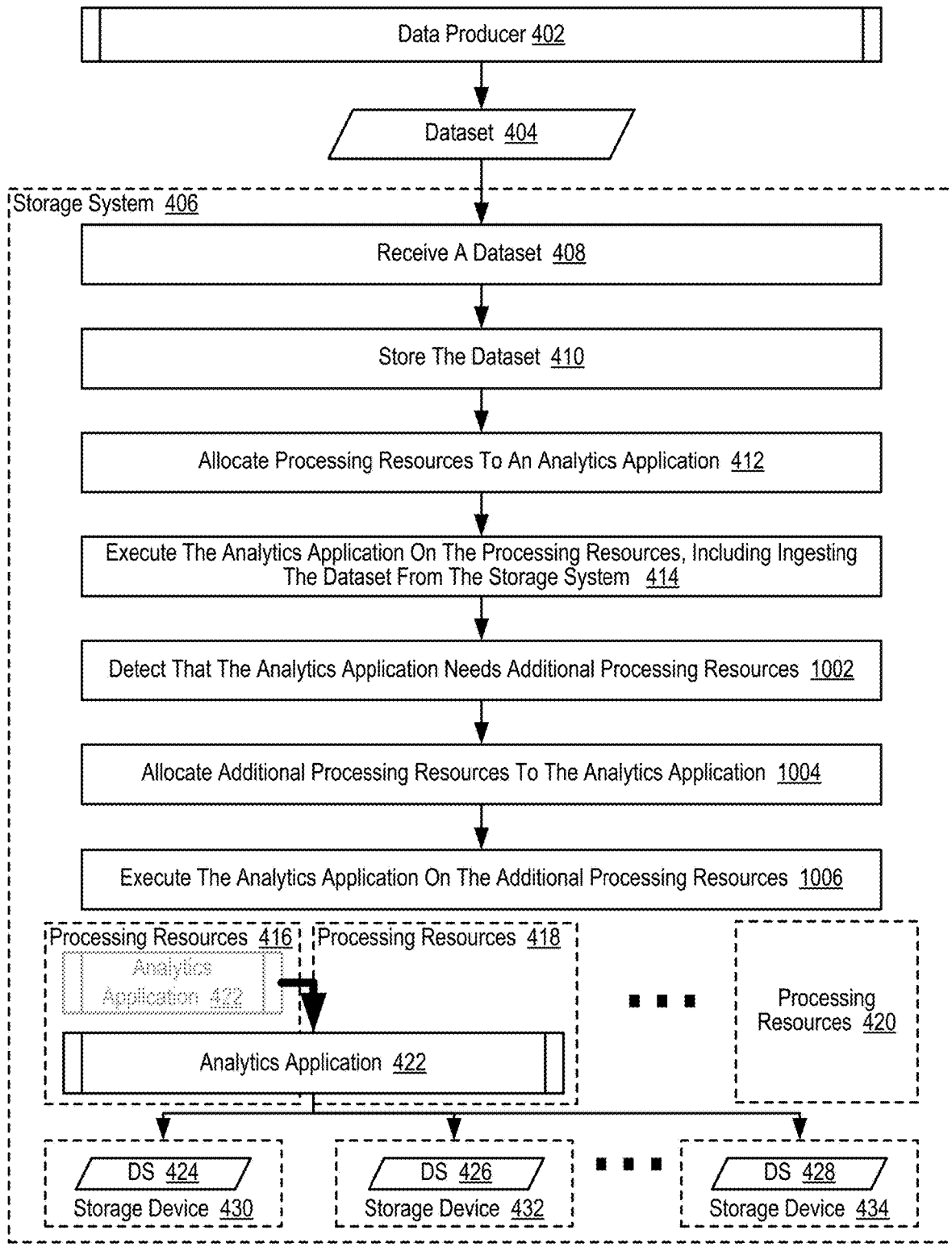
FIG. 10 sets forth a flow chart illustrating an additional example method for executing a big data analytics pipeline in a storage system that includes compute resources and shared storage resources according to some embodiments of the present disclosure.

For further explanation, FIG. 10 sets forth a flow chart illustrating an additional example method for executing a big data analytics pipeline in a storage system that includes compute resources and shared storage resources according to some embodiments of the present disclosure. The example method depicted in FIG. 10 is similar to the example method depicted in FIG. 4, as the example method depicted in FIG. 10 also includes receiving (408) a dataset (404) from a data producer (402), storing (410) the dataset (404) within the storage system (406), allocating (412) processing resources (416) to an analytics application (422), and executing (414) the analytics application (422) on the processing resources (416), including ingesting the dataset (404) from the storage system (406).

The example method depicted in FIG. 10 also includes detecting (1002) that the analytics application (422) needs additional processing resources. Detecting (1002) that the analytics application (422) needs additional processing resources may be carried out, for example, by detecting that the processing resources upon which the analytics application (422) is executing are fully utilized or that utilization has reached a threshold level, by detecting that the analytics application (422) has become unresponsive, slow to respond to messages, slow to report findings, or is otherwise exhibiting some behavior that is associated with a lack of sufficient processing resources, or in some other way.

The example method depicted in FIG. 10 also includes allocating (1004) additional processing resources (418) to the analytics application (422). In the example method depicted in FIG. 10, allocating (1004) additional processing resources (418) to the analytics application (422) may be carried out, for example, by allocating additional physical resources within the storage system (406) for use by the analytics applications (422). For example, a first computer processor may initially be allocated for use by the analytics application (422) such that the analytics application (422) is executing on the first computer processor. In such an example, a second computer processor may additionally be allocated for use by the analytics application (422) such that the analytics application (422) is executing on both the first computer processor and the second computer processor. Alternatively, allocating (1004) additional processing resources (418) to the analytics application (422) may be carried out by allocating additional virtualized physical resources within the storage system (406) for use by the analytics applications (422). For example, a first set of virtual machines may be initially allocated for use by the analytics application (422) such that the analytics application (422) is executing on the first set of virtual machines. In such an example, a second set of virtual machines may be additionally allocated for use by the analytics application (422) such that the analytics application (422) is executing on both the first set of virtual machines and the second set of virtual machines. Likewise, allocating (1004) additional processing resources (418) to the analytics application (422) may be carried out through the use of containers, such that an analytics application (422) is initially deployed and executed within a first container and a second container is subsequently utilized to support the analytics application (422).

The example method depicted in FIG. 10 also includes executing (1006) the analytics application (422) on the additional processing resources (418). Readers will appreciate that although the embodiments described above relate to embodiments where instances of the analytics application (422) are executed on multiple processing resources (416, 418), in other embodiments different processing resources (416, 418) instead be used to execute various portions of the analytics application (422). For example, a first portion of the analytics application (422) may execute on a first set of processing resources (416) and a second portion of the analytics application (422) may execute on a second set of processing resources (418). Readers will further appreciate that the shared nature of the storage that is utilized by the analytics application (422) results in more efficient scalability, as the application can be scaled up (i.e., more processing resources can be given to the analytics application) without needing to copy the dataset, send the dataset over a network connection, and so on as would be required if the analytics application (422) were executing on a processing node with direct-attached storage where each node maintained its own copy of the dataset.

As described above, the analytics application (422) may include artificial intelligence or machine learning components. In fact, the analytics application (422) may be an AI application. Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

A data scientist works to improve the usefulness of the trained model through a wide variety of approaches: more data, better data, smarter training, and deeper models. In many cases, there will be teams of data scientists sharing the same datasets and working in parallel to produce new and improved training models. Often, there is a team of data scientists working within these phases concurrently on the same shared datasets. Multiple, concurrent workloads of data processing, experimentation, and full-scale training layer the demands of multiple access patterns on the storage tier. In other words, storage cannot just satisfy large file reads, but must contend with a mix of large and small file reads and writes. Finally, with multiple data scientists exploring datasets and models, it may be critical to store data in its native format to provide flexibility for each user to transform, clean, and use the data in a unique way. The storage systems described above may provide a natural shared storage home for the dataset, with data protection redundancy (e.g., by using RAID6) and the performance necessary to be a common access point for multiple developers and multiple experiments. Using the storage systems described above may avoid the need to carefully copy subsets of the data for local work, saving both engineering and GPU-accelerated servers use time. These copies become a constant and growing tax as the raw data set and desired transformations constantly update and change.

Readers will appreciate that a fundamental reason why deep learning has seen a surge in success is the continued improvement of models with larger data set sizes. In contrast, classical machine learning algorithms, like logistic regression, stop improving in accuracy at smaller data set sizes. As such, the separation of compute resources and storage resources may also allow independent scaling of each tier, avoiding many of the complexities inherent in managing both together. As the data set size grows or new data sets are considered, a scale out storage system must be able to expand easily. Similarly, if more concurrent training is required, additional GPUs or other compute resources can be added without concern for their internal storage. Furthermore, the storage systems described above may make building, operating, and growing an AI system easier due to the random read bandwidth provided by the storage systems, the ability to of the storage systems to randomly read small files (50 KB) high rates (meaning that no extra effort is required to aggregate individual data points to make larger, storage-friendly files), the ability of the storage systems to scale capacity and performance as either the dataset grows or the throughput requirements grow, the ability of the storage systems to support files or objects, the ability of the storage systems to tune performance for large or small files (i.e., no need for the user to provision filesystems), the ability of the storage systems to support non-disruptive upgrades of hardware and software even during production model training, and for many other reasons.

Small file performance of the storage tier may be critical as many types of inputs, including text, audio, or images will be natively stored as small files. If the storage tier does not handle small files well, an extra step will be required to pre-process and group samples into larger files. Storage, built on top of spinning disks, that relies on SSD as a caching tier, may fall short of the performance needed. Because training with random input batches results in more accurate models, the entire data set must be accessible with full performance. SSD caches only provide high performance for a small subset of the data and will be ineffective at hiding the latency of spinning drives.

Readers will further appreciate that in some embodiments of the present disclosure, big data services may be built-in to the shared storage system such that big data analytics, machine learning, artificial intelligence, and other functionality can be offered as a service. In such an example, big data analytics applications, machine learning applications, artificial intelligence applications, and others may be incorporated into the same (or otherwise accessible) codebase as system software that controls the operation of the storage system, such that the interactions between system hardware, system software, and the additional applications can be optimized. Furthermore, these additional applications can be offered as cogs in an analytics stack to assist users of the storage system in the development and deployment of big data analytics applications, machine learning applications, artificial intelligence applications, and similar applications.

Readers will further appreciate that in some embodiments of the present disclosure, idempotent operations may allow for arbitrary reruns and modification of the analytics pipeline. Through the use of orchestration and containerization related concepts described above, a storage system may present a software layer that runs in idempotent chunks such that a hands-off approach to recovery management may be taken. In such an example, if a dependency graph of jobs were in place where each job had some level of idempotency, changes could be made to a job anywhere in the graph and determinations could be made regarding what jobs would need to be rerun to complete recovery. Furthermore, because additional compute resources may be allocated, the system could automate data changes or execute them from a simple form.

Readers will further appreciate that in some embodiments of the present disclosure, with the addition of heartbeat events or expected data patterns, a storage system could essentially run continuous testing on a data pipeline, take recovery actions, and rerun steps if heartbeats are missing. Because there are many things that can go wrong when analytics are being performed in an environment that includes many hosts with different network and rack configurations, errors can occur and may be hard to detect. Even if errors are not common, they may be hard to detect and hard to trace back to the root cause. As such, embodiments described herein may add continuous monitoring to the outputs of the pipeline by adding fingerprints to be expected, regular events that are expected to occur, and information may be persisted to capture actual system performance. Once anomalies are found, the storage system may attempt to re-collect data, rerun jobs, issue alerts if anomalies are still detected, and otherwise support a self-healing big data analytics pipeline.

Readers will appreciate that although the embodiments described above relate to embodiments where steps may appear to occur according to some order, no ordering is actually required unless explicitly stated. Furthermore, in some embodiments, steps that appear in different figures may actually occur in a single embodiment. That is, the organization of steps that is included above is for ease of explanation, and in no way limits the various embodiments of the concepts described herein. In fact, embodiments of the present disclosure may include any combination of the steps described above and claimed herein. Likewise, embodiments of the present disclosure may be implemented on any of the storage systems, or any combination therefore, described herein.

Figure 11A:
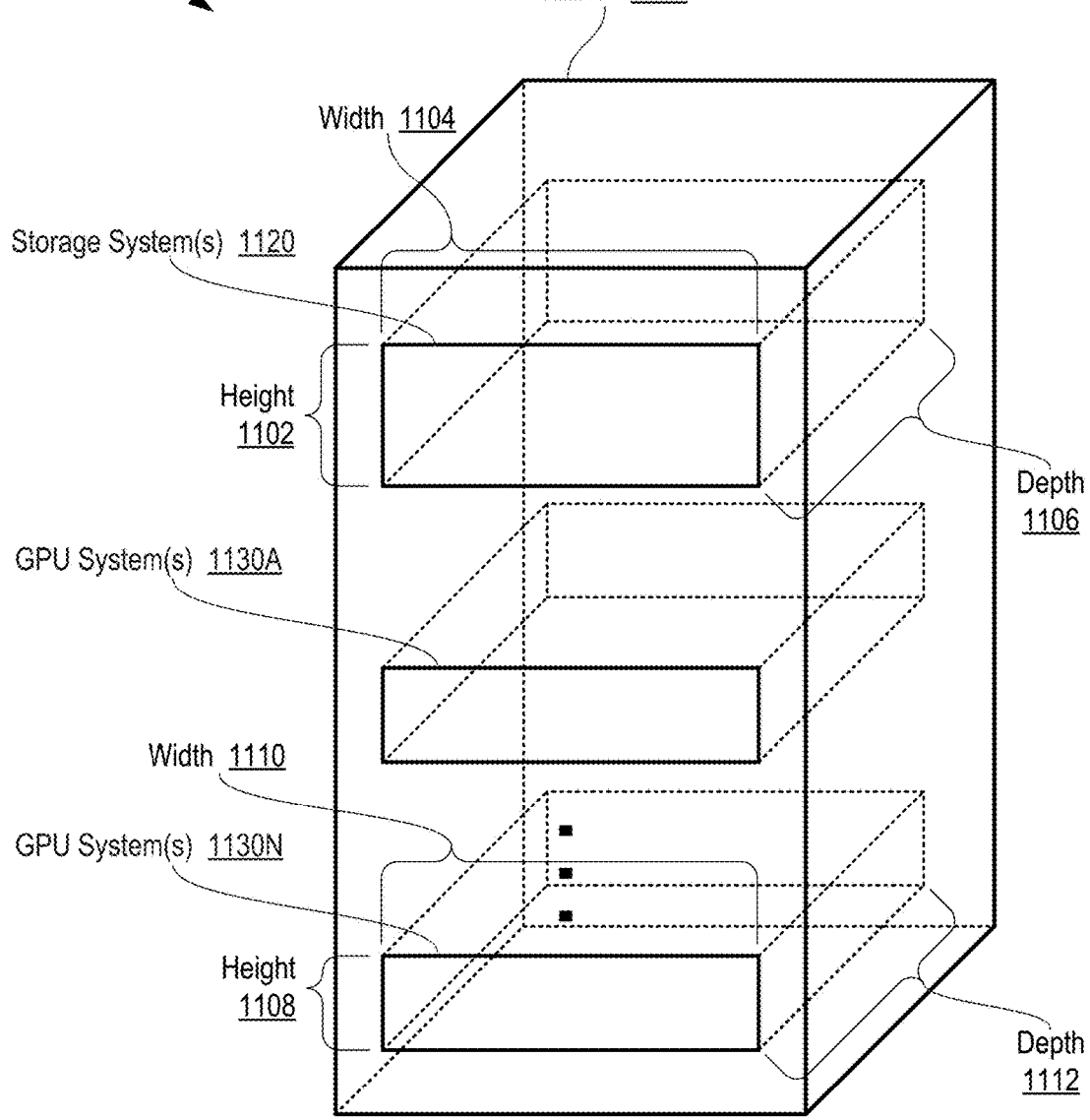
FIG. 11A sets forth a diagram illustrating an example artificial intelligence and machine learning infrastructure according to some embodiments of the present disclosure.

For further explanation, FIG. 11A sets forth a diagram illustrating an example artificial intelligence and machine learning infrastructure (1100) according to some embodiments of the present disclosure. As depicted, the artificial and machine learning infrastructure (1100) may be embodied or implemented entirely within a single chassis (1101). In some examples, the chassis (1101) may be implemented according to the dimensions of a standard rack within a data center—where the single chassis (1101) includes the one or more storage systems (1120), such as any of the storage systems described above or any combination of such storage systems, and where the single chassis (1101) may further include one or more GPU systems (1130A-1130N).

As one example embodiment, the chassis (1101) may include storage system(s) (1120) implemented as one or more Pure™ FlashBlade™ storage systems of flash storage devices or one or more other types of flash storage devices, and the one or more GPU systems (1130A-1130N) may be implemented as one or more NVIDIA™ DGX-1™ GPU architectures or as one or more other GPU architectures. In this example, the GPU architectures may further include multiple GPUs and one or more CPUs—where the GPU architecture may further include onboard system memory. However, in other examples, different combinations of storage systems and GPU architectures may be implemented as an integrated artificial intelligence and machine learning infrastructure within the single chassis (1101).

Further, in some examples, the single chassis (1101) may include one or more length, width, and depth physical dimensions that are smaller or larger than a standard rack size—for example, the single chassis (1101) may be a half rack or smaller. In this example, a rack may be about 42 U, or 6 feet (180 cm) in height, where a "U" unit of measure may be defined as 44.50 millimeters (1.752 in.), and where the rack width may be 19 inches (482.60 mm), and where the depth may be 36 inches (914.40 mm).

In this embodiment, the height (1102) of the storage system(s) (1120) may be 4 U, where the width (1104) and depth (1106) are defined to fit within the physical dimensions of the chassis (1101). Similarly, each of the GPU system(s) (1130A-1130N) may be of the same or different dimensions, where an example height (1108) may be defined to be 1 U or 2 U, and where the width (1110) and depth (1112) may be defined to fit within the physical dimensions of the chassis (1101).

Figure 11B:
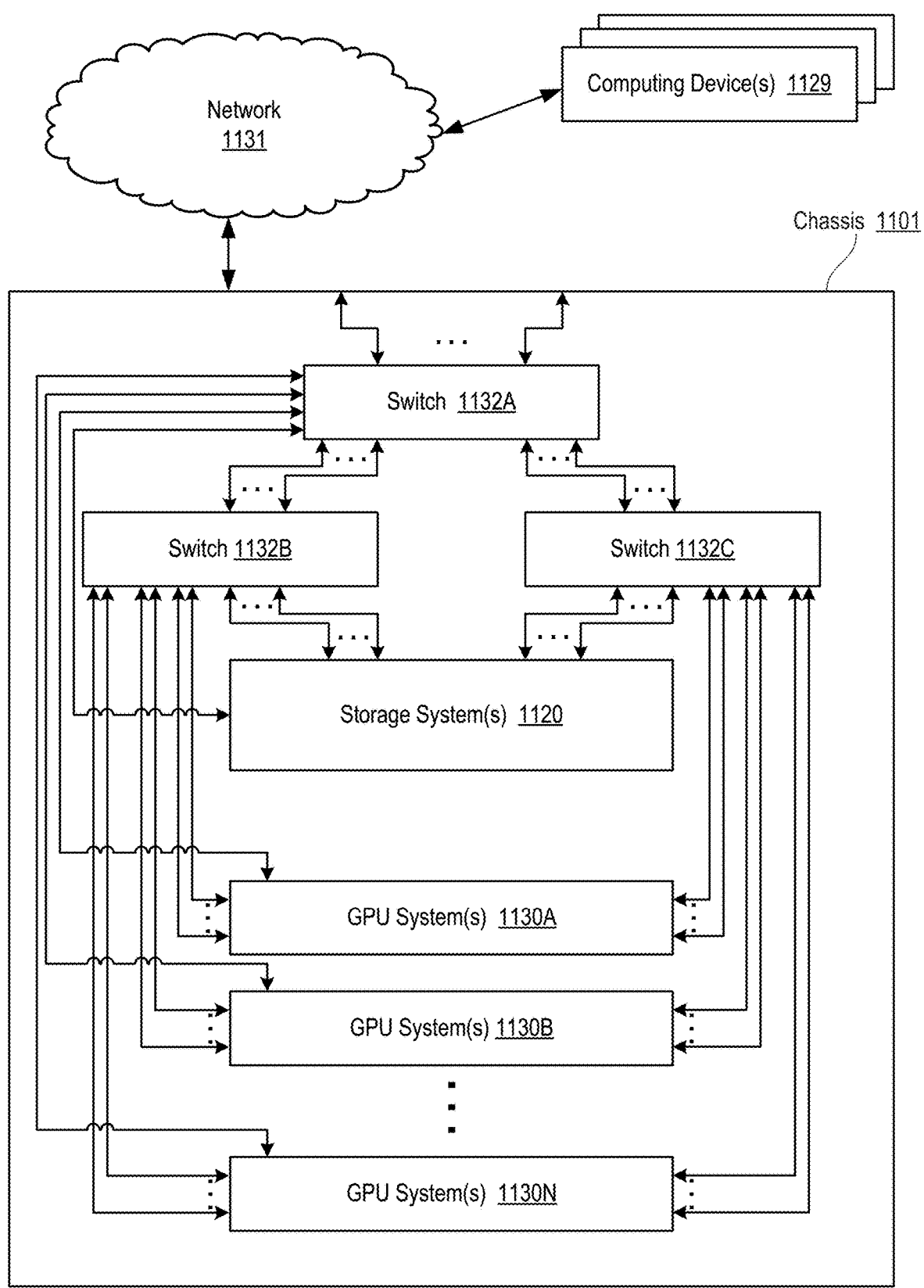
FIG. 11B sets forth a diagram illustrating an example computer architecture for implementing an artificial intelligence and machine learning infrastructure within a single chassis according to some embodiments of the present disclosure.

For further explanation, FIG. 11B sets forth a diagram illustrating an example computer architecture for implementing an artificial intelligence and machine learning infrastructure (1100) within a single chassis (1101) according to some embodiments of the present disclosure. While in this example, the communication fabric includes a tiered set of network switches (1132A-1132C) for interconnecting the storage system(s) (1120) with the one or more GPU system(s) (1130A-1130N), and for the artificial intelligence and machine learning infrastructure (1100) to communicate with one or more computing devices (1129) over one or more networks (1131), in other implementations, the communication fabric may be architected to define different communication paths between the storage system(s) (1120) and the GPU system(s) (1130A-1130N), and one or more computing devices or host computer systems.

In some implementations, the artificial intelligence and machine learning infrastructure (1100) communication fabric may implement a remote direct memory access (RDMA) protocol over converged ethernet (RoCE) fabric, where such a communication fabric implements direct memory access from a source computer system to a target computer system without involvement of an operating system on either the source or target computer system—where, depending on the direction of a communication path, the storage system(s) (1120) may be a source or target computer system and the GPU systems (1130A-1130N) may be a source or target computer system.

In this example, given the communication fabric depicted in artificial intelligence and machine learning infrastructure (1100)—where the communication fabric may implement multiple parallel communication channels through each switch (1132A-1132C)—and based on the storage system(s) (1120) including multiple storage devices, where each storage device may include one or more controllers that may each communicate directly with one or more of the GPUs within GPU systems(s) (1130A-1130N), artificial intelligence and machine learning infrastructure (1100) may implement multiple, parallel high-speed communication paths between different combinations of storage devices within the storage system(s) (1120) and computing elements of the GPU system(s) (1130A-1130N).

In other example implementations, the communication fabric may implement other network communication protocols, including the communication protocols discussed above with respect to the storage system (340) described in FIGS. 1A-3B, including InfiniBand and iWARP.

In some implementations, artificial intelligence and machine learning infrastructure (1100) may be scaled to include additional storage systems or additional GPU systems within the same chassis (1101), where the communication fabric may be similarly scaled to connect the additional storage systems and/or GPU systems via network switches (1132A-1132C). In other cases, the communication fabric may be scaled to include additional network switches or additional tiers to the communication fabric.

Figure 11C:
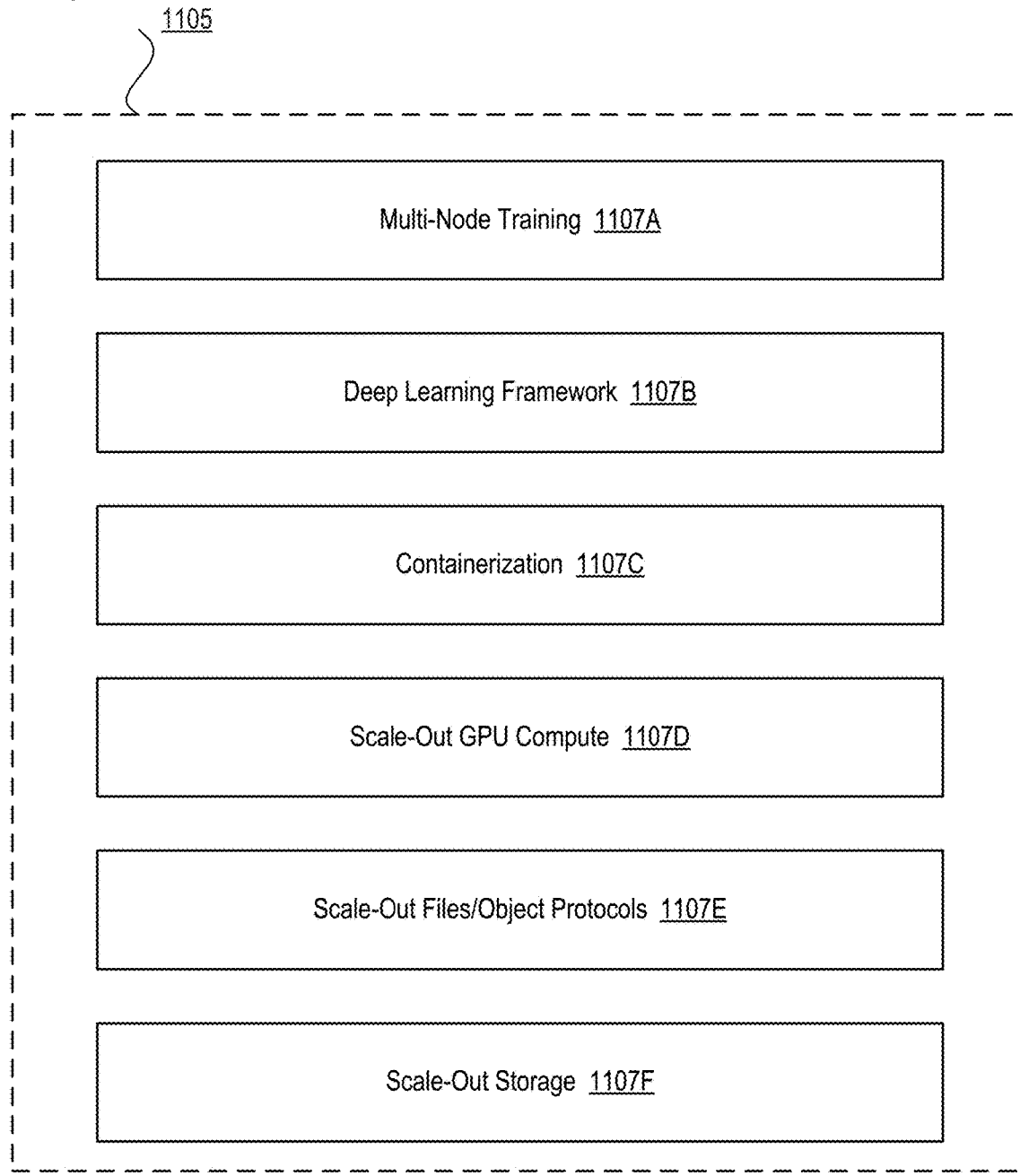
FIG. 11C sets forth a diagram illustrating an example implementation of an artificial intelligence and machine learning infrastructure software stack according to some embodiments of the present disclosure.

For further explanation, FIG. 11C sets forth a diagram illustrating an example implementation of an artificial intelligence and machine learning infrastructure software stack (1105) according to some embodiments of the present disclosure.

As depicted in FIG. 11C, the artificial intelligence and machine learning infrastructure software stack (1105) may be implemented entirely within the artificial intelligence and machine learning infrastructure (110) depicted in FIGS. 11A and 11B. Further, the artificial intelligence and machine learning infrastructure software stack (1105) may include multiple software layers, including a multi-node training (1107A) layer, a deep learning framework (1107B) layer, a containerization (1107C) layer, a scale-out GPU compute (1107D) layer, a scale-out files/object protocol (1107E) layer, and a scale-out storage (1107F) layer, among other potential software layers not depicted in FIG. 11C.

The multi-node training (1107A) layer may implement a scaling toolkit, or a configuration interface, that provides specifications for multi-node training within the artificial intelligence and machine learning infrastructure (1100). The scaling toolkit may be used to specify configuration settings between the storage system(s) (1120), the GPU systems (1130A-1130N), and network components, including network switches (1132A-132C) of the communication fabric.

The deep learning framework (1107B) layer may implement deep learning frameworks such as Caffe, Caffe2, mxnet, pytorch, torch, among other deep learning frameworks. Further, each deep learning framework implemented at the deep learning framework (1107B) layer may be delivered as a container to the containerization (1107C) layer. Further, the containerization (1107C) layer may implement GPU drivers for communicating with the GPUs of the scale-out GPU compute (1107D) layer, and the containerization (1107C) layer may also implement NVIDIA™ Docker™.

The scale-out GPU compute (1107D) layer may be implemented by the GPU systems (1130A-1130N), and the scale-out GPU compute (1107D) layer may provide an interface for assigning jobs, sending or receiving data, adding or removing GPU systems, or for configuring one or more of the GPUs within the GPU systems (1130A-1130N). In some examples, the functionality provided by the scale-out GPU compute (1107D) layer may be provided to layers above and below via an API specifying commands and parameters for each supported functionality for the corresponding layer interface.

The scale-out file/object protocols (1107E) layer may provide an API for a logical data handling layer, such as a file system that provides file systems operations for creating, deleting, moving, copying, or other standard file system operations. In some examples, the scale-out file/objects protocols (1107E) layer may provide block level access, or data access according to a specified range or ranges of bytes.

The scale-out storage (1107F) layer may be implemented by the storage system(s) (1130), and the scale-out storage (1107F) layer may provide an interface for any storage system functionality described above with respect to FIGS. 1A-3B, including reading, writing, erasing, or configurating storage device settings, or configuring garbage collection, or for programming the one or more controllers implemented by each of the included storage systems or storage devices. For example, the scale-out storage (1107F) layer may provide an API for performing input/output operations on physical data stored within the memory components of the storage system.

In some examples, the scale-out file/object protocol (1107E) layer and the scale-out storage (1107F) layer, individually or in combination, may provide for implementations of a virtual memory environment, memory management, or one or more types of files systems or methods for creating, deleting, copying, reading, or writing files or objects.

Figure 11D:
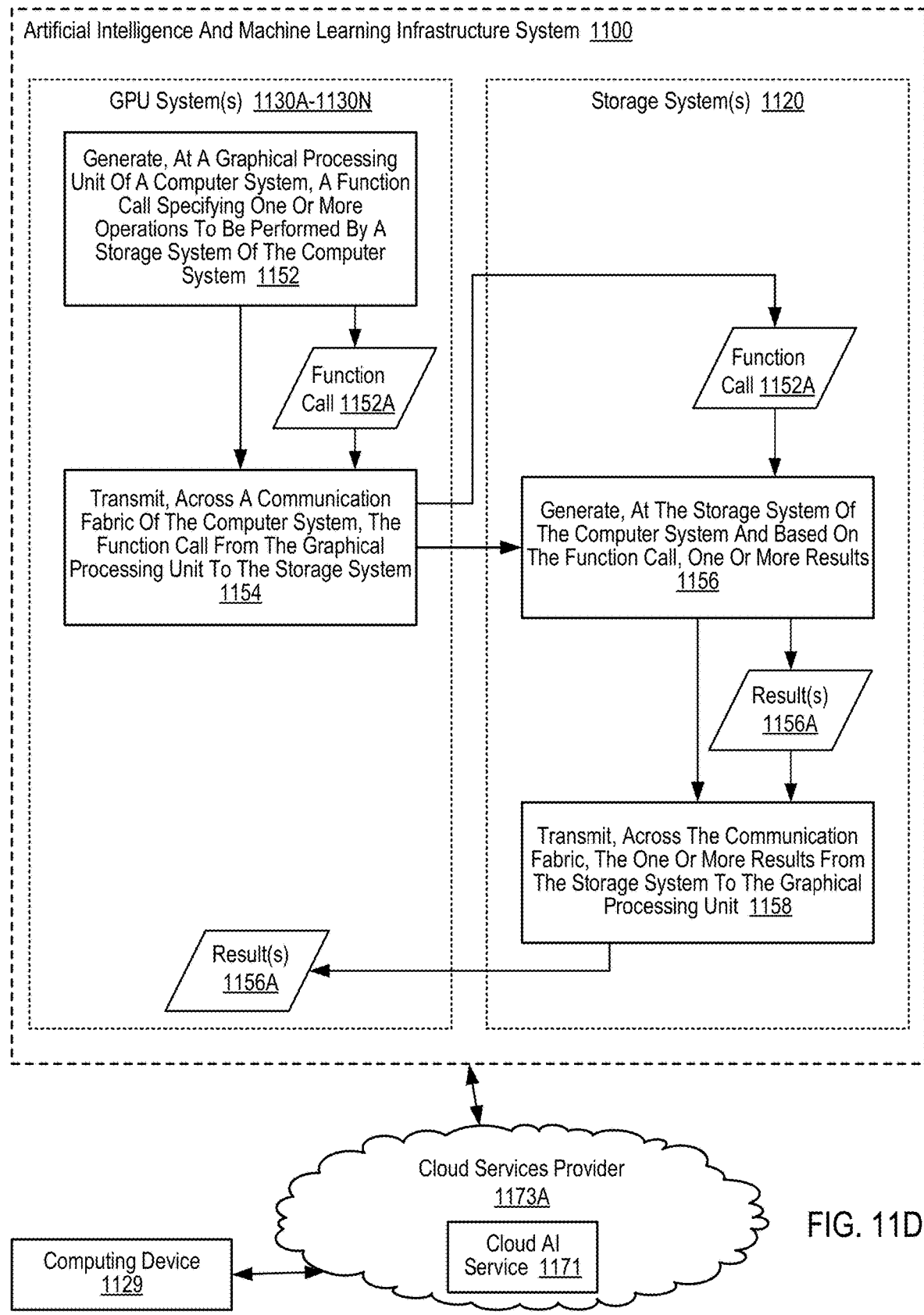
FIG. 11D sets forth a flow chart illustrating an example method for interconnecting a graphical processing unit layer and a storage layer of an artificial intelligence and machine learning infrastructure according to some embodiments of the present disclosure.

For further explanation, FIG. 11D sets forth a flow chart illustrating an example method for interconnecting a graphical processing unit layer and a storage layer of an artificial intelligence and machine learning infrastructure according to some embodiments of the present disclosure. Although depicted in less detail, the example artificial intelligence and machine learning infrastructure (1100) may be similar to the implementations described above with reference to FIGS. 11A-11C, or any combination thereof.

In this example, a data path may be considered use of one or more protocols for a communication path directly between the scale-out GPU compute (1107D) layer and the scale-out storage (1107F) layer. In other examples, the data path may be considered use of one or more protocols for implementing a communication path between the scale-out GPU compute (1107D) layer, the scale-out files/object protocols (1107E) layer, and the scale-out storage (1107F) layer—where the scale-out GPU compute (1107D) layer communicates to and from the scale-out files/object protocols (1107E) layer via one or more APIs, and where the scale-out files/object protocols (1107E) layer communicates with the scale-out storage (1107F) layer via one or more APIs. While in this example, the data path includes the bottom three layers of the artificial intelligence and machine learning infrastructure software stack (1107D, 1107E, 1107F), in other examples, the data path may include one or more other software layers, including the multi-node training (1107A) layer, the deep learning framework (1107B) layer, and/or the containerization (1107C) layer.

In this example, a definition of a data path may be based on the integration of the software stack as depicted and described above with respect to FIGS. 11A-11C. For example, the scale-out storage (1107F) may be configured to provide an API call that specifies for the scale-out storage (1107F) layer to implement a data transformation or data analysis on stored data—where the result of the API call is a result of the data transformation or data analysis performed by the scale-out storage (1107F) layer, and where the scale-out storage (1107F) layer implements the data analysis or data transformation using one or more controllers for one or more storage devices.

In some examples, the API provided by the scale-out storage (1107F) layer may provide data analysis or data transformation functionality or routines that include one or more of: JPEG decode, shuffle, combining files, and/or reshaping matrices/tensors. In general, and in dependence upon the controllers of the storage devices of the storage system (1130) being configured to perform any type of general computing functionality as described above with reference to FIGS. 1A-3B, the API provided by the scale-out storage (1107F) layer may provide an API interface for any type of data analysis or data transformation. As one example, the scale-out storage (1107F) layer may provide an API call that instructs the scale-out storage (1107F) layer to select a subset of data that matches a particular category.

Further, in some examples, the API provided by the scale-out storage (1107F) layer may include an API call that takes as a parameter function code, or a reference to function code, where one or more controllers of the storage system(s) (1130) of the scale-out storage (1107F) layer may execute the function code to perform a specified data analysis or data transformation. In this way, the scale-out GPU compute (1107D) layer may offload to the scale-out storage (1107F) layer some of the computational tasks that would otherwise be performed by the scale-out GPU compute (1107D) layer.

In some examples, the scale-out storage (1107F) layer may manage a compute cluster so that data analysis and/or data transformation happen under a centralized management plane. In other examples, the scale-out storage (1107F) layer may initiate data analysis and/or data transformation or data management operation without any instruction or command from the scale-out GPU compute (1107D) layer, where the initiation of a data analysis and/or data transformation, or data management operation may be based at least in part on the one or more controllers identifying a pattern within the operations requested from the scale-out GPU compute (1107D) layer via the API. In some examples, a given GPU within the scale-out GPU compute (1107D) layer may communicate directly with a storage device of the scale-out storage (1107F) layer without the intervention of an operating system.

In some implementations, the scale-out GPU compute (1107D) layer may make calls to the API of the scale-out files/objects protocols (1107E) layer or the scale-out GPU compute (1107D) layer may make calls directly to the scale-out storage (1107F) layer.

Similarly, the scale-out storage (1107F) layer may generate results directly to the system memory of one or more GPUs within the scale-out GPU compute (1107D) layer. For example, the scale-out storage (1107E) layer may write results from an API call directly into a cache or other memory component of one or more GPUs of the scale-out GPU compute (1107D) layer.

As depicted in FIG. 11D, the example method includes generating (1152), at a graphical processing unit of a computer system, a function call (1152A) specifying one or more operations to be performed by a storage system of the computer system; transmitting (1154), across a communication fabric of the computer system, the function call (1152A) from the graphical processing unit to the storage system (1154); generating (1156), at the storage system of the computer system and based on the function call (1152A), one or more results (1156A); and transmitting (1158), across the communication fabric, the one or more results (1156A) from the storage system to the graphical processing unit.

In this example, the graphical processing unit may be any of the graphical processing units of the GPU system(s) 1130A-1130N, the computer system may be a computer system comprising the artificial intelligence and machine learning infrastructure (1100), and the storage system may be any storage system of the storage systems of storage system(s) (1120). Further, in this example, the artificial intelligence and machine learning infrastructure system (1100) may be operating to perform one or more machine learning tasks received from a cloud AI service (1171) implemented as a cloud service within a cloud services provider (1173A, where the cloud AI service (1171) receives tasks from a host computer (1170) across a network (not depicted), where the tasks may be specified via a user interface provided by the cloud AI service (1171). Further, the artificial intelligence and machine learning infrastructure system (1100) may be implemented within a data center (not depicted) or on site at a client location.

Generating (1152), 1152), at the graphical processing unit of the computer system, the function call (1152A) specifying one or more operations to be performed by a storage system of the computer system may be implemented as described above with reference to FIGS. 11A-11C, where given a specific task, the GPU identifies a corresponding API call, and generates parameters for the API call.

Transmitting (1154), across a communication fabric of the computer system, the function call (1152A) from the graphical processing unit to the storage system (1154) may be implemented as described above with reference to FIGS. 11A-11C, where the function call (1152A) is transmitted across a communication port to one a network switch, and where the network switch routs the function call to a network port on at the storage system(s) (1120).

Generating (1156), at the storage system of the computer system and based on the function call (1152A), one or more results (1156A) may be implemented as described above with reference to FIGS. 11A-11C, where one or more controllers on the storage system(s) (1120) may perform the function call according to the operation and parameters specified by the function call.

Transmitting (1158), across the communication fabric, the one or more results (1156A) from the storage system to the graphical processing unit may be implemented as described above with reference to FIGS. 11A-11C, where the results (1156A) are transmitted across a communication port to a network switch, and where the network switch routs the results (1156A) to a network port on at the GPU system(s) (1130A-1130N).

Figure 12A:
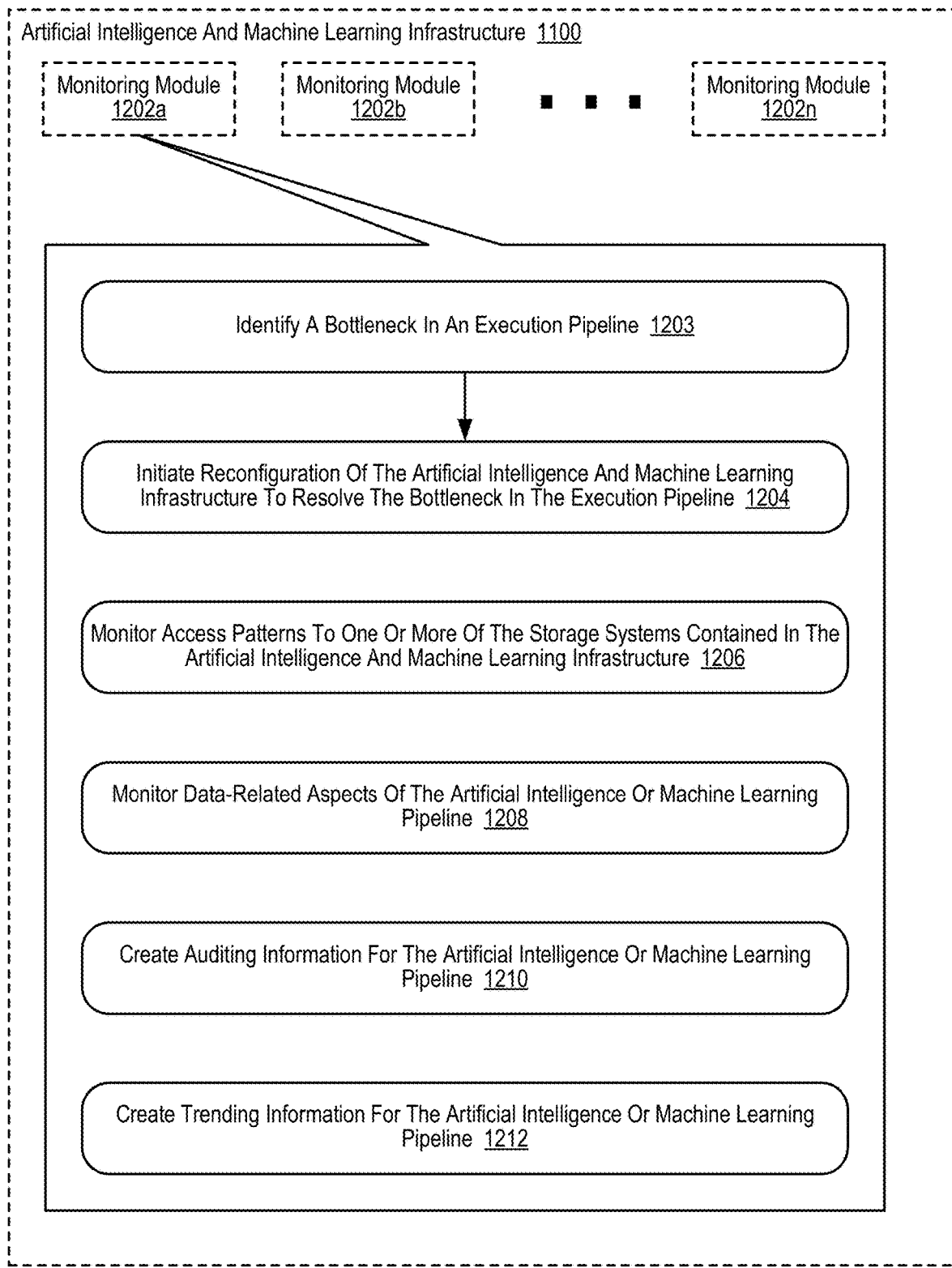
FIG. 12A sets forth a flow chart illustrating an example method of monitoring an artificial intelligence and machine learning infrastructure according to some embodiments of the present disclosure.

For further explanation, FIG. 12A sets forth a flow chart illustrating an example method of monitoring an artificial intelligence and machine learning infrastructure (1100) according to some embodiments of the present disclosure. The artificial intelligence and machine learning infrastructure (1100) described above may include one or more monitoring modules (1202a, 1202b, 1202n) or may be otherwise coupled to one or more monitoring modules. The monitoring modules (1202a, 1202b, 1202n) may be embodied, for example, computer program instructions executing on computer hardware such as a CPU. Such computer program instructions may be stored, for example, within memory that is contained in one or more of the blades that is included within a storage system that is included within the artificial intelligence and machine learning infrastructure (1100) and executed by one or more CPUs that are included within the storage system that is included within the artificial intelligence and machine learning infrastructure (1100). Readers will appreciate that other embodiments are contemplated such as, for example, the one or more monitoring modules (1202a, 1202b, 1202n) residing within and being executed by a server that is included within the artificial intelligence and machine learning infrastructure (1100), the one or more monitoring modules (1202a, 1202b, 1202n) residing within and being executed by cloud computing resources that the artificial intelligence and machine learning infrastructure (1100) is in communications with, or in some other way.

The example method depicted in FIG. 12A includes identifying (1203), by the one or more monitoring modules (1202a, 1202b, 1202n), a bottleneck in an execution pipeline. The execution pipeline may be embodied, for example, as an artificial intelligence or machine learning pipeline in which various stages of executing an artificial intelligence or machine learning application are carried out. Such an execution pipeline can include, for example, identifying a particular dataset to use as input to the artificial intelligence or machine learning application, reading such a dataset from storage that is contained within the artificial intelligence and machine learning infrastructure (1100), performing a series of transformations to the dataset, running the dataset through a plurality of artificial intelligence or machine learning models, retaining auditing information describing the steps performed and the content of the dataset during the various stages of execution, and many other steps.

In the example method depicted in FIG. 12A, a bottleneck can occur for a variety of reasons. For example, a bottleneck can occur when insufficient resources are allocated to one portion of the execution pipeline, thereby causing one portion of the execution pipeline to create a bottleneck for the remaining portions of the execution pipeline. Consider an example in which one portion of the execution pipeline includes a series of transformations to the dataset, where each transformation in the series of transformations is performed by a distinct module of computer program instructions. In such an example, assume that when a first module of computer program instructions has completed a first transformation, the first module of computer program instructions sends the transformed data to a second module of computer program instructions which will perform a second transformation. Further assume that when the second module of computer program instructions has completed the second transformation, the second module of computer program instructions sends the transformed data to a third module of computer program instructions which will perform a third transformation. In such an example, assume that the second transformation is more complex than the other transformations and further assume that each module of computer program instructions is given an identical amount of processing resources upon which the modules will execute. In such an example, the performance of the second transformation could create a bottleneck as the second transformation may take more time to complete given that it is the most complex transformation and further given that the second module of computer program instructions only has access to the same amount of computing resources as the first module of computer program instructions and the third module of computer program instructions.

The example method depicted in FIG. 12A also includes initiating (1204), by the one or more monitoring modules (1202a, 1202b, 1202n), reconfiguration of the artificial intelligence and machine learning infrastructure (1100) to resolve the bottleneck in the execution pipeline. Initiating, by the one or more monitoring modules (1202a, 1202b, 1202n), reconfiguration of the artificial intelligence and machine learning infrastructure (1100) to resolve the bottleneck in the execution pipeline may be carried out, for example, by reallocating resources to resolve the bottleneck in the execution pipeline. Continuing with the example described above, initiating reconfiguration of the artificial intelligence and machine learning infrastructure (1100) to resolve the bottleneck in the execution pipeline may be carried out, for example, by the one or more monitoring modules (1202a, 1202b, 1202n) allocating additional compute resources to support the execution of the second module of computer program instructions. Readers will appreciate that the example described above is just one of many bottlenecks that can occur and the actions taken to resolve such bottlenecks can take many other forms. For example, bottlenecks may occur as the result of processing bottlenecks, scheduling bottlenecks, workload allocation and distribution bottlenecks, and many others. As such, the actions taken to resolve such bottlenecks can include splitting a single step into multiple steps and vice versa, changing the manner in which operations are scheduled, moving workloads around to different physical or virtual resources, and so on.

The example method depicted in FIG. 12A can also include monitoring (1206) access patterns to one or more of the storage systems contained in the artificial intelligence and machine learning infrastructure (1100). Monitoring (1206) access patterns to one or more of the storage systems contained in the artificial intelligence and machine learning infrastructure (1100) may be carried out, for example, by tracking the location of accesses to the storage systems, by tracking the types of accesses (e.g., reads, writes) to the storage systems, and so on. In such an example, the access patterns to one or more of the storage systems contained in the artificial intelligence and machine learning infrastructure (1100) may be used to gain certain insights into the execution of the artificial intelligence or machine learning pipeline.

Consider an example in which a time-series database is being built off of the I/O access patterns of the training data and a time-series database is also being built off of the scheduler and the GPUs. In such an example, this information could be used to determine how to schedule things in a way to make best use of the artificial intelligence and machine learning infrastructure's (1100) resources. In such an example, the artificial intelligence or machine learning pipeline may be represented by a complicated execution graph and a scheduler must decide what to run when. In such an example, feedback loops from storage, networking, compute, and any other parts of the system stack may be used to inform the scheduler and enable the scheduler to make better scheduling decisions. In fact, all of this information could be maintained in a centralized time-series database that includes all of this information. As such, information from a first training run can be used to make better decisions on a second training run. Readers will appreciate that although depicted as a distinct step, in some embodiments, monitoring (1206) access patterns to one or more of the storage systems contained in the artificial intelligence and machine learning infrastructure (1100) may be part of identifying (1203) a bottleneck in an execution pipeline, as described above.

The example method depicted in FIG. 12A also includes monitoring (1208) data-related aspects of the artificial intelligence or machine learning pipeline. Monitoring (1208) data-related aspects of the artificial intelligence or machine learning pipeline can include not only monitoring whether some data that is needed by one or more of the GPUs is available for use by the GPUs, but also monitoring the nature of the data. For example, during each training run of a particular AI or machine learning model, data may be ingested as training data for the AI or machine learning model. In such an example, monitoring the nature of the data can include, for example, monitoring the training data that is ingested during each training run to identify exceptional data (i.e., data that is dissimilar to data that was previously received training data for the AI or machine learning model). In such an example, by monitoring (1208) data-related aspects of the artificial intelligence or machine learning pipeline, changes to the input data to the artificial intelligence or machine learning pipeline can be identified. Readers will appreciate that while the previous sentences relate to the monitoring of training data, in a production environment, data-related aspects of the artificial intelligence or machine learning pipeline may similarly be monitored (1208).

The example method depicted in FIG. 12A also includes creating (1210) auditing information for the artificial intelligence or machine learning pipeline. The auditing information for the artificial intelligence or machine learning pipeline may include, for example, information describing the data that was fed into the artificial intelligence or machine learning pipeline, the source code that was used when executing the artificial intelligence or machine learning pipeline, and so on. Consider an example in which the pipeline is an artificial intelligence pipeline for a self-driving car. In such an example, auditing information may be maintained to capture what data was fed into the artificial intelligence pipeline (e.g., what data was received from the self-driving car's sensors at various points in time), what code was executed to control the operation of the self-driving car, and so on. The auditing information may be creating, for example, by applying a hash function to representations of the data and code to create a hash value that captures the data and code, by storing such information in a blockchain, by storing such information in a database, and so on.

Readers will appreciate that creating (1210) auditing information for the artificial intelligence or machine learning pipeline may also take advantage of an approach to only retain the deltas each time auditing information is created. For example, if auditing information is created at time 0 and auditing information is subsequently created at time 1, any audit information that has not changed between time 1 and time 0 may not need to be retained. For example, if the code that was used at time 0 is captured in the auditing information for time 0, and such code does not change at time 1, then the code that was used at time 1 need not be included in the auditing information for time 1. In such an example, a pointer or other instrument can be included in the auditing information for time 1 to indicate that the code used at time 1 was identical to the code used at a previous point in time.

The example method depicted in FIG. 12A also includes creating (1212) trending information for the artificial intelligence or machine learning pipeline. The trending information for the artificial intelligence or machine learning pipeline may include, for example, information describing improvements in the models over time, information describing changes to the data that is input into the models over time, and so on. In such an example, the trending information for the artificial intelligence or machine learning pipeline may be used to validate certain models, identify data drift, or used for a variety of other purposes. In such an example, the trending information for the artificial intelligence or machine learning pipeline may be displayed and presented to a user, for example, via a tool that shows the improvement of a particular model over time.

Readers will appreciate that although the embodiment depicted in FIG. 12A illustrates an embodiment where the one or more monitoring modules (1202a, 1202b, 1202n) reside within the artificial intelligence and machine learning infrastructure (1100), other embodiments can exist. In fact, in an alternative embodiment the one or more monitoring modules (1202a, 1202b, 1202n) may reside outside of the artificial intelligence and machine learning infrastructure (1100). The one or more monitoring modules (1202a, 1202b, 1202n) may reside, for example, on one or more remote servers that communicate with one or more artificial intelligence and machine learning infrastructures (1100). Alternatively, the one or more monitoring modules (1202a, 1202b, 1202n) may reside within a cloud environment that includes resources that can communicate with one or more artificial intelligence and machine learning infrastructures (1100). In such embodiments, the one or more artificial intelligence and machine learning infrastructures (1100) may periodically send telemetry data to the one or more monitoring modules (1202a, 1202b, 1202n) that includes, for example, data telemetry, storage telemetry, networking telemetry, compute telemetry, and so on.

Figure 12B:
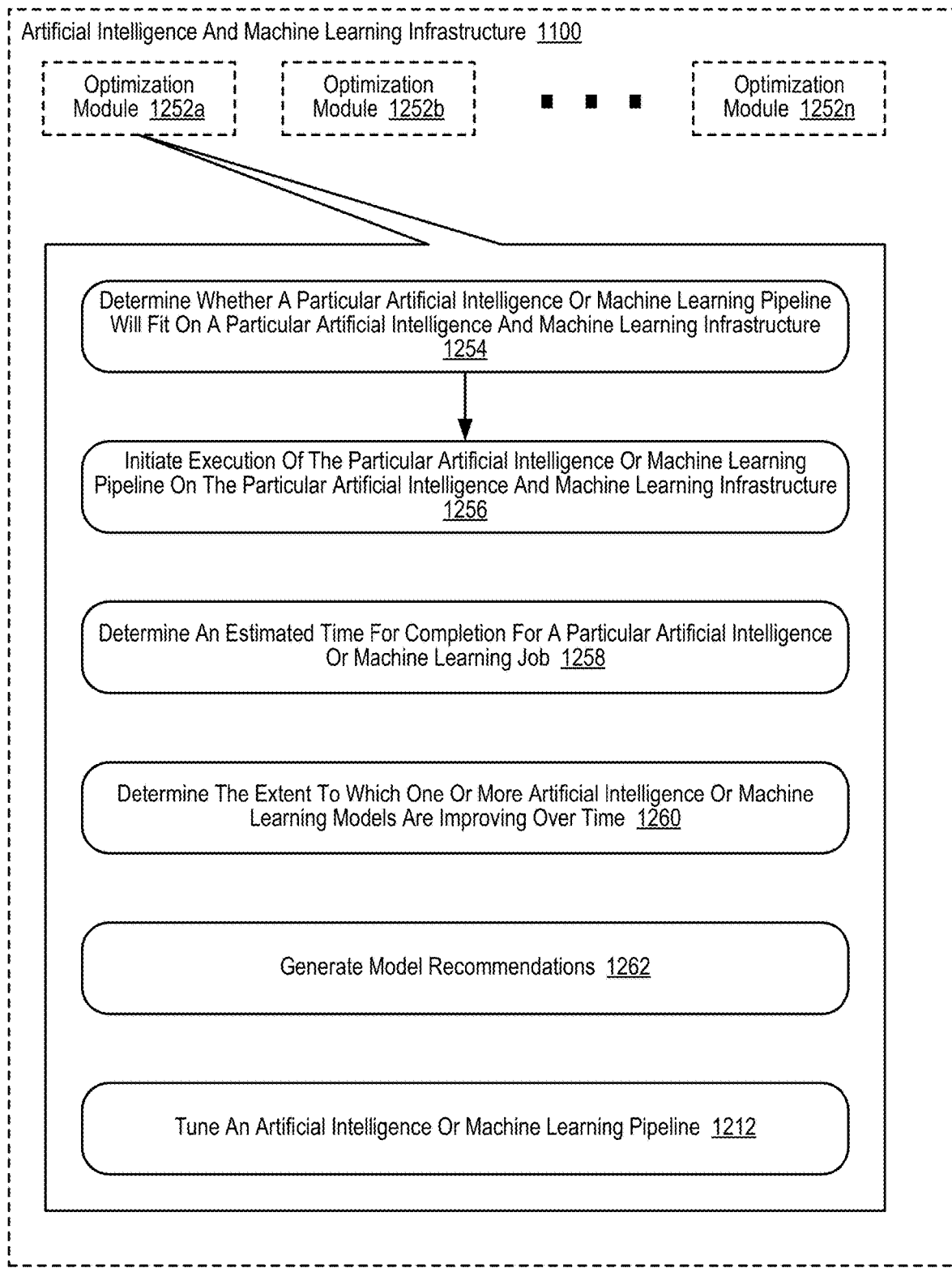
FIG. 12B sets forth a flow chart illustrating an example method of optimizing an artificial intelligence and machine learning infrastructure according to some embodiments of the present disclosure.

For further explanation, FIG. 12B sets forth a flow chart illustrating an example method of optimizing an artificial intelligence and machine learning infrastructure (1100) according to some embodiments of the present disclosure. The artificial intelligence and machine learning infrastructure (1100) described above may include one or more optimization modules (1252a, 1252b, 1252n) or may be otherwise coupled to one or more optimization modules. The optimization modules (1252a, 1252b, 1252n) may be embodied, for example, computer program instructions executing on computer hardware such as a CPU. Such computer program instructions may be stored, for example, within memory that is contained in one or more of the blades that is included within a storage system that is included within the artificial intelligence and machine learning infrastructure (1100) and executed by one or more CPUs that are included within the storage system that is included within the artificial intelligence and machine learning infrastructure (1100). Readers will appreciate that other embodiments are contemplated such as, for example, the one or more optimization modules (1252a, 1252b, 1252n) residing within and being executed by a server that is included within the artificial intelligence and machine learning infrastructure (1100), the one or more optimization modules (1252a, 1252b, 1252n) residing within and being executed by cloud computing resources that the artificial intelligence and machine learning infrastructure (1100) is in communications with, or in some other way.

The example method depicted in FIG. 12B includes determining (1254) whether a particular artificial intelligence or machine learning pipeline will fit on a particular artificial intelligence and machine learning infrastructure (1100). Readers will appreciate that multiple artificial intelligence or machine learning pipelines may be executed on a particular artificial intelligence and machine learning infrastructure (1100). Each artificial intelligence or machine learning pipeline that is being executed on a particular artificial intelligence and machine learning infrastructure (1100) will consume resources (e.g., storage, compute, networking). Given that each artificial intelligence and machine learning infrastructure (1100) has finite resources, each artificial intelligence and machine learning infrastructure (1100) cannot support an infinite number of artificial intelligence or machine learning pipelines. As such, a determination (1254) may need to be made as to whether a particular artificial intelligence or machine learning pipeline will fit on a particular artificial intelligence and machine learning infrastructure (1100). Determining (1254) whether a particular artificial intelligence or machine learning pipeline will fit on a particular artificial intelligence and machine learning infrastructure (1100) may be carried out, for example, by determining an amount of resources that are expected to be required to execute a particular artificial intelligence or machine learning pipeline and determining whether the artificial intelligence and machine learning infrastructure (1100) has an amount of available resources to satisfy the expected demand for resources from the particular artificial intelligence or machine learning pipeline.

Readers will appreciate that determining (1254) whether a particular artificial intelligence or machine learning pipeline will fit on a particular artificial intelligence and machine learning infrastructure (1100) can be more complicated than a simple comparison of available resources to expected demand for resources by the particular artificial intelligence or machine learning pipeline. For example, the optimization modules (1252a, 1252b, 1252n) may take into consideration the performance impact on other artificial intelligence or machine learning pipelines that are currently executing on the particular artificial intelligence and machine learning infrastructure (1100) to determine whether satisfactory performance metrics could be maintained even with the addition of the particular artificial intelligence or machine learning pipeline to the particular artificial intelligence and machine learning infrastructure (1100). In such an example, other artificial intelligence or machine learning pipelines that are currently executing on the particular artificial intelligence and machine learning infrastructure (1100) may be subject to various service level agreements, quality of service requirements, and so on that may be violated with the addition of the particular artificial intelligence or machine learning pipeline to the particular artificial intelligence and machine learning infrastructure (1100)—even if the particular artificial intelligence and machine learning infrastructure (1100) could technically support the particular artificial intelligence or machine learning pipeline. Likewise, the particular artificial intelligence or machine learning pipeline may itself have various performance and service requirements/expectations that are attached to the particular artificial intelligence or machine learning pipeline, such that the mere ability to support the execution of the particular artificial intelligence or machine learning pipeline may be insufficient.

Readers will further appreciate that trending information, including the expected increase or decrease in resource consumption of the particular artificial intelligence or machine learning pipeline, as well as the expected increase or decrease in resource consumption of the other artificial intelligence or machine learning pipelines that are currently executing on the particular artificial intelligence and machine learning infrastructure (1100) may be taken into consideration when determining (1254) whether a particular artificial intelligence or machine learning pipeline will fit on a particular artificial intelligence and machine learning infrastructure (1100). In such a way, the determination (1254) may be forward looking and avoid a predictable exhaustion of resources.

Readers will further appreciate that determining (1254) whether a particular artificial intelligence or machine learning pipeline will fit on a particular artificial intelligence and machine learning infrastructure (1100) may be of particular interest in embodiments where a cluster of artificial intelligence and machine learning infrastructures (1100) are available. In such an example, although a plurality of the artificial intelligence and machine learning infrastructures (1100) may be able to support the execution of the particular artificial intelligence or machine learning pipeline, a best fit analysis may be performed to identify the artificial intelligence and machine learning infrastructures (1100) that may best support the particular artificial intelligence or machine learning pipeline. In such a way, loading balancing objectives may be met, higher service levels may be afforded to the other artificial intelligence or machine learning pipelines that are currently executing on the cluster of artificial intelligence and machine learning infrastructures (1100), and so on.

The example method depicted in FIG. 12B also includes, responsive to affirmatively determining that the particular artificial intelligence or machine learning pipeline will fit on the particular artificial intelligence and machine learning infrastructure (1100), initiating (1256) execution of the particular artificial intelligence or machine learning pipeline on the particular artificial intelligence and machine learning infrastructure (1100). Readers appreciate that in embodiments where a cluster of artificial intelligence and machine learning infrastructures (1100) are available, execution of the particular artificial intelligence or machine learning pipeline may be initiated (1256) on a particular artificial intelligence and machine learning infrastructure (1100) that was selected using a best fit analysis.

The example method depicted in FIG. 12B also includes determining (1258) an estimated time for completion for a particular artificial intelligence or machine learning job. Determining (1258) an estimated time for completion for a particular artificial intelligence or machine learning job may be carried out, for example, by estimating an amount of time required to complete a particular artificial intelligence or machine learning job in view of the amount of resources that may be made available for use by the particular artificial intelligence or machine learning job. In such an example, users in a multi-tenant environment may even be provided with the estimated time for completion for a particular artificial intelligence or machine learning job, so that a user may determine whether to actually submit the particular artificial intelligence or machine learning job. Likewise, the estimated time for completion for a particular artificial intelligence or machine learning job may be given to a scheduler or other module of computer program instructions that can gather such information from a plurality of artificial intelligence and machine learning infrastructures (1100) (e.g., in a clustered environment) in order to identify which particular artificial intelligence and machine learning infrastructure (1100) the particular artificial intelligence or machine learning job should be submitted to.

The example method depicted in FIG. 12B also includes determining (1260) the extent to which one or more artificial intelligence or machine learning models are improving over time. Determining (1260) the extent to which one or more artificial intelligence or machine learning models are improving over time may be carried out, for example, through the use of trending information for a particular artificial intelligence or machine learning job. In fact, determining (1260) the extent to which one or more artificial intelligence or machine learning models are improving over time can include performing things like A/B testing between different models or transformations, performing canary testing to quickly and automatically verify that everything that a particular model depends on is ready before other time-consuming tests are conducted, and so on. In fact, in context of canary testing, a deeply learned model may be used that predicts if the learned model passed A/B testing using a history of previous A/B tests, particular for a continuous integration pipeline. In such an example, weighted scores may be created to show if the output is likely to pass. Through the use of such techniques, historical trending of various models may be maintained and tracked such that the details and outcomes of steps in a pipeline may be maintained.

The example method depicted in FIG. 12B also includes generating (1262) model recommendations. Readers will appreciate that, in view of the fact that many artificial intelligence or machine learning pipelines may be executed a single artificial intelligence and machine learning infrastructure (1100) and further in view of the fact that multiple artificial intelligence and machine learning infrastructures (1100) may be included in a single cluster, a substantial amount of information related to the execution of artificial intelligence or machine learning pipelines may be available. Such information may be mined to identify, for example, models that worked well on various datasets, transformations that led to improvements for a particular pipeline and dataset, and so on. As such, model recommendations may be generated (1262) to recommend that a particular model be alerted in some particular way, particular transformations be excluded from or included in a particular, transformations be modified in some way, and so on.

In the example method depicted in FIG. 12B, generating (1262) model recommendations may be carried out through the fingerprints or similar mechanisms that describe various aspects of a particular artificial intelligence or machine learning pipeline, the data ingested by the particular artificial intelligence or machine learning pipeline, and so on. In such a way, recommendations may only be generated based on information gathered from artificial intelligence or machine learning pipelines and datasets with similar fingerprints. For example, if a particular transformation was particularly useful in an image recognition machine learning pipeline that ingested images with certain characteristics, such a transformation may only be recommended for owners of other image recognition machine learning pipelines that ingest images with similar characteristics, whereas such a recommendation would not be generated a speech processing artificial intelligence pipeline. Readers will appreciate that such recommendations could be anonymized so as to shield another user's data, specific information about their model, and so on.

In the example method depicted in FIG. 12B, embodiments may make use of auto-indexing techniques through which the artificial intelligence and machine learning infrastructure (1100) can, for example, generate vectors for data to quickly and effectively index and understand large amounts of data. Such auto-indexing techniques may be used to identify cold data that should be tiered off of the artificial intelligence and machine learning infrastructure (1100), to migrate data to a cache (e.g., for data that is being heavily used), and so on. Through the use of such auto-indexing techniques, insights into the content of the data may cause the artificial intelligence and machine learning infrastructure (1100) to automatically tier some less useful data to slower storage as part of a migration process, rather than migrating the data and subsequently determining that the data that has already been stored in the artificial intelligence and machine learning infrastructure (1100) should be tiered away.

The example method depicted in FIG. 12B also includes tuning (1212) an artificial intelligence or machine learning pipeline. In the example method depicted in FIG. 12B, tuning (1212) an artificial intelligence or machine learning pipeline may be carried out, for example, in a manner that is automated and/or predictive based on an examination of the workloads placed on the artificial intelligence and machine learning infrastructure (1100) as well as the attributes of one or more artificial intelligence or machine learning pipelines. For example, the ratios of compute-to-storage may be modified based on characteristics of the workload, pipelines could be rebalanced based on an identification of bottlenecks (e.g., a bottleneck is identified, a solution is identified indicating that additional stream-processing servers are needed, and additional stream-processing servers are automatically spun up). Likewise, workloads or pipelines could be moved around and various other actions could be taken to tune (1212) the artificial intelligence or machine learning pipeline.

Embodiments of the artificial intelligence and machine learning infrastructure (1100) may also make use of a job scheduler and a resource management tool that can reside within the storage system(s) that are contained in the artificial intelligence and machine learning infrastructure (1100). In such an embodiment, the storage system(s) may be responsible for managing the scheduling of jobs to the GPU and other types of resource management, where such management is carried out by the storage system(s) under a single management plane. Furthermore, such management may be carried out in an automated fashion, including automated scheduling based on various factors (e.g., the influx of some data, data contents, and so on). For example, pre-merge tests should see what code has changed and run tests based on those changes. Furthermore, the storage systems(s) could implement management in by making decisions such as, for example, selecting a particular dataset to train against, the appropriate interval to run tests and continuously re-train with new data, and so on.

In some embodiments, a storage system or other management entity within the artificial intelligence and machine learning infrastructure (1100) may also implement automated training with continuous learning based on some triggers (e.g., new data, exceptional data). Furthermore, auto-indexing could be used to identify the particular categories of data within a dataset. For example, a user of an image processing pipeline may want to train against images of dogs and cats, with no understanding the dataset actually includes images of dogs, cats, birds, worms, and so on. An automated indexing solution, however, would detect each of the categories of data actually contained within the dataset.

In some embodiments, a storage system or other management entity within the artificial intelligence and machine learning infrastructure (1100) may also implement the real-time coordination of workflows. Readers will appreciate that the artificial intelligence and machine learning infrastructure (1100) do not just execute artificial intelligence and machine learning pipelines, as the artificial intelligence and machine learning infrastructure (1100) may also run message queue systems, data cleansing modules, and so on. As such, the artificial intelligence and machine learning infrastructure (1100) may be configured to handle the coordination of all of the resources under a single management plane.

Figure 13:
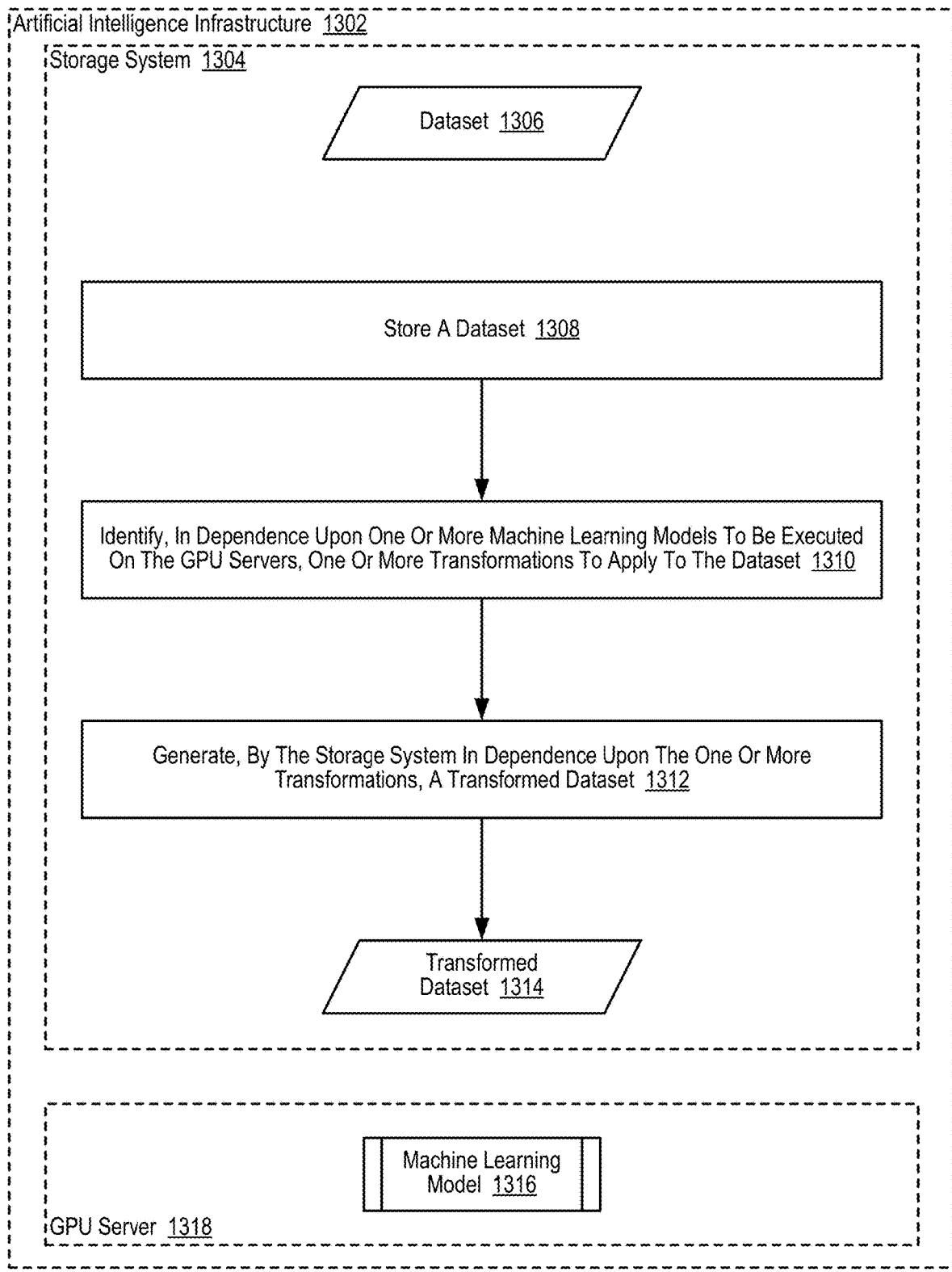
FIG. 13 sets forth a flow chart illustrating an example method of data transformation offloading in an artificial intelligence infrastructure that includes one or more storage systems and one or more GPU servers according to some embodiments of the present disclosure.

For further explanation, FIG. 13 sets forth a flow chart illustrating an example method of data transformation offloading in an artificial intelligence infrastructure (1302) that includes one or more storage systems (1304) and one or more GPU servers (1318) according to some embodiments of the present disclosure. Although depicted in less detail, the storage system (1304) depicted in FIG. 13 may be similar to the storage systems described above, as the storage system (1304) depicted in FIG. 13 may include any combination of the components contained in the storage systems described above. The GPU servers (1318) depicted in FIG. 13 may be embodied, for example, as a server, workstation, or other computing device that specialize in using general-purpose computing on graphics processing units ('GPGPU') to accelerate deep learning applications, machine learning applications, artificial intelligence applications, or similar applications. Although not explicitly depicted in FIG. 13, the storage systems (1304) and the GPU servers (1318) may be coupled for data communications via one or more data communications links. Readers will appreciate that the artificial intelligence infrastructure (1302) depicted in FIG. 13 may be similar to the artificial intelligence and machine learning infrastructures described above.

The artificial intelligence infrastructure (1302) depicted in FIG. 13 may be configured to support the execution of one or more machine learning models. Such machine learning models may consist of one or more machine learning algorithms that are executed on one or more of the GPU servers (1318). Such machine learning algorithms can include supervised learning algorithms such as, for example, linear regression algorithms, logistic regression algorithms, decision tree algorithms, or others. Such machine learning algorithms can also include unsupervised learning algorithms such as, for example, Apriori algorithms, k-means clustering algorithms, or others. Likewise, such machine learning algorithms can also include reinforcement learning algorithms such as, for example, Markov decision processes, Q-learning algorithms, or others.

In the examples depicted herein, the machine learning models that are supported by the artificial intelligence infrastructure (1302) may be provided input data that is stored within one or more of the storage systems (1304) that are included in the artificial intelligence infrastructure (1302). As such, input data that is stored within one or more of the storage systems (1304) that are included in the artificial intelligence infrastructure (1302) may be provided to the GPU servers (1318) such that the GPU servers (1318) can utilize the input data as input into the machine learning algorithms that are being executed on the GPU servers (1318). Readers will appreciate, however, that different machine learning models may require input data that is in different formats, contains different types of data, and so on. For example, a first machine learning model may utilize a vector as input while a second machine learning model may utilize a matrix as input.

The example method depicted in FIG. 13 includes storing (1308), within the storage system (1304), a dataset (1306). The dataset (1306) depicted in FIG. 13 may be embodied, for example, as a collection of files, objects, or other pieces of data that collectively form a set of data that is to be used for training a machine learning model. The dataset (1306) depicted in FIG. 13 may, however, not be in a format that can be efficiently used by a machine learning model. For example, the objects in the dataset (1306) may contain unstructured data that either does not have a pre-defined data model or is not organized in a pre-defined manner. Such unstructured data may be, for example, text-heavy data that contains data such as dates, numbers, and facts as well. Such unstructured data may be difficult to understand using traditional programs relative to data stored in fielded form in databases, annotated in documents, or otherwise structured. Alternatively, the objects in the dataset (1306) may contain untagged data whose meaning cannot be readily identified by a machine learning model. Readers will appreciate that in other examples, the contents of the dataset (1306) may be inefficiently formatted, tagged, or otherwise inefficient for use as training data for a machine learning model. In the example method depicted in FIG. 13, storing (1308) a dataset (1306) may be carried out, for example, by identifying one or more data sources, acquiring data from the one or more data sources, creating a single dataset that includes all data acquired from the data sources, and storing the contents of the dataset (1306) within storage devices that are included in the storage system (1304).

Consider an example in which the dataset (1306) is embodied as a collection of log files generated by the storage system (1304). In such an example, each line in each of the log files may be unstructured as each line is created in a way so as to be in a human readable format. Such unstructured data may be inefficient for use by a machine learning model as the unstructured data may not be structured via predefined data models or schema that enable for easy searching of the data. Other examples of datasets (1306) that contain unstructured data can include, for example, datasets that include video files, image files, audio files, and many others.

The example method depicted in FIG. 13 also includes identifying (1310), in dependence upon one or more machine learning models (1316) to be executed on the GPU servers (1318), one or more transformations to apply to the dataset (1306). The one or more transformations to apply to the dataset (1306) may include, for example, performing scaling transformations to standardize the range of independent variables or features of data, performing decomposition transformations to decompose features that represent a complex concept into constituent parts (e.g., decomposing a date that has day and time components an hour of the day constituent part), performing aggregation transformations to aggregate multiple features into a single feature (e.g., instances for each time a customer logged into a system could be aggregated into a count feature that identifies the number of logins), and many others. Readers will appreciate that the specific transformations to apply to the dataset (1306) may not only be a function of the format of the dataset (1306) itself, but specific transformations to apply may also be a function of the expected input for the one or more machine learning models (1316) to be executed on the GPU servers (1318). The one or more transformations to apply to the dataset (1306) can further include, for example, transforming unstructured data into structure data by extracting information from the unstructured format and populating the data in a structured format, transforming structured data in a first format to a second format that is expected by the one or more machine learning models (1316), and so on.

The example method depicted in FIG. 13 also includes generating (1312), by the storage system (1304) in dependence upon the one or more transformations, a transformed dataset (1314). The transformed dataset (1314) may be embodied, for example, as vector that can serve as input to a machine learning model, as a tensor that can serve as an input to a machine learning model, and so on. Readers will appreciate that prior to actually generating (1312) the transformed dataset (1314), the storage system (1304) may perform other operations to prepare the dataset (1306) for use by the machine learning models that are supported by the artificial intelligence infrastructure (1302). For example, the storage system (1304) may select data for inclusion in the transformed dataset (1314), format the data to ensure that data formats are consistent for data received from different sources, clean the data to discard unwanted data, remove duplicated data, delete unusable data, handle missing data, or perform other preprocessing operations.

Readers will appreciate that by having the storage system (1304) perform the steps described above, the GPU servers (1318) that actually execute the machine learning algorithms may avoid performing the computationally demanding task of preparing data for use by the machine learning algorithms, as the process of receiving, cleaning, pre-processing, and transforming the data may be performed by the storage system (1304) rather than the GPU servers (1318). As such, the computing resources provided by the GPU servers (1318) may be reserved for actually executing the machine learning algorithms against an already prepared transformed dataset (1314), rather than having the computing resources provided by the GPU servers (1318) burdened with the task of preparing data for ingestion by the machine learning algorithms.

Figure 14:
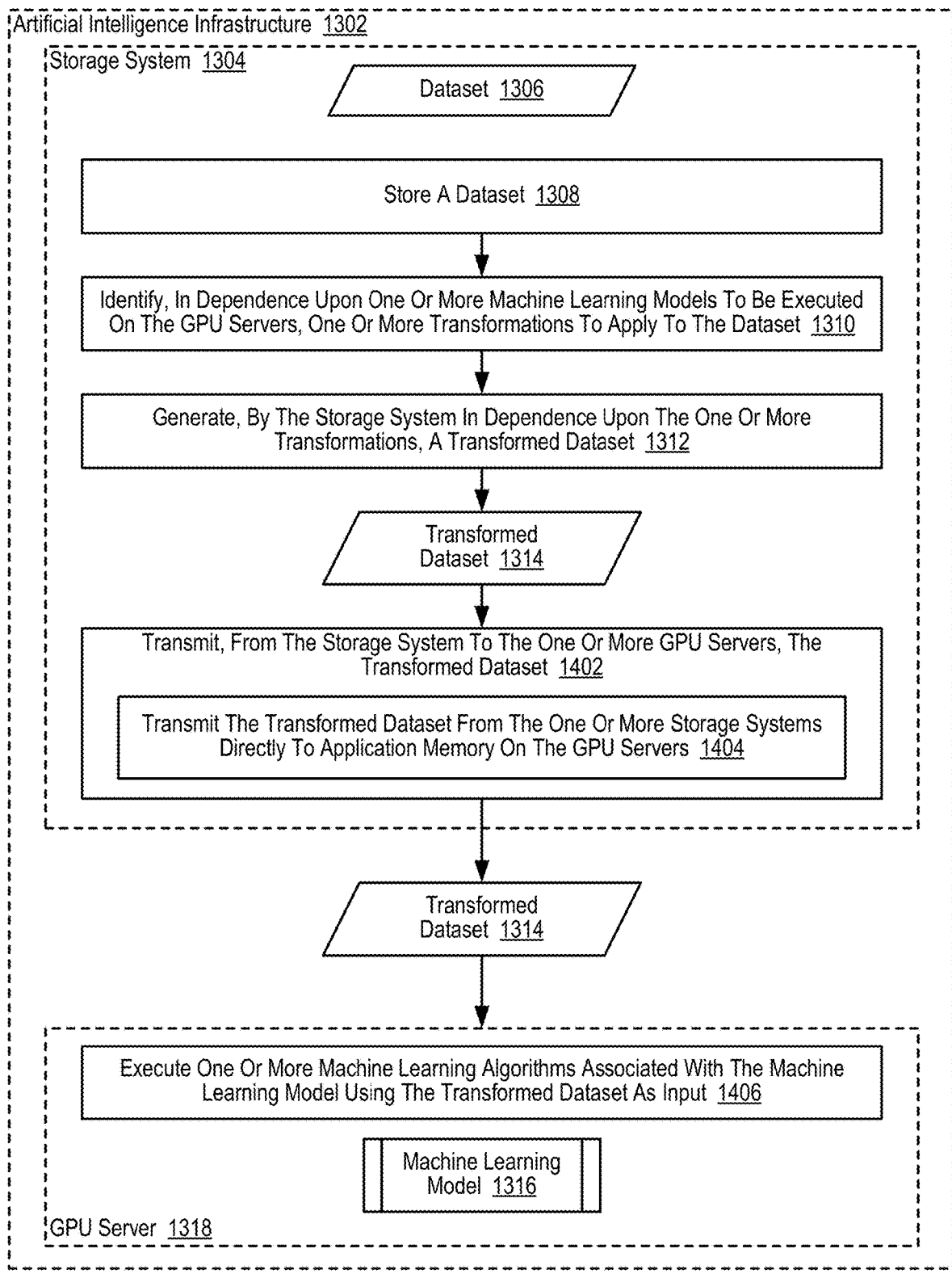
FIG. 14 sets forth a flow chart illustrating an additional example method of data transformation offloading in an artificial intelligence infrastructure that includes one or more storage systems and one or more GPU servers according to some embodiments of the present disclosure.

For further explanation, FIG. 14 sets forth a flow chart illustrating an additional example method of data transformation offloading in an artificial intelligence infrastructure (1302) that includes one or more storage systems (1304) and one or more GPU servers (1318) according to some embodiments of the present disclosure. The example method depicted in FIG. 14 is similar to the example method depicted in FIG. 13, as the example method depicted in FIG. 14 also includes storing (1308) a dataset (1306) within the storage system (1304), identifying (1310) one or more transformations to apply to the dataset (1306) in dependence upon one or more machine learning models (1316) to be executed on the GPU servers (1318), and generating (1312), by the storage system (1304) in dependence upon the one or more transformations, a transformed dataset (1314).

The example method depicted in FIG. 14 also includes transmitting (1402), from the storage system (1304) to the one or more GPU servers (1318), the transformed dataset (1314). The transformed dataset (1314) may be transmitted (1402) from the storage system (1304) to the one or more GPU servers (1318), for example, via one or more data communications links between the storage system (1304) and the one or more GPU servers (1318), which may be embodied in many different ways as described in more detail above. In the example method depicted in FIG. 14, transmitting (1402) the transformed dataset (1314) from the storage system (1304) to the one or more GPU servers (1318) can also include transmitting (1404) the transformed dataset (1314) from the one or more storage systems directly to application memory on the GPU servers (1318).

Transmitting (1404) the transformed dataset (1314) from the one or more storage systems directly to application memory on the GPU servers (1318) may be carried, for example, by transmitting the transformed dataset (1314) from the storage system (1304) to the GPU servers (1318) via RDMA. Transmitting the transformed dataset (1314) via RDMA may be carried out, for example, by a network adapter that is included in the storage system (1304) transferring the transformed dataset (1314) directly from memory in the storage system (1304) to application memory within the one or more GPU servers (1318). Through the use of such an RDMA transfer, the operating system and the GPUs within the GPU servers (1318) may be bypassed such that no work is required by the GPUs within the GPU servers (1318) to obtain the transformed dataset (1314), as would be required in non-RDMA transfers (e.g., message-based transfers) were used. Readers will appreciate that the use of RDMA transfers is an additional mechanism that can enable the GPU servers (1318) that actually execute the machine learning algorithms to avoid performing the computationally demanding task of obtaining the transformed dataset (1314). As such, the computing resources provided by the GPU servers (1318) may be reserved for actually executing the machine learning algorithms against an already prepared transformed dataset (1314), rather than having the computing resources provided by the GPU servers (1318) burdened with the task of obtaining the transformed dataset (1314). Readers will appreciate that in other embodiments, transmitting (1404) the transformed dataset (1314) from the one or more storage systems directly to application memory on the GPU servers (1318) may be carried, for example, through the use of NFS or other appropriate technology.

The example method depicted in FIG. 14 also includes executing (1406), by one or more of the GPU servers (1318), one or more machine learning algorithms associated with the machine learning model (1316) using the transformed dataset (1314) as input. Readers will appreciate that the output generated by executing (1406) one or more machine learning algorithms associated with the machine learning model (1316) using the transformed dataset (1314) as input may vary in dependence upon the particular machine learning model that is being carried out.

Figure 15:
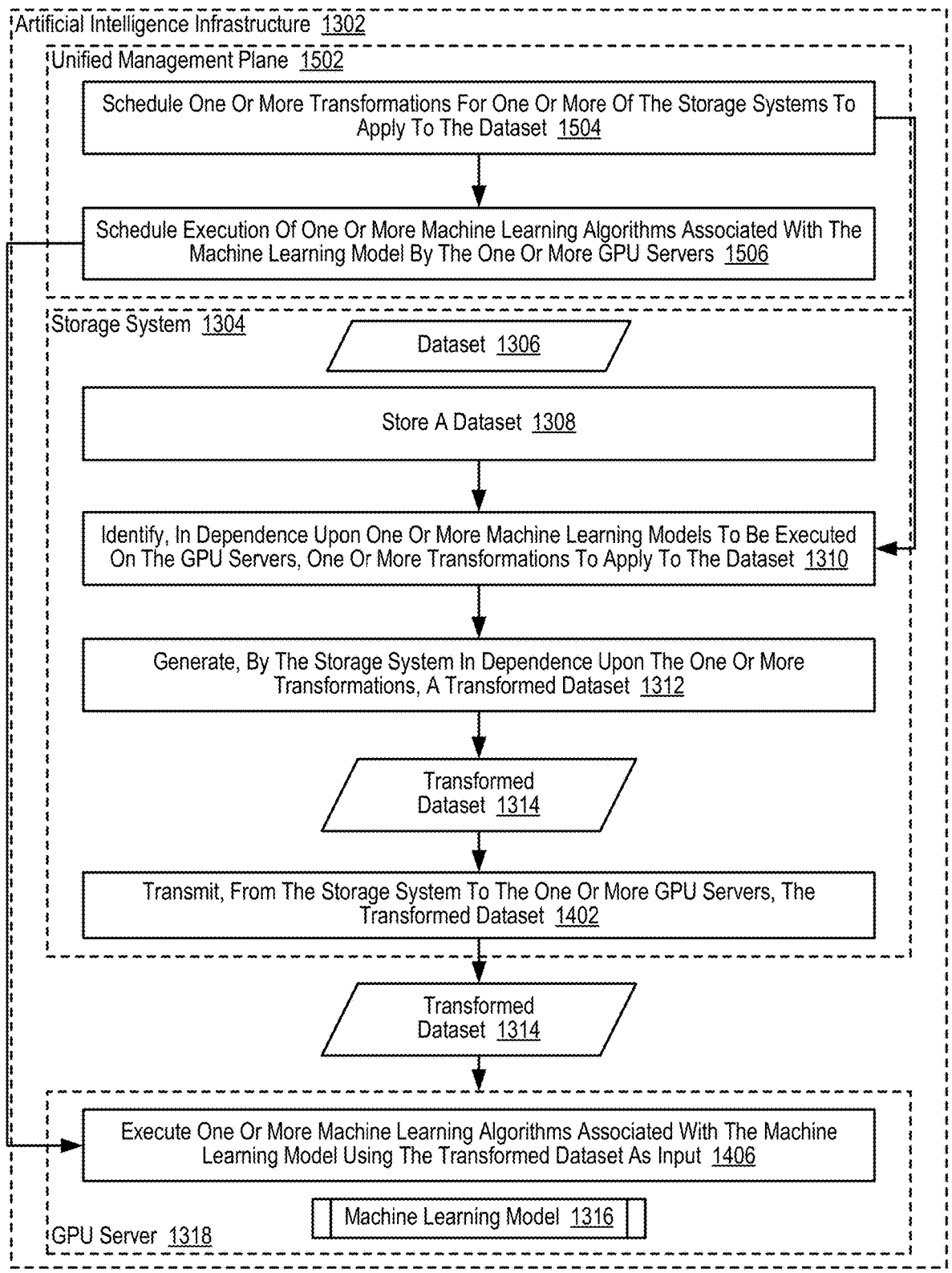
FIG. 15 sets forth a flow chart illustrating an example method of data transformation offloading in an artificial intelligence infrastructure that includes one or more storage systems and one or more GPU servers according to some embodiments of the present disclosure.

For further explanation, FIG. 15 sets forth a flow chart illustrating an additional example method of data transformation offloading in an artificial intelligence infrastructure (1302) that includes one or more storage systems (1304) and one or more GPU servers (1318) according to some embodiments of the present disclosure. The example method depicted in FIG. 15 is similar to the example methods depicted in FIG. 13 and FIG. 14, as the example method depicted in FIG. 15 also includes storing (1308) a dataset (1306) within the storage system (1304), identifying (1310) one or more transformations to apply to the dataset (1306) in dependence upon one or more machine learning models (1316) to be executed on the GPU servers (1318), generating (1312), by the storage system (1304) in dependence upon the one or more transformations, a transformed dataset (1314), transmitting (1402), from the storage system (1304) to the one or more GPU servers (1318), the transformed dataset (1314), and executing (1406), by one or more of the GPU servers (1318), one or more machine learning algorithms associated with the machine learning model (1316) using the transformed dataset (1314) as input.

The example method depicted in FIG. 15 also includes scheduling (1504), by a unified management plane (1502), one or more transformations for one or more of the storage systems (1304) to apply to the dataset (1306). The unified management plane (1502) depicted in FIG. 15 may be embodied, for example, as a module of computer program instructions executing on computer hardware such as one or more CPUs. The unified management plane (1502) may be configured to monitor and manage all elements within the artificial intelligence infrastructure (1302), including the storage systems (1304), the GPU servers (1318), and any devices (e.g., network switches) that enable data communications between the storage systems (1304) and the GPU servers (1318). The unified management plane (1502) may be configured to perform tasks such as, for example, scheduling tasks such as one or more dataset transformations to be performed by one or more of the storage systems (1304), scheduling tasks such as executing of one or more machine learning algorithms on the one or more GPU servers (1318), managing the amount of storage system resources that are made available for performing one or more dataset transformations by one or more of the storage systems (1304), managing the amount of GPU server resources that are made available for executing of one or more machine learning algorithms on the one or more GPU servers (1318), managing data paths between the one or more storage systems (1304) and the one or more GPU servers (1318), and so on.

Readers will appreciate that, because the unified management plane (1502) has insights into both the storage systems (1304) and the GPU servers (1318) via monitoring both the storage systems (1304) and the GPU servers (1318), the unified management plane (1502) can manage both the storage systems (1304) and the GPU servers (1318) in a way so as to optimize interactions between the storage systems (1304) and the GPU servers (1318) and also to optimize the series of steps that are needed to support the execution of a machine learning model. In fact, the unified management plane (1502) may be configured to perform automated scheduling of tasks on the storage systems (1304) and on the GPU servers (1318) based on various factors (e.g., the influx of some data, data contents, and so on). For example, the unified management plane (1502) could be configured to decide that a particular machine learning model should train against a particular dataset, the unified management plane (1502) could be configured to decide the appropriate interval to run tests and continuously re-train with new data, and so on. In such an example, the unified management plane (1502) could be configured to support automated training with continuous learning based on some triggers (e.g., new data, exceptional data).

In the example method depicted in FIG. 15, the unified management plane (1502) is configured to schedule (1504) one or more transformations for one or more of the storage systems (1304) to apply to the dataset (1306) and also configured to schedule (1506) execution of one or more machine learning algorithms associated with the machine learning model (1316) by the one or more GPU servers (1318). In such an example, the unified management plane (1502) may be configured to work with a scheduler on one or more of the storage systems (1304) as well as a scheduler on the one or more GPU servers (1318). The unified management plane (1502) may be configured to work with a scheduler on one or more of the storage systems (1304) as well as a scheduler on the one or more GPU servers (1318), for example, by sending one or more messages to the storage systems (1304) that are understood by the storage system (1304) as a scheduling instruction, by sending one or more messages to the GPU servers (1318) that are understood by the GPU servers (1318) as a scheduling instruction, and so on. In such an example, the storage systems (1304) and the GPU servers (1318) may be configured, via an API or some other mechanism, to receive scheduling instructions from the unified management plane (1502) and to implement the scheduling instructions received from the unified management plane (1502) via one or more local schedulers.

Figure 16:
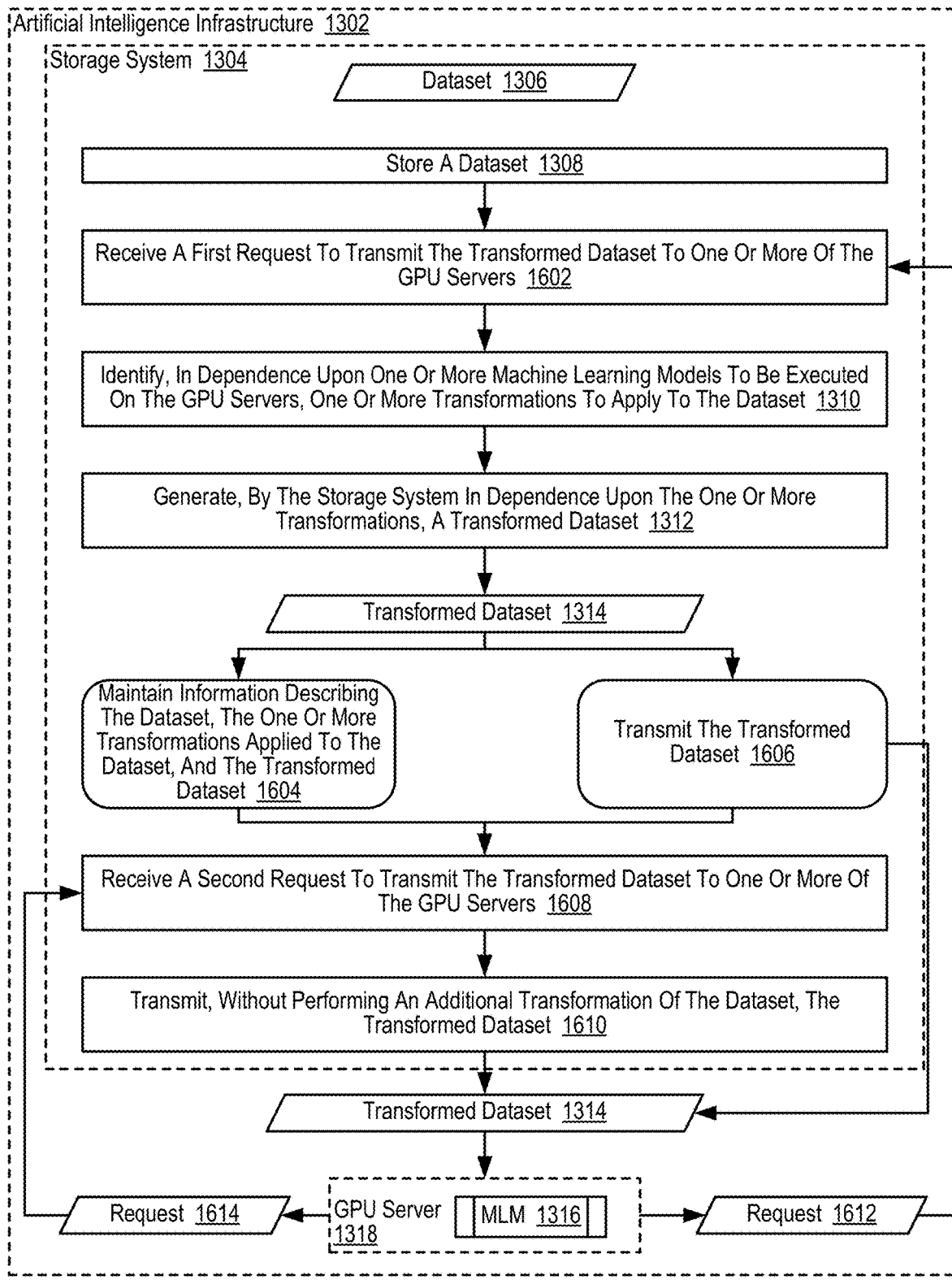
FIG. 16 sets forth a flow chart illustrating an example method of data transformation offloading in an artificial intelligence infrastructure that includes one or more storage systems and one or more GPU servers according to some embodiments of the present disclosure.

For further explanation, FIG. 16 sets forth a flow chart illustrating an additional example method of data transformation offloading in an artificial intelligence infrastructure (1302) that includes one or more storage systems (1304) and one or more GPU servers (1318) according to some embodiments of the present disclosure. The example method depicted in FIG. 16 is similar to the example method depicted in FIG. 13, as the example method depicted in FIG. 16 also includes storing (1308) a dataset (1306) within the storage system (1304), identifying (1310) one or more transformations to apply to the dataset (1306) in dependence upon one or more machine learning models (1316) to be executed on the GPU servers (1318), and generating (1312), by the storage system (1304) in dependence upon the one or more transformations, a transformed dataset (1314).

The example method depicted in FIG. 16 also includes maintaining (1604), by the storage system (1304), information describing the dataset (1306), the one or more transformations applied to the dataset (1306), and the transformed dataset (1314). Maintaining (1604) information describing the dataset (1306), the one or more transformations applied to the dataset (1306), and the transformed dataset (1314) may be carried out, for example, by an entity such as the unified management plane (1502) described above maintaining the information describing the dataset (1306), the one or more transformations applied to the dataset (1306), and the transformed dataset (1314) in a transformation log or similar data structure. In such an example, the storage system (1304) may not only maintain information describing the dataset (1306), the one or more transformations applied to the dataset (1306), and the transformed dataset (1314), but the storage system (1304) may actually retain a copy of the transformed dataset (1314). As such, the storage system (1304) may serve as a transformation cache such that the computationally intensive process of transforming a dataset (1306) for use by a machine learning model (1316) need not be repeated. Readers will appreciate that, in view of the fact that different machine learning models may require identical transformations and that different instances of the same machine learning mode may require identical transformations, by maintaining the information describing the dataset (1306), the one or more transformations applied to the dataset (1306), the transformed dataset (1314), as well as the transformed dataset (1314) itself, the storage system (1304) may serve as a transformation cache whose presence can prevent the GPUs within the GPU servers (1318) from being repeatedly tasked with the computationally intensive process of transforming a dataset (1306) for use by a machine learning model (1316) that is supported by the GPU servers (1318).

The example method depicted in FIG. 16 also includes receiving (1602) a first request (1612) to transmit the transformed dataset (1314) to one or more of the GPU servers (1318). The first request (1612) to transmit the transformed dataset (1314) to one or more of the GPU servers (1318) may be received (1602), for example, from the one or more GPU servers (1318), from the unified management plane (1502) described above, and so on. The first request (1612) to transmit the transformed dataset (1314) to one or more of the GPU servers (1318) may be generated in response to a user or a system entity such as the unified management plane (1502) scheduling or otherwise initiating the execution of a particular machine learning model.

The example method depicted in FIG. 16 also includes transmitting (1606), from the storage system (1304) to the one or more GPU servers (1318), the transformed dataset (1314). The transformed dataset (1314) may be transmitted (1606) from the storage system (1304) to the one or more GPU servers (1318), for example, via one or more data communications links between the storage system (1304) and the one or more GPU servers (1318), which may be embodied in many different ways as described in more detail above. Alternatively, transformed dataset (1314) may be transmitted (1606) from the storage system (1304) to the one or more GPU servers (1318) via RDMA, as described in more detail above.

The example method depicted in FIG. 16 also includes receiving (1608) a second request (1614) to transmit the transformed dataset (1314) to one or more of the GPU servers (1318). The second request (1614) to transmit the transformed dataset (1314) to one or more of the GPU servers (1318) may be received (1608), for example, from the one or more GPU servers (1318), from the unified management plane (1502) described above, and so on. The second request (1614) to transmit the transformed dataset (1314) to one or more of the GPU servers (1318) may be generated in response to a user or a system entity such as the unified management plane (1502) scheduling or otherwise initiating the execution of a particular machine learning model.

Readers will appreciate that multiple requests (1612, 1614) for the same transformed dataset (1314) may be issued for a variety of reasons. For example, a first request (1612) to transmit the transformed dataset (1314) to one or more of the GPU servers (1318) may be received (1602) in response to the GPU servers (1318) initiating execution of a particular machine learning model that will train on the transformed dataset (1314). In such an example, after training has completed, changes may be made to the particular machine learning model as part of an effort to improve the particular machine learning model. Once the changes have been made to the particular machine learning model, a second request (1614) to transmit the transformed dataset (1314) to one or more of the GPU servers (1318) may be received (1608) in response to the GPU servers (1318) initiating execution of the updated machine learning model that will train on the transformed dataset (1314). Similarly, multiple requests (1612, 1614) for the same transformed dataset (1314) may be issued, for example, when a first GPU server is going to execute a first version of a particular machine learning model that trains on the transformed dataset (1314) more or less simultaneously to a second GPU server executing a second version of a particular machine learning model that trains on the transformed dataset (1314). Readers will appreciate that, because the one or more storage systems (1304) can store the transformed dataset (1314) within the storage systems (1304) themselves, neither the storage systems (1304) nor the GPU servers (1318) will need to repeat a transformation that has previously been performed.

The example method depicted in FIG. 16 also includes transmitting (1610), from the storage system (1304) to the one or more GPU servers (1318) without performing an additional transformation of the dataset (1306), the transformed dataset (1314). The transformed dataset (1314) may be transmitted (1610) from the storage system (1304) to the one or more GPU servers (1318), for example, via one or more data communications links between the storage system (1304) and the one or more GPU servers (1318), which may be embodied in many different ways as described in more detail above. Alternatively, transformed dataset (1314) may be transmitted (1610) from the storage system (1304) to the one or more GPU servers (1318) via RDMA, as described in more detail above. In either embodiment, however, the storage system (1304) can respond to the second request (1614) without performing an additional transformation of the dataset (1306).

Readers will appreciate that although the previous paragraphs relate to embodiments where steps may be described as occurring in a certain order, no ordering is required unless otherwise stated. In fact, steps described in the previous paragraphs may occur in any order. Furthermore, although one step may be described in one figure and another step may be described in another figure, embodiments of the present disclosure are not limited to such combinations, as any of the steps described above may be combined in particular embodiments.

Readers will further appreciate that although the examples described above relate to embodiments where an artificial intelligence infrastructure supports the execution of machine learning models, the artificial intelligence infrastructure may support the execution of a broader class of AI algorithms, including production algorithms. In fact, the steps described above may similarly apply to such a broader class of AI algorithms.

Readers will further appreciate that although the embodiments described above relate to embodiments where the artificial intelligence infrastructure includes one or more storage systems and one or more GPU servers, in other embodiments, other technologies may be used. For example, in some embodiments the GPU servers may be replaced by a collection of GPUs that are embodied in a non-server form factor. Likewise, in some embodiments, the GPU servers may be replaced by some other form of computer hardware that can execute computer program instructions, where the computer hardware that can execute computer program instructions may be embodied in a server form factor or in a non-server form factor.

Example embodiments are described largely in the context of a fully functional computer system. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

Embodiments can include be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to some embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
receiving, by a graphics processing unit ('GPU') server that includes one or more graphics processing units ('GPUs'), a transformed dataset that is stored within and transformed by a storage system that is external to the GPU server; and
executing, by the GPU server, one or more machine learning algorithms using the transformed dataset received from the external storage system as input.

2. The method of claim 1 further comprising:
identifying, in dependence upon one or more machine learning models to be executed on the GPU server, one or more transformations to apply to the dataset; and
generating, by the system that is external to the GPU server and based on the one or more transformations, the transformed dataset.

3. The method of claim 1 wherein receiving the dataset includes receiving the dataset in application memory on the GPU server.

4. The method of claim 1 further comprising transmitting, from the system that is external to the GPU server, the transformed dataset to application memory on the GPU server.

5. The method of claim 1 further comprising:
scheduling, by a unified management plane, one or more transformations for the system that is external to the GPU server to apply to the dataset; and
scheduling, by the unified management plane, execution of one or more machine learning algorithms associated with a machine learning model by the GPU server.

6. The method of claim 1 further comprising maintaining information describing the dataset, the one or more transformations applied to the dataset, and the transformed dataset.

7. The method of claim 1 further comprising:
receiving a first request to transmit the transformed dataset to the GPU server;
transmitting, to the GPU server, the transformed dataset;
receiving a second request to transmit the transformed dataset to one or more GPU servers; and
transmitting, from a storage system to the one or more GPU servers without performing an additional transformation of the dataset, the transformed dataset.

8. An artificial intelligence infrastructure that includes one or more storage systems and one or more graphical processing unit ('GPU') servers, the artificial intelligence infrastructure configured to carry out the steps of:
receiving, by a graphics processing unit ('GPU') server that includes one or more graphics processing units ('GPUs'), a transformed dataset that is stored within and transformed by a storage system that is external to the GPU server; and
executing, by the GPU server, one or more machine learning algorithms using the transformed dataset received from the external storage system as input.

9. The artificial intelligence infrastructure of claim 8 wherein the artificial intelligence infrastructure is further configured to carry out the steps of:
identifying, in dependence upon one or more machine learning models to be executed on the GPU server, one or more transformations to apply to the dataset; and generating, by the storage system that is external to the GPU server and based on the one or more transformations, the transformed dataset.

10. The artificial intelligence infrastructure of claim 8 wherein receiving the dataset includes receiving the dataset in application memory on the GPU server.

11. The artificial intelligence infrastructure of claim 8 wherein the artificial intelligence infrastructure is further configured to carry out the step of transmitting, from the storage system that is external to the GPU server, the transformed dataset to application memory on the GPU server.

12. The artificial intelligence infrastructure of claim 8 wherein the artificial intelligence infrastructure is further configured to carry out the steps of:
   scheduling, by a unified management plane, one or more transformations for the system that is external to the GPU server to apply to the dataset; and
   scheduling, by the unified management plane, execution of one or more machine learning algorithms associated with a machine learning model by the GPU server.

13. The artificial intelligence infrastructure of claim 8 wherein the artificial intelligence infrastructure is further configured to carry out the step of maintaining information describing the dataset, the one or more transformations applied to the dataset, and the transformed dataset.

14. The artificial intelligence infrastructure of claim 8 wherein the artificial intelligence infrastructure is further configured to carry out the steps of:
   receiving a first request to transmit the transformed dataset to the GPU server;
   transmitting, to the GPU server, the transformed dataset;
   receiving a second request to transmit the transformed dataset to one or more GPU servers; and
   transmitting, from the storage system to the one or more GPU servers without performing an additional transformation of the dataset, the transformed dataset.

15. An apparatus for data transformation offloading in an artificial intelligence infrastructure that includes one or more storage systems and one or more graphical processing unit ('GPU') servers, the apparatus comprising a computer processor, a computer memory operatively coupled to the computer processor, the computer memory having disposed within it computer program instructions that, when executed by the computer processor, cause the apparatus to carry out the steps of:
   identifying, in dependence upon one or more machine learning models to be executed on the graphics processing unit ('GPU') servers that include one or more graphics processing units ('GPUs'), one or more transformations to apply to a dataset stored within a storage system that is external to the GPU servers; and
   generating, by the storage system that is external to the GPU servers, in dependence upon the one or more transformations, a transformed dataset.

16. The apparatus of claim 15 further comprising computer program instructions that, when executed by the computer processor, cause the apparatus to carry out the step of transmitting, from the storage system to the one or more GPU servers, the transformed dataset.

17. The apparatus of claim 16 wherein transmitting, from the storage system to the one or more GPU servers, the transformed dataset further comprises transmitting the transformed dataset from the one or more storage systems directly to application memory on the GPU servers.

18. The apparatus of claim 15 further comprising computer program instructions that, when executed by the computer processor, cause the apparatus to carry out the steps of:
   scheduling, by a unified management plane, one or more transformations for one or more of the storage systems to apply to the dataset; and
   scheduling, by the unified management plane, execution of one or more machine learning algorithms associated with the machine learning model by the one or more GPU server.

19. The apparatus of claim 15 further comprising computer program instructions that, when executed by the computer processor, cause the apparatus to carry out the step of maintaining information describing the dataset, the one or more transformations applied to the dataset, and the transformed dataset.

20. The method of claim 1, wherein the transformed dataset is cached at the storage system that is external to the GPU server.

* * * * *